United States Patent
Sun et al.

(10) Patent No.: US 12,540,285 B2
(45) Date of Patent: Feb. 3, 2026

(54) TWO STAGE FIXED-BED CATALYTIC PROCESS FOR UPGRADING PYROLYSIS OIL TO BTX

(71) Applicant: Saudi Arabian Oil Company, Dhahran (SA)

(72) Inventors: Miao Sun, Dhahran (SA); Lianhui Ding, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 241 days.

(21) Appl. No.: 18/407,866

(22) Filed: Jan. 9, 2024

(65) Prior Publication Data

US 2025/0223506 A1    Jul. 10, 2025

(51) Int. Cl.
    *C10G 65/08*      (2006.01)
    *B01J 8/04*      (2006.01)
    (Continued)

(52) U.S. Cl.
    CPC ............ *C10G 65/08* (2013.01); *B01J 8/0453* (2013.01); *B01J 8/0457* (2013.01); *B01J 21/12* (2013.01);
    (Continued)

(58) Field of Classification Search
    CPC ............ C10G 65/08; C10G 2300/1096; C10G 2300/4006; C10G 2300/4012;
    (Continued)

(56) References Cited

U.S. PATENT DOCUMENTS 3,099,617 A    7/1963   Tulleners
4,550,090 A    10/1985   Degnan et al.
(Continued)

FOREIGN PATENT DOCUMENTS

CN    104355995 A    2/2015
CN    106622354 A    5/2017
(Continued)

OTHER PUBLICATIONS

Guerzoni et al. "Catalytic Cracking of a Hydrocarbon Mixture on Combinations of HY and HZSM-5 Zeolites" Chemistry Department, Journal of Catalysis 139, 289-303 (1993), 15 pgs.

(Continued)

*Primary Examiner* — Randy Boyer
*Assistant Examiner* — Juan C Valencia
(74) *Attorney, Agent, or Firm* — DINSMORE & SHOHL LLP

(57) ABSTRACT

Systems for upgrading pyrolysis oil include a first fixed-bed reactor having a first catalyst bed and a second catalyst bed. The first catalyst bed includes: a first treating catalyst containing alumina, binder, Mo, Ni, and P; a second treating catalyst made of $Al_2O_3$, $SiO_2$, $ZrO_2$, NiO, and $WO_3$; or both. The second catalyst bed includes mixed metal oxide catalyst. The first fixed-bed reactor contacts the pyrolysis oil with hydrogen in the presence of the treating catalyst and the mixed metal oxide catalyst to produce an intermediate stream comprising light aromatic compounds. The system includes a second fixed-bed reactor downstream that includes a mesoporous supported metal catalyst having nickel and tungsten on a mesoporous support. The second fixed-bed reactor contacts the intermediate stream with hydrogen in the presence of the mesoporous supported metal catalyst to produce a second reactor effluent comprising aromatic compounds having six to eight carbon atoms.

20 Claims, 9 Drawing Sheets

(51) Int. Cl.

| | | |
|---|---|---|
| *B01J 21/12* | (2006.01) | |
| *B01J 23/83* | (2006.01) | |
| *B01J 23/883* | (2006.01) | |
| *B01J 27/185* | (2006.01) | |
| *B01J 27/19* | (2006.01) | |
| *B01J 29/16* | (2006.01) | |
| *B01J 29/72* | (2006.01) | |
| *B01J 35/00* | (2024.01) | |
| *B01J 37/00* | (2006.01) | |

(52) U.S. Cl.
CPC ............ *B01J 23/83* (2013.01); *B01J 23/883* (2013.01); *B01J 27/1853* (2013.01); *B01J 27/19* (2013.01); *B01J 29/166* (2013.01); *B01J 29/7215* (2013.01); *B01J 35/19* (2024.01); *B01J 37/0009* (2013.01); *B01J 2208/025* (2013.01); *C10G 2300/1096* (2013.01); *C10G 2300/4006* (2013.01); *C10G 2300/4012* (2013.01); *C10G 2300/4018* (2013.01); *C10G 2300/4025* (2013.01); *C10G 2300/70* (2013.01); *C10G 2400/30* (2013.01)

(58) Field of Classification Search
CPC .... C10G 2300/4018; C10G 2300/4025; C10G 2300/70; C10G 2400/30; C10G 65/10; C10G 47/12; C10G 47/20; C10G 49/08; C10G 69/06; C10G 49/04; B01J 8/0453; B01J 8/0457; B01J 21/12; B01J 23/83; B01J 23/883; B01J 27/1853; B01J 27/19; B01J 29/166; B01J 29/7215; B01J 35/19; B01J 37/0009; B01J 2208/025

See application file for complete search history.

(56) References Cited

U.S. PATENT DOCUMENTS

| | | | |
|---|---|---|---|
| 4,602,000 | A | 7/1986 | Dupin et al. |
| 6,531,051 | B1 | 3/2003 | Kasztelan et al. |
| 7,232,515 | B1 | 6/2007 | Demmin et al. |
| 9,217,114 | B2 | 12/2015 | Cortright et al. |
| 9,321,973 | B2 | 4/2016 | Marchand et al. |
| 10,118,163 | B1 | 11/2018 | Zhang |
| 10,751,709 | B1 | 8/2020 | Sun et al. |
| 10,751,710 | B1 | 8/2020 | Sun |
| 10,835,894 | B1 | 11/2020 | Sun et al. |
| 10,870,106 | B1 | 12/2020 | Sun |
| 10,953,396 | B2 | 3/2021 | Sun et al. |
| 11,027,271 | B2 | 6/2021 | Sun |
| 11,123,725 | B2 | 9/2021 | Sun et al. |
| 11,130,119 | B2 | 9/2021 | Sun |
| 11,377,400 | B1 | 7/2022 | Sun et al. |
| 11,384,297 | B1* | 7/2022 | Sun ..................... B01J 23/002 |
| 2005/0070423 | A1 | 3/2005 | Kishan et al. |
| 2009/0171123 | A1 | 7/2009 | Glaser et al. |
| 2009/0173666 | A1 | 7/2009 | Zhou et al. |
| 2009/0321315 | A1 | 12/2009 | Bhattacharyya et al. |
| 2010/0314295 | A1 | 12/2010 | Sandstede et al. |
| 2012/0094879 | A1 | 4/2012 | Roberts et al. |
| 2012/0238792 | A1 | 9/2012 | Watson et al. |
| 2013/0143972 | A1 | 6/2013 | Townsend et al. |
| 2013/0164205 | A1 | 6/2013 | Putluru et al. |
| 2013/0178664 | A1 | 7/2013 | Zhou et al. |
| 2013/0245338 | A1 | 9/2013 | Weiner et al. |
| 2014/0021096 | A1 | 1/2014 | Chaumonnot et al. |
| 2014/0130402 | A1 | 5/2014 | Kastner et al. |
| 2015/0231615 | A1 | 8/2015 | Bondulle et al. |
| 2015/0274620 | A1 | 10/2015 | Zong et al. |
| 2017/0001180 | A1 | 1/2017 | Ravishankar et al. |
| 2018/0142159 | A1 | 5/2018 | Kumar et al. |
| 2018/0290131 | A1 | 10/2018 | Carrette |
| 2018/0333708 | A1 | 11/2018 | Ding et al. |
| 2018/0334622 | A1 | 11/2018 | Agrawal et al. |
| 2019/0134616 | A1 | 5/2019 | Jae et al. |
| 2019/0173666 | A1 | 6/2019 | Ardashev et al. |
| 2021/0001318 | A1 | 1/2021 | Sun et al. |
| 2021/0130715 | A1 | 5/2021 | Xu et al. |
| 2023/0002689 | A1 | 1/2023 | Sun et al. |

FOREIGN PATENT DOCUMENTS

| | | | |
|---|---|---|---|
| FR | 3075663 | A1 | 6/2019 |
| WO | 0042127 | A1 | 7/2000 |
| WO | 2012085358 | A1 | 6/2012 |
| WO | 2013176277 | A1 | 11/2013 |
| WO | 2017207976 | A1 | 12/2017 |
| WO | 2018011642 | A1 | 1/2018 |
| WO | 2019197987 | A1 | 10/2019 |
| WO | 2023080977 | A1 | 5/2023 |

OTHER PUBLICATIONS

Hanif et al. "Supported solid and heteropoly acid catalysts for production of biodiesel" Catalysis Reviews (2017) vol. 59, No. 2, 165-188, 24 pgs.

Jimenez-Cruz et al. "Molecular size evaluation of linear and branched paraffins from the gasoline pool by DFT quantum chemical calculations" Science Direct, Fuel 83 (2004) 2183-2188, 7 pgs.

Kim et al. "Novel Ni2P/zeolite catalysts for naphthalene hydrocracking to BTX" Catalysis Communications 45 (2014) 133-138, 6 pgs.

Kim et al. "Morphology effect of b-zeolite supports for Ni2P catalysts on the hydrocracking of polycyclic aromatic hydrocarbons to benzene, toluene, and xylene" Journal of Catalysis 351 (2017) 67-78, 12 pgs.

Kondoh et al., "Catalytic cracking of heavy oil over TiO2—ZrO2 catalysts under superheated steam conditions", Fuel, vol. 167, pp. 268-294, 2016.

Kondoh et al., "Effects of H2O Addition on Oil Sand Bitumen Cracking Using a CeO2—ZrO2—Al2O3—FeOx Catalyst", Energy Fuels, vol. 30, pp. 10358-10364, 2016.

Kondoh et al., "Upgrading of oil sand bitumen over an iron oxide catalyst using sub- and super-critical water", Fuel Processing Technology, vol. 145, pp. 96-101, 2016.

Kumar et al., "MCM-41, MCM-48 and related mesoporous adsorbents: their synthesis and characterization", Colloids and Surfaces A: Physicochemical and Engineering Aspects 187-188 (2001), pp. 109-116.

Lapinas et al. "Catalytic Hydrogenation and Hydrocracking of Fluorene: Reaction Pathways, Kinetics, and Mechanisms" Ind. Eng. Chem. Res. 1991, 30, 42-50, 9 pgs.

Leite et al. "Hydrocracking of phenanthrene over bifunctional Pt catalysts" Catalysis Today 65 (2001) 241-247, 7 pgs.

Lemberton et al. "Catalytic hydroconversion of simulated coal tars" Applied Catalysis A: General, 79 (1991) 115-126, 12 pgs.

Martinez-Franco et al., "High-silica nanocrystalline Beta zeolites: efficient synthesis and catalytic application", Chem. Sci., 2016, 7, pp. 102-108.

Matsui et al. "Explanation of Product Distribution of Hydrocracking Reaction of Aromatic Hydrocarbons with Nickel-Loaded Zeolites Based on CAMD Study on Interaction between Zeolites and Substrates" Energy & Fuels (1995) 9, 435-438, 4 pgs.

Nikulshin et al. "CoMo/Al2O3 catalysts prepared on the basis of Co2Mo10-heteropolyacid and cobalt citrate: Effect of Co/Mo ratio", Fuel, vol. 100, Oct. 2012, pp. 24-33.

Okuhara et al. "Catalytic Chemistry of Heteropoly Compounds" Advances in Catalysis, Adv Cata vol. 41 (1996) 113, 140 pgs.

Park et al. "Hydro-conversion of 1-methyl naphthalene into (alkyl)benzenes over alumina-coated USY zeolite-supported NiMoS catalysts" Fuel 90 (2011) 182-189, 8 pgs.

Park et al. "Mild hydrocracking of 1-methyl naphthalene (1-MN) over alumina modified zeolite" Journal of Industrial and Engineering Chemistry 19 (2013) 627-632, 6 pgs.

Pasoni et al., "Heterogenization of H6PMo9V3O40 and palladium acteate in VPI-5 and MCM-41 and their use in the catalytic oxidation of benzene to phenol", Journal of Molecular Catalyst A: Chemical 134 (1998), pp. 229-235.

(56) References Cited

OTHER PUBLICATIONS

Tailleur et al. The effect of aromatics on paraffin mild hydrocracking reactions (WNiPd/CeY—Al2O3), Fuel Processing Technology 89 (2008) 808-818, 11 pgs.

Technical Data Sheet, ACS Material Al-MCM-41, www.acsmaterial.com, no date available.

Upare et al. "Cobalt promoted Mo/beta zeolite for selective hydrocracking of tetralin and pyrolysis fuel oil into monocyclic aromatic hydrocarbons" Journal of Industrial and Engineering Chemistry 35 (2016) 99-107, 9 pgs.

Upare et al. "Selective hydrocracking of pyrolysis fuel oil into benzene, toluene and xylene over CoMo/beta zeolite catalyst" Journal of Industrial and Engineering Chemistry 46 (2017) 356-363, 8 pgs.

Wang, et al., "Performance Evaluation of "Ship-in-the-Bottle" Type Heteropoly Acid Encaged Y-Type Zeolite as Catalyst for Oxidative Desulfurization", collect. czech. commun. 2011, vol. 76, No. 12, pp. 1595-1605, Dec. 29, 2011.

Zheng et al., "Controlling Deoxygenation Pathways in Catalytic Fast Pyrolysis of Biomass and Its Components by Using Metal-Oxide Nanocomposites", iScience 23, 100814, Jan. 24, 2020.

Notification of Transmittal of the International Search Report and the Written Opinion of the International Searching Authority, or the Declaration dated Feb. 18, 2025 pertaining to International application No. PCT/US2024/054823 filed Nov. 7, 2024, pp. 1-12.

\* cited by examiner

TWO STAGE FIXED-BED CATALYTIC PROCESS FOR UPGRADING PYROLYSIS OIL TO BTX

BACKGROUND

Field

The present disclosure generally relates to methods and systems for upgrading pyrolysis oil, more specifically, methods and systems for upgrading pyrolysis oil to light aromatic compounds using a two-stage fixed-bed catalytic process.

Technical Background

Crude oil can be converted to valuable chemical intermediates and products through one or more refinery processes. The refinery processes can include steam cracking, in which larger hydrocarbons in the crude oil are cracked to form smaller hydrocarbons. For instance, naphtha streams separated from crude oil and gas condensate streams can be steam cracked to produce greater value products and intermediates. Light hydrocarbon gases can also be steam cracked to produce greater value products and intermediates, such as but not limited to olefins. Steam cracking units produce a bottom stream, which is referred to as pyrolysis oil. The pyrolysis oil may include an increased concentration of aromatic compounds compared to the crude oil feedstock. In many crude oil processing facilities, this pyrolysis oil is burned as fuel. However, the aromatic compounds in the pyrolysis oil can be converted to greater value chemical products and intermediates, which can be used as building blocks in chemical synthesis processes. For example, aromatic compounds from the pyrolysis oil can be converted into xylenes, which can be the initial building blocks for producing terephthalic acid, which can then be used to produce polyesters. The aromatic compounds in the pyrolysis oil can be upgraded to many other greater value aromatic products and intermediates. The market demand for these greater value aromatic compounds continues to grow.

SUMMARY

Multi-ring aromatic compounds in the pyrolysis oil can be converted to light aromatic compounds, which can include benzene, toluene, ethylbenzene, xylenes (BTEX), other aromatic compounds, or combinations of these by various reactions, such as, but not limited to hydrogenation, ring opening, disproportionation, dealkylation, transalkylation, cracking, or aromatic cracking. In general, combinations of these reactions are capable of converting a portion of the multi-ring aromatic compounds in the pyrolysis oil to light aromatic compounds in a single processing step. However, accomplishing the multiple reactions in a single processing step can be complex, and the yield may be insufficient to meet the demand for BTEX without employing severe conditions, which increases the capital and operating costs of the process. Additionally, present methods of accomplishing these reactions may result in excessive coke production which causes reactor plugging.

Accordingly, ongoing needs exist for improved systems and methods for upgrading pyrolysis oils to produce light aromatic compounds to increase the yield of BTEX using mild processing conditions and while avoiding excess coke production. Embodiments of the present disclosure meet this need by providing a two stage catalytic process, which may upgrade pyrolysis oils to BTEX in a single process by using two fixed-bed reactors in series. The first fixed-bed reactor may include at least a first catalyst bed and a second catalyst bed, where a treating catalyst is positioned in the first catalyst bed and a mixed metal oxide catalyst is positioned in the second catalyst bed. The first fixed-bed reactor may be operable to convert at least a portion of multi-ring compounds in the pyrolysis oil to intermediate aromatic compounds, such as di-aromatic compounds. The second fixed-bed reactor may include a mesoporous supported metal catalyst and may be operable to convert at least a portion of the intermediate aromatic compounds to BTEX. The methods and systems may convert a portion of the multi-ring aromatic compounds in the pyrolysis oil to BTEX in a two stage fixed bed catalytic process, without conducting and subsequent chemical reaction steps. The methods and systems may produce greater yields of BTEX through upgrading pyrolysis oil under mild conditions compared to upgrading pyrolysis oil according to conventional methods using more severe reaction conditions. The methods and systems may produce BTEX through upgrading pyrolysis oil without the coke formation and reactor plugging that cause problems in some more conventional systems.

According to one or more aspects of the present disclosure, a system for upgrading pyrolysis oil may comprise a first fixed-bed reactor comprising a first catalyst bed and a second catalyst bed disposed downstream of the first catalyst bed. The first catalyst bed may comprise a treating catalyst comprising: (1) a first treating catalyst comprising a plurality of first particles and each of the plurality of first particles comprises alumina, binder, Mo, Ni, and P; (2) a second treating catalyst comprising a plurality of second particles and each of the plurality of second particles comprises $Al_2O_3$, $SiO_2$, $ZrO_2$, NiO, and $WO_3$; or (3) both. The second catalyst bed may comprises a mixed metal oxide catalyst. The first fixed-bed reactor may be operable to contact a pyrolysis oil feed with hydrogen in the presence of the treating catalyst and the mixed metal oxide catalyst to produce an intermediate stream comprising light aromatic compounds that include mono-aromatic compounds, di-aromatic compounds, tri-aromatic compounds, or both. The system may further comprise a second fixed-bed reactor downstream of the first fixed-bed reactor and comprising a mesoporous supported metal catalyst. The second fixed-bed reactor may be operable to contact the intermediate stream with hydrogen in the presence of the mesoporous supported metal catalyst to produce a second reactor effluent comprising aromatic compounds having six to eight carbon atoms. The mesoporous supported metal catalyst may comprise nickel and tungsten impregnated onto a mesoporous support comprising alumina and at least one zeolite.

According to other aspects of the present disclosure, a method of upgrading a pyrolysis oil feed may include passing a pyrolysis oil feed to a system comprising a first fixed-bed reactor and a second fixed bed reactor downstream of the first fixed-bed reactor. The first fixed bed reactor may comprise a first catalyst bed and a second catalyst bed disposed downstream of the first catalyst bed. The first catalyst bed may comprise a treating catalyst comprising: (1) a first treating catalyst comprising a plurality of first particles and each of the plurality of first particles comprises alumina, binder, Mo, Ni, and P; (2) a second treating catalyst comprising a plurality of second particles and each of the plurality of second particles comprises $Al_2O_3$, $SiO_2$, $ZrO_2$, NiO, and $WO_3$; or (3) both. The second catalyst bed may comprises a mixed metal oxide catalyst. The second fixed-bed reactor may comprise a mesoporous supported metal catalyst includes nickel and tungsten impregnated onto a mesoporous support comprising alumina and at least one zeolite. The method may further include contacting the pyrolysis oil feed with hydrogen in the presence of the treating catalyst and the mixed metal oxide catalyst in the first fixed-bed reactor to produce an intermediate stream comprising di-aromatic compounds, tri-aromatic compounds, or combinations thereof. The method may further include contacting the intermediate stream with hydrogen in the presence of the mesoporous supported metal catalyst of the second fixed-bed reactor to produce a second reactor effluent comprising aromatic compounds having six to eight carbon atoms.

Additional features and advantages of the technology described in this disclosure will be set forth in the detailed description which follows, and in part will be readily apparent to those skilled in the art from the description or recognized by practicing the technology as described in this disclosure, including the detailed description which follows, the claims, as well as the appended drawings.

BRIEF DESCRIPTION OF THE DRAWINGS

The following detailed description of specific embodiments of the present disclosure can be best understood when read in conjunction with the following drawings, where like structure is indicated with like reference numerals and in which.

Figure 1:
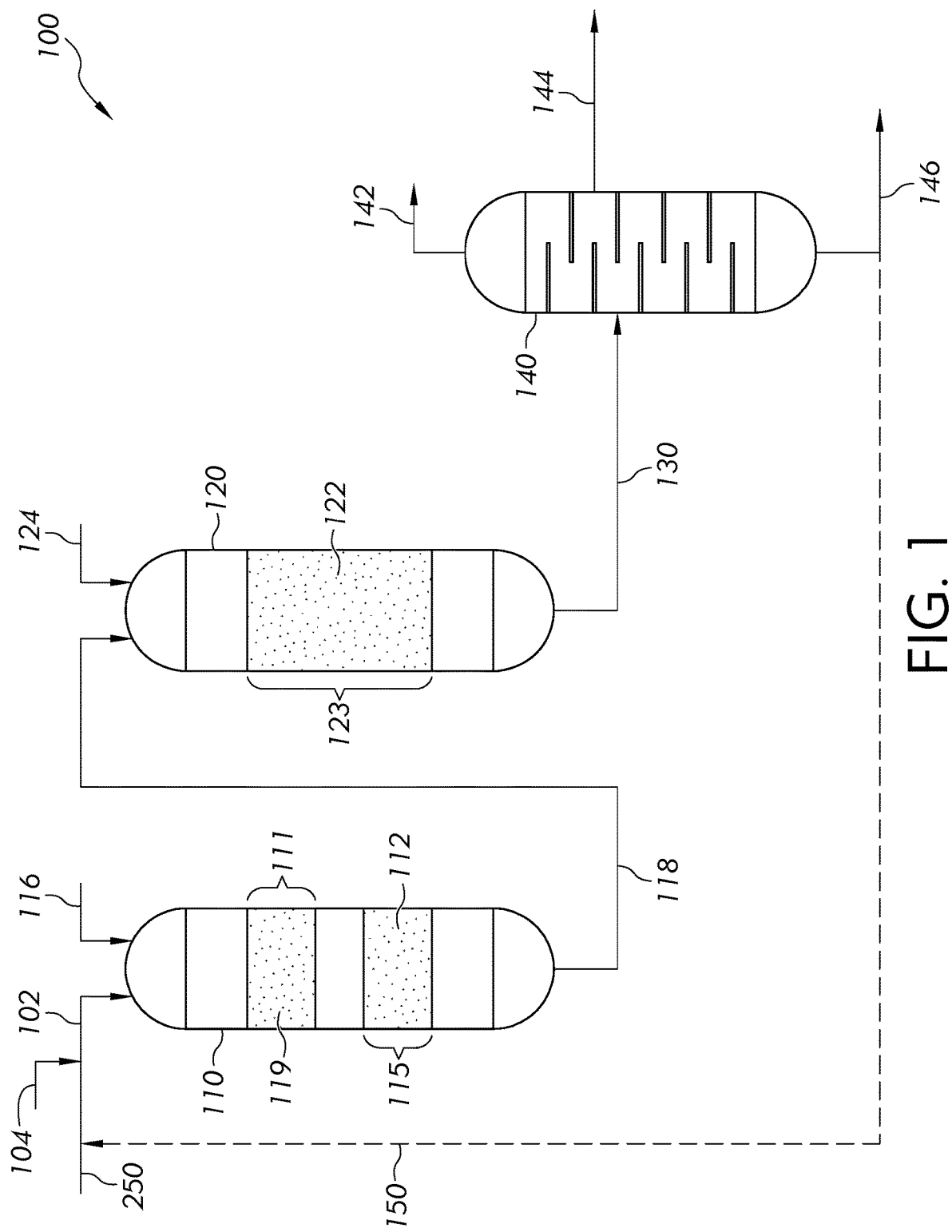
FIG. 1 schematically depicts a generalized flow diagram of a system for upgrading pyrolysis oil, according to one or more embodiments shown and described in this disclosure.

For the purpose of describing the simplified schematic illustrations and descriptions of FIGS. 1-3, and 5-8 the numerous valves, temperature sensors, electronic controllers, and the like that may be employed and well known to those of ordinary skill in the art of certain chemical processing operations are not included. Further, accompanying components that are often included in chemical processing operations, such as, for example, air supplies, heat exchangers, surge tanks, catalyst hoppers, or other related systems are not depicted. It would be known that these components are within the spirit and scope of the present embodiments disclosed. However, operational components, such as those described in the present disclosure, may be added to the embodiments described in this disclosure.

It should further be noted that arrows in the drawings refer to process streams. However, the arrows may equivalently refer to transfer lines that may serve to transfer process steams between two or more system components. Additionally, arrows that connect to system components define inlets or outlets in each given system component. The arrow direction corresponds generally with the major direction of movement of the materials of the stream contained within the physical transfer line signified by the arrow. Furthermore, arrows that do not connect two or more system components signify a product stream which exits the depicted system or a system inlet stream which enters the depicted system. Product streams may be further processed in accompanying chemical processing systems or may be commercialized as end products. System inlet streams may be streams transferred from accompanying chemical processing systems or may be non-processed feedstock streams. Some arrows may represent recycle streams, which are effluent streams of system components that are recycled back into the system. However, it should be understood that any represented recycle stream, in some embodiments, may be replaced by a system inlet stream of the same material, and that a portion of a recycle stream may exit the system as a system product.

Additionally, arrows in the drawings may schematically depict process steps of transporting a stream from one system component to another system component. For example, an arrow from one system component pointing to another system component may represent "passing" a system component effluent to another system component, which may include the contents of a process stream "exiting" or being "removed" from one system component and "introducing" the contents of that product stream to another system component.

It should be understood that two or more process streams are "mixed" or "combined" when two or more lines intersect in the schematic flow diagrams of FIGS. 1-3, and 5-8. Mixing or combining may also include mixing by directly introducing both streams into a like reactor, separation device, or other system component. For example, it should be understood that when two streams are depicted as being combined directly prior to entering a separator or reactor, that in some embodiments the streams could equivalently be introduced into the separator or reactor and be mixed in the reactor.

Reference will now be made in greater detail to various embodiments of the present disclosure, some embodiments of which are illustrated in the accompanying drawings. Whenever possible, the same reference numerals will be used throughout the drawings to refer to the same or similar parts.

DETAILED DESCRIPTION

Embodiments of the present disclosure are directed to methods and systems for upgrading pyrolysis oil in a two-stage fixed-bed catalytic process. Referring now to FIG. 1, a system 100 for upgrading a pyrolysis oil may comprise a first fixed-bed reactor 110 and a second fixed-bed reactor 120 downstream of the first fixed-bed reactor 110. The first fixed-bed reactor 110 may comprise at least a first catalyst bed 111 and a second catalyst bed 115. The first catalyst bed 111 may comprise a treating catalyst 119. The treating catalyst 119 may be a first treating catalyst comprising alumina, binder, Mo, Ni, and P; a second treating catalyst comprising $Al_2O_3$, $SiO_2$, $ZrO_2$, NiO, and $WO_3$, or both. The second catalyst bed 115 of the first fixed-bed reactor 110 may comprise a mixed metal oxide (MMO) catalyst 112. The first fixed-bed reactor 110 may be operable to contact a pyrolysis oil feed 102 with hydrogen 116 in the presence of the treating catalyst 119 in the first catalyst bed 111 and then in the presence of the MMO catalyst 112 in the second catalyst bed 115 to produce an intermediate stream 118 comprising di-aromatic compounds, tri-aromatic compounds, or a combination thereof. The mixed metal oxide catalyst 112 may have a composition different from the composition of the treating catalyst 119. For example, the mixed metal oxide catalyst 112 may comprise a plurality of catalyst particles and each of the plurality of catalyst particles may comprise iron oxide ($Fe_2O_3$), zirconium oxide ($ZrO_2$), cerium oxide ($CeO_2$), and alumina ($Al_2O_3$). The second fixed-bed reactor 120 downstream of the first fixed-bed reactor 110 may comprise a mesoporous supported metal catalyst 122. The second fixed-bed reactor 120 may be operable to contact the intermediate stream 118 with hydrogen in the presence of the mesoporous supported metal catalyst 122 to produce a second reactor effluent 130 comprising aromatic compounds having six to eight carbon atoms. The mesoporous supported metal catalyst 122 may comprise nickel and tungsten impregnated onto a mesoporous support comprising alumina and at least one zeolite.

Still referring to FIG. 1, a method for upgrading pyrolysis oil may comprise contacting a pyrolysis oil feed 102 with hydrogen 116 in the presence of a treating catalyst 119 in a first catalyst bed 111 and subsequently in the presence of an MMO catalyst 112 in the second catalyst bed 115 in a first fixed-bed reactor 110. The pyrolysis oil feed 102 may comprise multi-ring aromatic compounds comprising greater than or equal to sixteen carbon atoms. The treating catalyst 119 may comprise a first treating catalyst comprising alumina, binder, Mo, Ni, and P; a second treating catalyst comprising $Al_2O_3$, $SiO_2$, $ZrO_2$, NiO, and $WO_3$; or both. The MMO catalyst may comprise a plurality of catalyst particles and each of the plurality of catalyst particles may comprise $Fe_2O_3$, $ZrO_2$, $CeO_2$, and $Al_2O_3$. Contacting the pyrolysis oil feed 102 with hydrogen 116 in the presence of the treating catalyst 119 in the first catalyst bed 111 and then in the presence of the MMO catalyst in the second catalyst bed 115 in the first fixed-bed reactor 110 may cause at least a portion of the multi-ring aromatic compounds in the pyrolysis oil feed 102 to react to produce an intermediate stream comprising di-aromatic compounds, tri-aromatic compounds, or both. The method may further comprise contacting the intermediate stream 118 with hydrogen 124 in the presence of a mesoporous supported metal catalyst 122 in a second fixed-bed reactor 120. The mesoporous supported metal catalyst 122 may comprise nickel and tungsten impregnated onto a mesoporous support comprising alumina and at least one zeolite. Contacting the intermediate stream 118 with the hydrogen 124 in the presence of the mesoporous supported metal catalyst 122 may cause at least a portion of the di-aromatic compounds, tri-aromatic compounds, or a combination thereof in the intermediate stream 118 to react to produce a second reactor effluent 130 comprising aromatic compounds having six to eight carbon atoms.

The present system and method show improved performance in upgrading raw pyrolysis oil to high value aromatics stream in a fixed bed catalytic process. The total yield of mono-aromatics can be significantly higher than in previous systems while producing substantially lower coking and plugging of system. Additionally, the present process can reach that yield using a raw heavy pyrolysis oil feed stream and a fixed-bed system. The use of a fixed-bed system also does not require separation of the solid catalyst from the reactor effluent in a separate step.

As used in this disclosure, the term "catalyst" refers to any substance that increases the rate of a specific chemical reaction. Catalysts and catalyst components described in this disclosure can be utilized to promote various reactions, such as, but not limited to selective hydrogenation, ring opening, disproportionation, dealkylation, hydrodealkylation, transalkylation, cracking, aromatic cracking, other chemical reactions, or combinations of these.

As used in this disclosure, the term "cracking" refers to a chemical reaction where a molecule having carbon-carbon bonds is broken into more than one molecule by the breaking of one or more of the carbon-carbon bonds, such as when a molecule comprising multiple aromatic rings is broken into multiple molecules, at least one of which comprises aromatic rings; where a molecule that comprises one or more cyclic moieties, such as but not limited to aromatic compounds, undergoes a reaction that opens one or more of the cyclic moieties; or where a molecule having carbon-carbon double bonds are reduced to carbon-carbon single bonds. Some catalysts may have multiple forms of catalytic activity, and calling a catalyst by one particular function does not render that catalyst incapable of being catalytically active for other functionality. As used in this disclosure, the term "hydrocracking" refers to cracking in the presence of added hydrogen.

As used in this disclosure, the term "aromatic compounds" refers to compounds having one or more aromatic ring structures. The term "light aromatic compounds" refers to compounds having an aromatic ring, with or without substitution, and from six to eight carbon atoms. The term "BTEX" refers to any combination of one or a plurality of benzene, toluene, ethylbenzene, para-xylene, meta-xylene, and ortho-xylene. The term "BTX" refers to any combination of one or a plurality of benzene, toluene, para-xylene, meta-xylene, and ortho-xylene.

As used in this disclosure, the term "xylenes," when used without a designation of the isomer, such as the prefix para, meta, or ortho, refers to one or more of meta-xylene, ortho-xylene, para-xylene, and mixtures of these xylene isomers.

As used throughout this disclosure, the term "boiling point temperature" or "boiling temperature" refers to boiling point temperature at atmospheric pressure, unless otherwise stated.

As used in this disclosure, the term "initial boiling point" or "IBP" of a composition refers to the temperature at which the constituents of the composition having the lowest boiling point temperature begin to transition from the liquid phase to the vapor phase.

As used in this disclosure, the term "final boiling point" or "FBP" of a composition refers to the temperature at which the greatest boiling temperature constituents of the composition transition from the liquid phase to the vapor phase.

As used in this disclosure, the term "outer surfaces" refers to surfaces at the outer periphery of a catalyst or catalyst support, such as the mesoporous support.

As used in this disclosure, the term "pore surfaces" refers to the inner surfaces of pores in a catalyst or catalyst support, where the pores include at least the pores in fluid communication with the outer surfaces of the catalyst or catalyst support and are accessible to reactants.

As used in this disclosure, the term "average pore size" of a catalyst or catalyst support refers to the average pore size determined by Barrett-Joyner-Halenda (BJH) analysis. BJH analysis measures the amount of a gas (argon) that detaches from a material, such as the mesoporous support, at 87 Kelvin over a range of pressures. Using the Kelvin equation, the amount of argon adsorbate removed from the pores of the material and the relative pressure of the system are used to calculate the average pore size of the material.

As used in this disclosure, the term "fixed-bed reactor" refers to a reactor in which a catalyst is contained within the reactor and is maintained within a fixed volume within the reactor.

As used in this disclosure, the term "separation unit" refers to any separation device that at least partially separates one or more chemicals in a mixture from one another. For example, a separation unit may selectively separate different chemical species from one another, forming one or more chemical fractions. Examples of separation units include, without limitation, distillation columns, fractionators, flash drums, knock-out drums, knock-out pots, centrifuges, filtration devices, traps, scrubbers, expansion devices, membranes, solvent extraction devices, high-pressure separators, low-pressure separators, and the like. It should be understood that separation processes described in this disclosure may not completely separate all of one chemical consistent from all of another chemical constituent. It should be understood that the separation processes described in this disclosure "at least partially" separate different chemical components from one another, and that even if not explicitly stated, it should be understood that separation may include only partial separation. As used in this disclosure, one or more chemical constituents may be "separated" from a process stream to form a new process stream. Generally, a process stream may enter a separation unit and be divided or separated into two or more process streams of desired composition.

As used in this disclosure, the terms "upstream" and "downstream" refers to the relative positioning of unit operations with respect to the direction of flow of the process streams. A first unit operation of a system is considered "upstream" of a second unit operation if process streams flowing through the system encounter the first unit operation before encountering the second unit operation. Likewise, a second unit operation is considered "downstream" of the first unit operation if the process streams flowing through the system encounter the first unit operation before encountering the second unit operation.

As used in this disclosure, passing a stream or effluent from one unit "directly" to another unit refers to passing the stream or effluent from the first unit to the second unit without passing the stream or effluent through an intervening reaction system or separation system that substantially changes the composition of the stream or effluent. Heat transfer devices, such as heat exchangers, preheaters, coolers, condensers, or other heat transfer equipment, and pressure devices, such as pumps, pressure regulators, compressors, or other pressure devices, are not considered to be intervening systems that change the composition of a stream or effluent. Combining two streams or effluents together upstream of a process unit also is not considered to comprise an intervening system that changes the composition of one or both of the streams or effluents being combined. Simply dividing a stream into two streams having the same composition is also not considered to comprise an intervening system that changes the composition of the stream.

As used in this disclosure, the term "effluent" refers to a stream that is passed out of a reactor, a reaction zone, or a separator following a particular reaction or separation process. Generally, an effluent has a different composition than the stream that entered the separator, reactor, or reaction zone. It should be understood that when an effluent is passed to another system unit, only a portion of that system stream may be passed. For example, a slip stream (having the same composition) may carry some of the effluent away, meaning that only a portion of the effluent may enter the downstream system unit. The term "reaction effluent" is more particularly be used to refer to a stream that is passed out of a reactor or reaction zone.

It should further be understood that streams may be named for the components of the stream, and the component for which the stream is named may be the major component of the stream (such as comprising from 50 weight percent (wt. %), from 70 wt. %, from 90 wt. %, from 95 wt. %, from 99 wt. %, from 99.5 wt. %, or even from 99.9 wt. % of the contents of the stream to 100 wt. % of the contents of the stream, notwithstanding any inert gases or diluents added to the stream). It should also be understood that components of a stream are disclosed as passing from one system component to another when a stream comprising that component is disclosed as passing from that system component to another. For example, a disclosed "hydrogen stream" passing to a first system component or from a first system component to a second system component should be understood to equivalently disclose "hydrogen" passing to the first system component or passing from a first system component to a second system component.

Referring again to FIG. 1, a system 100 for upgrading a pyrolysis oil feed 102 is schematically depicted. The system 100 for upgrading the pyrolysis oil feed 102 may include a first fixed-bed reactor 110 and a second fixed-bed reactor 120 downstream of the first fixed-bed reactor 110. The first fixed-bed reactor 110 may include one or a plurality of fixed bed reactors and may be operable to contact the pyrolysis oil feed 102 with hydrogen 116 in the presence of the treating catalyst 119 in a first catalyst bed 111 and subsequently in the presence of the mixed metal oxide catalyst 112 in a second catalyst bed 115 to produce an intermediate stream 118. The intermediate stream 118 may comprise di-aromatic compounds, tri-aromatic compounds, or both. The second fixed-bed reactor 120 may be operable to contact the intermediate stream 118 with hydrogen 124 in the presence of the mesoporous supported metal catalyst 122 to produce a second reactor effluent 130 comprising aromatic compounds having six to eight carbon atoms.

The system and method show improved performance in upgrading raw pyrolysis oil to a high value aromatics stream (comprising relatively high concentrations of mono-aromatics) in a single process. The use of fixed-bed reactors allows for the elimination of catalyst/product separation and catalyst recycle steps. A fixed-bed reactor, as used in this disclosure, can include a plurality of material inlets, but has a single effluent outlet. The use of the first catalyst bed 111 upstream of the second catalyst bed 115 in the first fixed-bed reactor 110 helps to prevent coking and plugging of the system 100.

Figure 2:
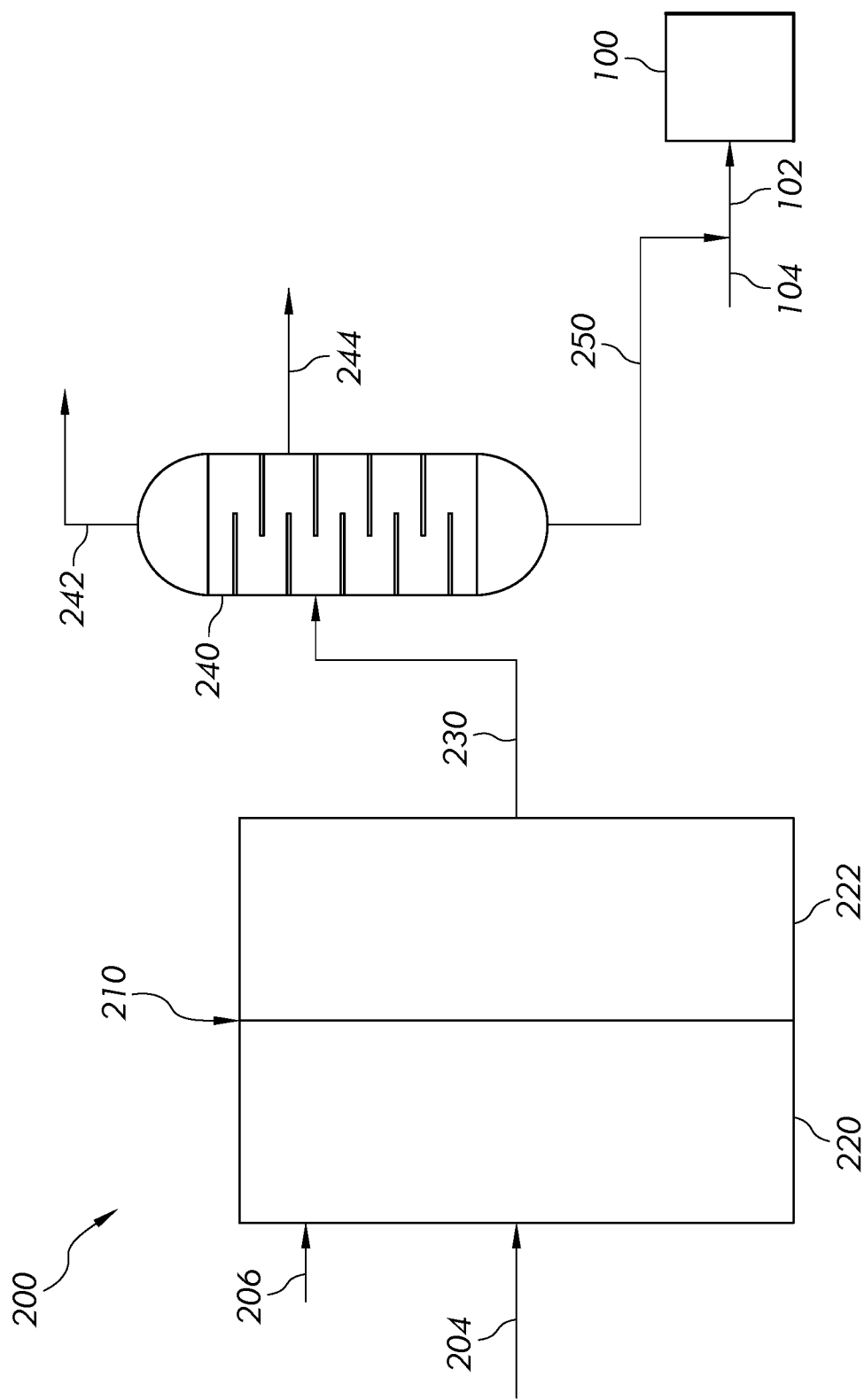
FIG. 2 schematically depicts a generalized flow diagram of a system for providing a pyrolysis oil feed, according to one or more embodiments shown and described in this disclosure.
Figure 3:
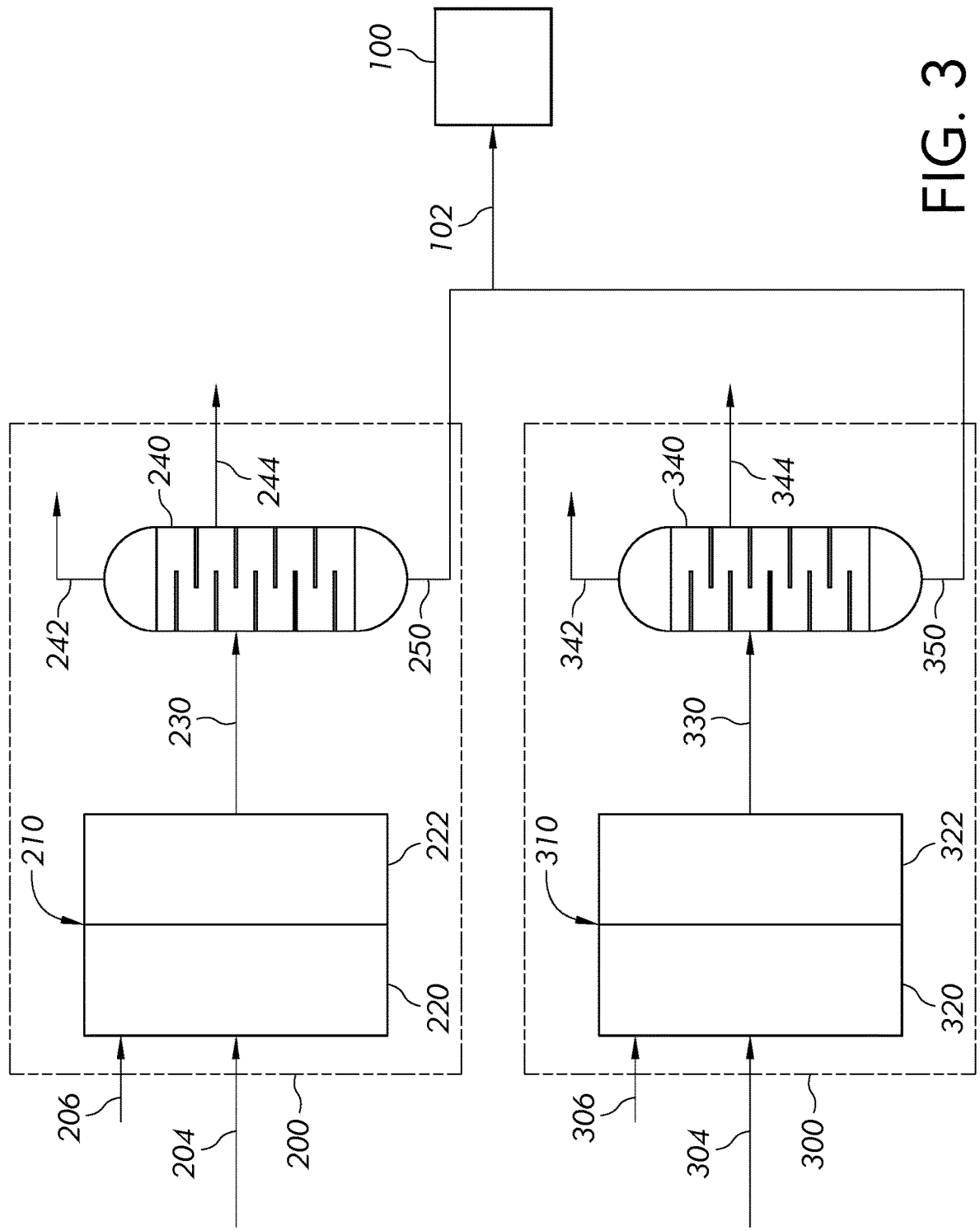
FIG. 3 schematically depicts a generalized flow diagram of another system for providing a pyrolysis oil feed, according to one or more embodiments shown and described in this disclosure.

The pyrolysis oil feed 102 may include a heavy pyrolysis oil 250. In embodiments, the pyrolysis oil feed 102 may also include a diluent 104, such as but not limited to a light pyrolysis oil, toluene, other light aromatic compounds, or combinations of these. Referring now to FIGS. 2 and 3, the heavy pyrolysis oil 250 may be a stream from a hydrocarbon processing facility that is rich in aromatic compounds, such as multi-ring aromatic compounds. In embodiments, the heavy pyrolysis oil 250 of the pyrolysis oil feed 102 may be a bottom stream from a liquid steam cracking process, such as a naphtha steam cracking system 200 in FIG. 2. As used in the present disclosure, "bottom stream" may refer to a residuum or a fraction of a stream introduced to a separation system (such as the feed to a steam cracking process) including the least volatile constituents that have not been separately captured as condensed vapor.

Figure 4:
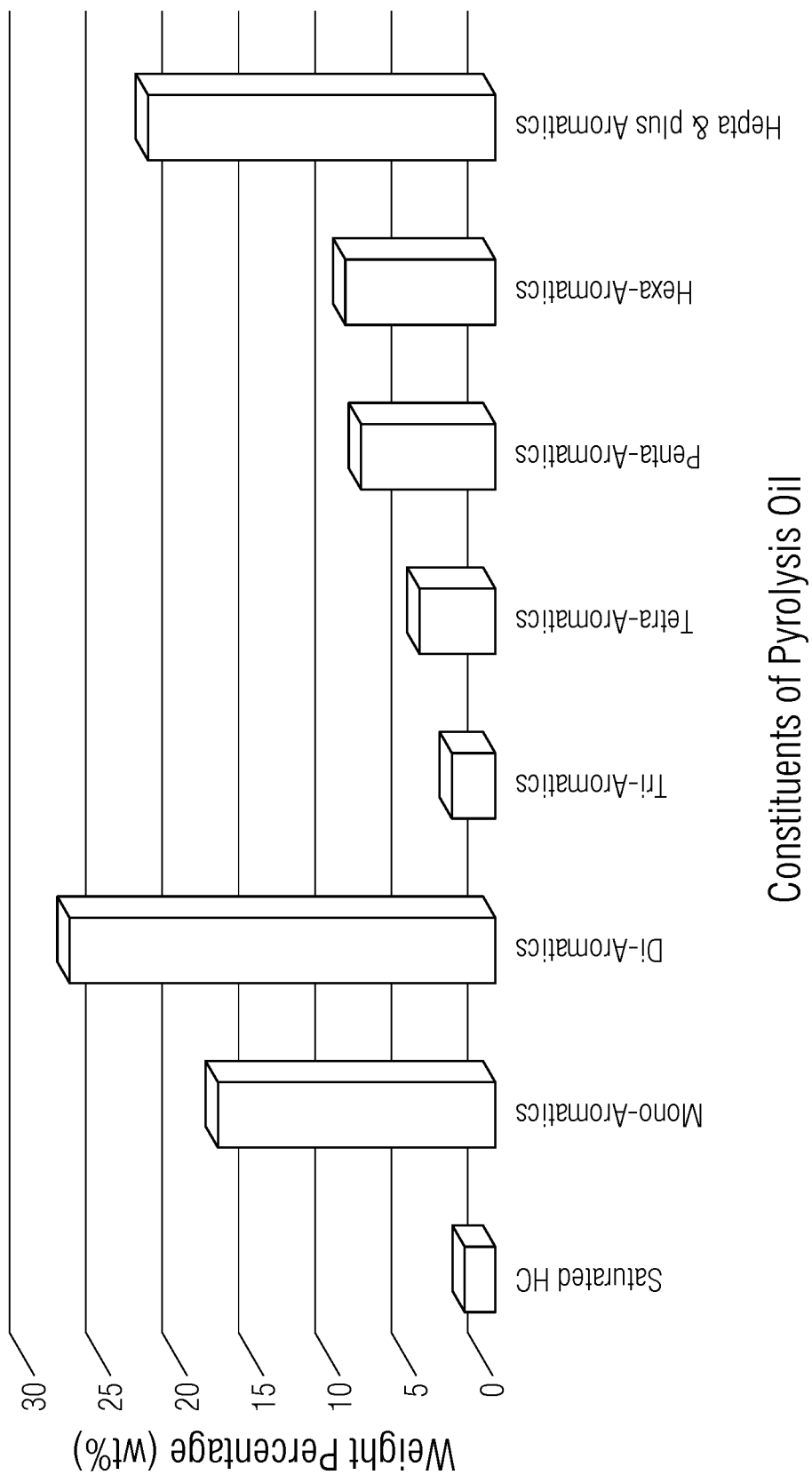
FIG. 4 graphically depicts the constituents of a heavy pyrolysis oil.

The heavy pyrolysis oil 250 of the pyrolysis oil feed 102 may include mono-aromatic compounds and multi-ring aromatic compounds. Multi-ring aromatic compounds may include aromatic compounds including 2, 3, 4, 5, 6, 7, 8, or more than 8 aromatic ring structures. Multi-ring aromatic compounds may include aromatic compounds including greater than or equal to sixteen carbon atoms. The heavy pyrolysis oil 250 of the pyrolysis oil feed 102 may also include other components, such as but not limited to saturated hydrocarbons. Referring now to FIG. 4, one exemplary embodiment of a composition of a typical heavy pyrolysis oil 250 that can be used in the pyrolysis oil feed 102 is graphically depicted. The heavy pyrolysis oil 250 provided in FIG. 4 is a pyrolysis oil produced from steam cracking naphtha. As shown in FIG. 4, the heavy pyrolysis oil 250 of the pyrolysis oil feed 102 may include mono-aromatics, di-aromatics, tri-aromatics, tetra-aromatics, penta-aromatics, and aromatic compounds having 6 or more aromatic rings (hexa & plus aromatics in FIG. 4). The heavy pyrolysis oil 250 of the pyrolysis oil feed 102 may include elevated concentrations of di-aromatic compounds and aromatic compounds having greater than or equal to 6 aromatic rings, as indicated by FIG. 4. In embodiments, the heavy pyrolysis oil 250 of the pyrolysis oil feed 102 that is rich in multi-ring aromatic compounds may include greater than or equal to 50 wt. % multi-ring aromatic compounds, such as greater than or equal to 60 wt. %, greater than or equal to 65 wt. %, greater than or equal to 70 wt. %, greater than or equal to 75 wt. %, or even greater than or equal to 80 wt. % multi-ring aromatic compounds based on a unit weight of the unit weight of the heavy pyrolysis oil 250 in the pyrolysis oil feed 102.

A significant portion of the heavy pyrolysis oil 250 in the pyrolysis oil feed 102 may be multi-ring aromatic compounds having greater than 16 carbon atoms or four or more aromatic rings. The heavy pyrolysis oil 250 may include greater than or equal to 30 wt. % multi-ring aromatic compounds having greater than or equal to sixteen carbon atoms, such as greater than or equal to 35 wt. %, greater than or equal to 40 wt. %, or even greater than or equal to 45 wt. % multi-ring aromatic compounds having greater than or equal to sixteen carbon atoms, where the weight percent (wt. %) is based on the unit weight of the heavy pyrolysis oil 250 in the pyrolysis oil feed 102. The heavy pyrolysis oil 250 may include greater than or equal to 30 wt. % multi-ring aromatic compounds having a boiling point temperature greater than or equal to 750 degrees Fahrenheit (° F.) (399° C.), such as greater than or equal to 35 wt. %, greater than or equal to 40 wt. %, or even greater than or equal to 45 wt. % multi-ring aromatic compounds having a boiling point temperature greater than or equal to 399° C., where the weight percent is based on the unit weight of the heavy pyrolysis oil 250 in the pyrolysis oil feed 102.

In embodiments, the heavy pyrolysis oil 250 may have a density at 15° C. of greater than or equal to 1.00 grams per cubic centimeter (g/cm$^3$), such as greater than or equal to 1.01 g/cm$^3$, greater than or equal to 1.02 g/cm$^3$, from 1.00 g/cm$^3$ to 1.20 g/cm$^3$, from 1.01 g/cm$^3$ to 1.10 g/cm$^3$, or from 1.02 g/cm$^3$ to 1.10 g/cm$^3$, as determined according to the test method in ASTM D5002. In embodiments, the heavy pyrolysis oil 250 may have a dynamic viscosity at 60° C. that is greater than or equal to 10 millipascal seconds (mPa*s), such as from 10 mPa*s to 20 mPa*s, or from 12 mPa*s to 15 mPa*s, where the dynamic viscosity is determined according to the test method in ASTM D7042. In embodiments, the heavy pyrolysis oil 250 may have a kinematic viscosity at 60° C. that is greater than or equal to 10 square millimeters per second (mm$^2$/s), such as greater than or equal to 12 mm$^2$/s, from 10 mm$^2$/s to 20 mm$^2$/s, from 10 mm$^2$/s to 15 mm$^2$/s, from 12 mm$^2$/s to 20 mm$^2$/s, or from 12 mm$^2$/s to 15 mm$^2$/s, as determined according to the test methods in ASTM D7042.

In embodiments, the heavy pyrolysis oil 250 may have an initial boiling point temperature (IBP) of greater than or equal to 150° C., such as from 150° C. to 200° C., or from 150° C. to 180° C., as determined according to the test methods in ASTM D2887. In embodiments, the heavy pyrolysis oil 250 may have a final boiling point temperature (FBP) of greater than or equal to 500° C., such as greater than or equal to 600° C., greater than or equal to 650° C., greater than or equal to 700° C., from 500° C. to 1000° C., from 500° C. to 900° C., from 500° C. to 800° C., from 600° C. to 1000° C., from 600° C. to 900° C., from 600° C. to 800° C., from 650° C. to 1000° C., from 650° C. to 900° C., from 650° C. to 800° C., from 700° C. to 1000° C., from 700° C. to 900° C., or from 700° C. to 800° C., as determined according to the test methods in ASTM D2887 and ISO test method EN 15199-1-3. In embodiments, the heavy pyrolysis oil 250 may have a 50% boiling point temperature of from 300° C. to 500° C., such as from 300° C. to 450° C., from 300° C. to 400° C., from 300° C. to 380° C., from 325° C. to 500° C., from 325° C. to 450° C. from 325° C. to 400° C., from 325° C. to 380° C., from 350° C. to 500° C., from 350° C. to 450° C., from 350° C. to 400° C., or from 350° C. to 380° C., as determined according to the test methods in ASTM D2887.

The heavy pyrolysis oil 250 of the pyrolysis oil feed 102 may also have a low concentration of sulfur and sulfur compounds. The heavy pyrolysis oil 250 of the pyrolysis oil feed 102 may have a concentration of sulfur and sulfur-containing compounds of less than or equal to 1000 parts per million by weight (ppmw), such as less than or equal to 500 ppmw, less than or equal to 400 ppmw, or even less than or equal to 300 ppmw, as determined according to the test methods in ASTM D2622. In embodiments, the heavy pyrolysis oil 250 may have a concentration of sulfur and sulfur-containing compounds of from greater than 0 (zero) ppmw to 1000 ppmw, such as from 300 ppmw to 1000 ppmw, or from 300 ppmw to 500 ppmw. In embodiments, the heavy pyrolysis oil 250 may have a concentration of iron, nickel, or both of less than or equal to 100 ppmw, less than or equal to 50 ppmw, or less than or equal to 20 ppmw, as determined according to the test methods in ASTM D2622. Properties for an exemplary embodiment of a heavy pyrolysis oil 250 obtained from steam cracking of naphtha is provided in Table 1.

TABLE 1

| Feed | Light Pyrolysis Oil | Heavy Pyrolysis Oil | 80/20 Heavy/Light Blend | Test Method |
|---|---|---|---|---|
| Density 15° C. (g/cm$^3$) | 0.9484 | 1.0375 | 1.0165 | ASTM D5002 |
| S/N Analysis (grav)_c(N)[mg/kg] | 56.4 | 16.7 | 17.1 | ASTM D4629 |
| S/N Analysis (grav)_c(S)[mg/kg] | 271.6 | 475.3 | 422.6 | ASTM D5453 |
| Dynamic Viscosity [mPa * s] | 1.272 | 13.797 | 6.867 | ASTM D7042 |
| Kinematic Viscosity [mm$^2$/s] | 1.389 | 13.684 | 6.952 | ASTM D7042 |
| Viscosity_Temperature [° C.] | 60 | 60 | 60 | N/A |
| SIMDIST analysis_IBP [° C.] | 78.3 | 165.6 | 135.9 | ASTM D2887* |
| SIMDIST analysis_5% [° C.] | 146.7 | 188.9 | 175.4 | ASTM D2887 |
| SIMDIST analysis_10% [° C.] | 162.8 | 209.4 | 179.7 | ASTM D2887 |
| SIMDIST analysis_20% [° C.] | 179.4 | 230 | 196.8 | ASTM D2887 |
| SIMDIST analysis_30% [° C.] | 188.3 | 265 | 204.1 | ASTM D2887 |
| SIMDIST analysis_40% [° C.] | 189.4 | 306.7 | 218.2 | ASTM D2887 |
| SIMDIST analysis_50% [° C.] | 190 | 378.9 | 242.3 | ASTM D2887 |
| SIMDIST analysis_60% [° C.] | 194.4 | 463.9 | 297.5 | ASTM D2887 |
| SIMDIST analysis_70% [° C.] | 203.9 | 527.2 | 381.2 | ASTM D2887 |
| SIMDIST analysis_80% [° C.] | 210 | 578.9 | 494.3 | ASTM D2887 |
| SIMDIST analysis_90% [° C.] | 256.1 | 641.1 | 583.7 | ASTM D2887 |
| SIMDIST analysis_95% [° C.] | 265.6 | 686.7 | 640.6 | ASTM D2887 |
| SIMDIST analysis_FBP [° C.] | 361.1 | 721.1 | 711.9 | ASTM 2887** |
| S [ppm] (XRF) | 251.4 | 455.7 | 414 | ASTM D2622 |
| Fe [ppm] (XRF) | 0 | 12.8 | 10 | ASTM D2622 |
| Ni [ppm] (XRF) | 0.2 | 0.6 | 0.5 | ASTM D2622 |

*Test method ASTM D2887 was performed using a 6 dual tower gas chromatograph from Agilent Technologies, Inc.
**ISO test method EN 15199-1-3 was used to recovery constituents having boiling points greater than or equal to 750° C.

As previously discussed, in embodiments, the pyrolysis oil feed 102 may include a diluent 104 (such as a light aromatic stream). Due to the high viscosity (dynamic viscosity>10 mPa*s or kinematic viscosity>10 mm$^2$/s) of the heavy pyrolysis oil 250, the diluent 104 may be added to increase the fluidity of the pyrolysis oil feed 102. The inclusion of the diluent 104 in the pyrolysis oil feed 102 may allow the pyrolysis oil feed 102 to have increased contact with the surfaces of the treating catalyst 119 and the mixed metal oxide catalyst 112 in the first fixed-bed reactor 110. The diluents 104 may include but are not limited to a light pyrolysis oil, benzene, mixed xylenes, toluene, ethylbenzene, or combinations of these. As depicted in FIG. 3, in embodiments, the diluent 104 may comprise a light pyrolysis oil 350 derived from the bottoms stream of a hydrocarbon gas steam cracker.

The properties of a diluent 104 comprising light pyrolysis oil 350 from a hydrocarbon gas steam cracking system is provided in Table 1. In embodiments, the light pyrolysis oil 350 may have a density at 15° C. of less than 0.98 g/cm$^3$, such as less than or equal to 0.97 g/cm$^3$, less than or equal to 0.96 g/cm$^3$, from 0.92 g/cm$^3$ to 0.978 g/cm$^3$, or from 0.92 g/cm$^3$ to 0.97 g/cm$^3$, as determined from the test method in ASTM D5002. In embodiments, the light pyrolysis oil 350 may have a dynamic viscosity at 60° C. that is less than or equal to 5 millipascal seconds (mPa*s), such as less than or equal to 4 mPa*s, from 0.5 mPa*s to 5 mPa*s, from 1 mPa*s to 4 mPa*s, or from 1 mPa*s to 2 mPa*s, where the dynamic viscosity is determined according to the test method in ASTM D7042. In embodiments, the light pyrolysis oil 350 may have a kinematic viscosity at 60° C. that is less than or equal to 5 square millimeters per second (mm$^2$/s), such as less than or equal to 4 mm$^2$/s, less than or equal to 2 mm$^2$/s, from 0.5 mm$^2$/s to 5 mm$^2$/s, from 0.5 mm$^2$/s to 4 mm$^2$/s, from 1 mm$^2$/s to 5 mm$^2$/s, or from 1 mm$^2$/s to 2 mm$^2$/s, as determined according to the test methods in ASTM D7042.

In embodiments, the light pyrolysis oil 350 may have an initial boiling point temperature (IBP) of less than or equal to 120° C., such as less than 100° C., from 40° C. to 120° C., or from 50° C. to 100° C., as determined according to the test methods in ASTM D2887. In embodiments, the light pyrolysis oil 350 may have a final boiling point temperature (FBP) of less than 500° C., such as less than or equal to 450° C., less than or equal to 400° C., from 250° C. to less than 500° C., from 250° C. to 450° C., from 250° C. to 400° C., from 300° C. to less than 500° C., from 300° C. to 475° C., from 300° C. to 450° C., or from 300° C. to 400° C., as determined according to the test methods in ASTM D2887. In embodiments, the light pyrolysis oil 350 may have a 50% boiling point temperature of less than 230° C., such as from 150° C. to 230° C., from 150° C. to 225° C., from 150° C. to 200° C., from 175° C. to 230° C., from 175° C. to 225° C., from 175° C. to 200° C., from 180° C. to 230° C., from 180° C. to 225° C., or from 180° C. to 200° C., as determined according to the test methods in ASTM D2887.

The light pyrolysis oil 350 of the pyrolysis oil feed 102 may also have a low concentration of sulfur and sulfur compounds. The light pyrolysis oil 350 may have a concentration of sulfur and sulfur-containing compounds of less than or equal to 500 parts per million by weight (ppmw), such as less than or equal to 400 ppmw, or even less than or equal to 300 ppmw, as determined according to the test methods in ASTM D2622. In embodiments, the light pyrolysis oil 350 may have a concentration of sulfur and sulfur-containing compounds of from greater than 0 (zero) ppmw to 500 ppmw, such as from 1 ppmw to 500 ppmw, from 1 ppmw to 400 ppmw, or from 1 to 300 ppmw. In embodiments, the light pyrolysis oil 350 may have a concentration of iron, nickel, or both of less than or equal to 100 ppmw, less than or equal to 50 ppmw, less than or equal to 20 ppmw, or even less than or equal to 10 ppmw, such as greater than or equal to 0 (zero) ppmw to less than or equal to 100 ppmw, as determined according to the test methods in ASTM D2622. Properties for an exemplary embodiment of a light pyrolysis oil 350 obtained from steam cracking of a light hydrocarbon gas stream is provided in Table 1.

The pyrolysis oil feed 102 may include from 10 wt. % to 90 wt. % diluent 104 based on the total weight of the pyrolysis oil feed 102. The diluent 104 may comprise at least 50 wt. %, at least 60 wt. %, at least 70 wt. %, at least 80 wt. %, at least 90 wt. %, at least 95 wt. %, or even at least 99 wt. % of aromatic hydrocarbons having from 6-8 carbon atoms, on the basis of the total hydrocarbon weight of the diluent 104. In embodiments, the diluent 104 consists essentially of aromatic hydrocarbons having from 6-8 carbon atoms, such as benzene, toluene xylene, and combinations of these. The pyrolysis oil feed 102 may include from 10 wt. % to 80 wt. %, from 10 wt. % to 70 wt. %, from 10 wt. % to 60 wt. %, from 10 wt. % to 40 wt. %, from 10 wt. % to 30 wt. %, from 10 wt. % to 20 wt. %, from 15 wt. % to 90 wt. %, from 15 wt. % to 75 wt. %, from 15 wt. % to 60 wt. %, from 15 wt. % to 45 wt. %, from 15 wt. % to 30 wt. %, from 15 wt. % to 25 wt. %, or any subset thereof of the diluent 104 based on the total weight of the pyrolysis oil feed 102. In embodiments, heavy pyrolysis oil 250 may be mixed with the diluent 104 (such as light pyrolysis oil 350) in a mixing unit (not shown) upstream of the first fixed-bed reactor 110 to produce the pyrolysis oil feed 102, which may then be passed to the first fixed-bed reactor 110. In embodiments, the pyrolysis oil feed 102 may not include a diluent added to the heavy pyrolysis oil 250 upstream of the first fixed-bed reactor 110. However, in these embodiments, the pyrolysis oil feed 102 may still include toluene, xylene, or benzene that may be carried through from the process producing the heavy pyrolysis oil 250.

In embodiments, the pyrolysis oil feed 102 may comprise at least 50 wt. %, such as at least 60 wt. %, at least 70 wt. %, at least 80 wt. %, at least 90 wt. %, at least 95 wt. %, at least 99 wt. %, from 10 wt. % to 100 wt. %, from 50 wt. % to 100 wt. %, from 50 wt. % to 99 wt. %, from 60 wt. % to 99 wt. %, from 75 wt. % to 99 wt. %, from 75 wt. % to 90 wt. %, from 75 wt. % to 85 wt. %, or any subset thereof, of the heavy pyrolysis oil 250. In embodiments, the pyrolysis oil feed 102 may comprise from 75 wt. % to 85 wt. % of the heavy pyrolysis oil 250 and from 15 wt. % to 25 wt. % of the diluent 104 (such as a light pyrolysis oil 350). In embodiments, the pyrolysis oil feed 102 may comprise 80 wt. % of the heavy pyrolysis oil 250 and 20 wt. % of the diluent 104, where the diluent 104 comprises the light pyrolysis oil 350, toluene, benzene, xylenes, ethylbenzene, or combinations of these diluents. The pyrolysis oil feed 102 may comprise greater than or equal to 30 weight percent (wt. %), such as greater than or equal to 35 wt. %, greater than or equal to 40 wt. %, greater than or equal to 40 wt. %, greater than or equal to 45 wt. %, or greater than or equal to 50 wt. % multi-ring aromatic compounds having greater than or equal to sixteen carbon atoms based on the total weight of the pyrolysis oil in the pyrolysis oil feed.

In embodiments, the pyrolysis oil feed 102 comprising a mixture of the heavy pyrolysis oil 250 and the light pyrolysis oil 350 as the diluent 104 may have a density at 15° C. of from 0.98 g/cm$^3$ to 1.03 g/cm$^3$, such as from 0.98 g/cm$^3$ to 1.02 g/cm$^3$, from 1.00 g/cm$^3$ to 1.03 g/cm$^3$, or from 1.00 g/cm$^3$ to 1.02 g/cm$^3$, as determined from the test method in ASTM D5002. In embodiments, the pyrolysis oil feed 102 comprising a mixture of the heavy pyrolysis oil 250 and the light pyrolysis oil 350 as the diluent 104 may have a dynamic viscosity at 60° C. that is from 5 mPa*s to 10 mPa*s, from greater than 5.0 mPa*s to less than 10.0 mPa*s, from 5.0 mPa*s to 9.5 mPa*s, from 5.0 mPa*s to 9.0 mPa*s, from 5.5 mPa*s to 10.0 mPa*s, from 5.5 mPa*s to 9.5 mPa*s, from 5.5 mPa*s to 9.0 mPa*s, from 6.0 mPa*s to 10.0 mPa*s, from 6.0 mPa*s to 9.5 mPa*s, or from 6.0 mPa*s to 9.0 mPa*s, where the dynamic viscosity is determined according to the test method in ASTM D7042. In embodiments, the pyrolysis oil feed 102 comprising a mixture of the heavy pyrolysis oil 250 and the light pyrolysis oil 350 as the diluent 104 may have a kinematic viscosity at 60° C. that is from 5.0 mm$^2$/s to 10.0 mm$^2$/s, such as from 5.0 mm$^2$/s to 9.5 mm$^2$/s, from 5.0 mm$^2$/s to 9.0 mm$^2$/s, from 5.5 mm$^2$/s to 10 mm$^2$/s, from 5.5 mm$^2$/s to 9.5 mm$^2$/s, from 5.5 mm$^2$/s to 9.0 mm$^2$/s, from 6.0 mm$^2$/s to 10.0 mm$^2$/s, from 6.0 mm$^2$/s to 9.5 mm$^2$/s, or from 6.0 mm$^2$/s to 9.0 mm$^2$/s, as determined according to the test methods in ASTM D7042.

In embodiments, the pyrolysis oil feed 102 comprising a mixture of the heavy pyrolysis oil 250 and the light pyrolysis oil 350 as the diluent 104 may have an initial boiling point temperature (IBP) of from 120° C. to 150° C., such as from 120° C. to 145° C., from 125° C. to 150° C., or from 125° C. to 145° C., as determined according to the test methods in ASTM D2887. In embodiments, the pyrolysis oil feed 102 comprising a mixture of the heavy pyrolysis oil 250 and the light pyrolysis oil 350 as the diluent 104 may have a final boiling point temperature (FBP) of greater than or equal to 500° C., such as greater than or equal to 600° C., greater than or equal to 650° C., greater than or equal to 700° C., from 500° C. to 1000° C., from 500° C. to 900° C., from 500° C. to 800° C., from 600° C. to 1000° C., from 600° C. to 900° C., from 600° C. to 800° C., from 650° C. to 1000° C., from 650° C. to 900° C., from 650° C. to 800° C., from 700° C. to 1000° C., from 700° C. to 900° C., or from 700° C. to 800° C., as determined according to the test methods in ASTM D2887. In embodiments, the pyrolysis oil feed 102 comprising a mixture of the heavy pyrolysis oil 250 and the light pyrolysis oil 350 as the diluent 104 may have a 50% boiling point temperature of from 200° C. to 300° C., from 200° C. to 290° C., from 200° C. to 275° C., from 225° C. to 300° C., from 225° C. to 290° C., from 225° C. to 275° C., from 240° C. to 300° C., from 240° C. to 290° C., or from 240° C. to 275° C., as determined according to the test methods in ASTM D2887.

The pyrolysis oil feed 102 comprising a mixture of the heavy pyrolysis oil 250 and the light pyrolysis oil 350 as the diluent 104 may also have a low concentration of sulfur and sulfur compounds. The pyrolysis oil feed 102 comprising a mixture of the heavy pyrolysis oil 250 and the light pyrolysis oil 350 as the diluent 104 may have a concentration of sulfur and sulfur-containing compounds of less than or equal to 500 parts per million by weight (ppmw), such as less than or equal to 400 ppmw, or even less than or equal to 300 ppmw, as determined according to the test methods in ASTM D2622. In embodiments, the pyrolysis oil feed 102 comprising a mixture of the heavy pyrolysis oil 250 and the light pyrolysis oil 350 as the diluent 104 may have a concentration of sulfur and sulfur-containing compounds of from greater than 0 (zero) ppmw to 500 ppmw, such as from 1 ppmw to 500 ppmw, from 1 ppmw to 400 ppmw, or from 1 to 300 ppmw. In embodiments, the pyrolysis oil feed 102 comprising a mixture of the heavy pyrolysis oil 250 and the light pyrolysis oil 350 as the diluent 104 may have a concentration of iron, nickel, or both of less than or equal to 100 ppmw, less than or equal to 50 ppmw, less than or equal to 20 ppmw, or even less than or equal to 10 ppmw, such as greater than or equal to 0 (zero) ppmw to less than or equal to 100 ppmw, as determined according to the test methods in ASTM D2622. In embodiments, the pyrolysis oil feed 102 comprising a mixture of the heavy pyrolysis oil 250 and the light pyrolysis oil 350 as the diluent 104 has the properties and composition provided in Table 1. Referring again to FIG. 1, in embodiments, the pyrolysis oil feed 102 may further comprise a bottom recycle stream 150 from the separation unit 140 disposed downstream of the second fixed-bed reactor 120.

Referring again to FIG. 2, a naphtha steam cracking system 200 for producing the heavy pyrolysis oil may comprise a naphtha steam cracking unit 210 upstream of the first fixed-bed reactor 110 of system 100. The naphtha steam cracking unit 210 may provide at least a portion of the pyrolysis oil feed 102. In embodiments, a naphtha feed stream 204 may be passed to a naphtha steam cracking unit 210. The naphtha feed stream 204 may comprise hydrocarbons having boiling point temperatures in the naphtha range of from 30° C. to 225° C. The naphtha feed stream 204 may include hydrocarbons having from 5 to 12 carbon atoms. While FIG. 2 represents one embodiment of a naphtha steam cracking unit 210, other configurations of steam cracking units are contemplated. The naphtha steam cracking unit 210 may include a convection zone 220 and a pyrolysis zone 222. The naphtha feed stream 204 may pass into the convection zone 220 along with steam 206. In the convection zone 220, the mixture comprising the naphtha and steam may be pre-heated to a desired temperature. The contents of the convection zone 220 may then be passed to the pyrolysis zone 222 where hydrocarbons from the naphtha feed stream 204 are steam-cracked. The steam cracked naphtha effluent stream 230 may exit the naphtha steam cracking unit 210 and be passed through a separation unit 240. The steam cracked naphtha effluent stream 230 may include a mixture of cracked hydrocarbon-based materials, which may be separated into one or more petrochemical products included in one or more system product streams. The separation unit 240 may be any unit operation or plurality of unit operations capable of separating a heavy pyrolysis oil 250 from a gaseous stream 242. In embodiments, the separation unit 240 may further be operable to separate at least one olefin product stream 244 from the gaseous stream 242 and the heavy pyrolysis oil 250. The heavy pyrolysis oil 250 may form all or a portion of the pyrolysis oil feed 102.

According to embodiments, the pyrolysis zone 222 may operate at a temperature of from 750° C. to 1000° C. or from 800° C. to 950° C. The pyrolysis zone 222 may operate with a residence time of from 0.05 seconds to 2 seconds. The mass ratio of steam 206 to the naphtha feed stream 204 may be from about 0.3:1 to about 2:1.

Referring now to FIG. 3, the heavy pyrolysis oil 250 from the naphtha steam cracking system 200 may be combined with a light pyrolysis oil 350 from a gas steam cracking system 300 upstream of the system 100. The naphtha steam cracking system 200 and the gas steam cracking system 300 may be operated in parallel and may both be disposed upstream of the first fixed-bed reactor 110 of the system 100. The naphtha steam cracking system 200 may have any of the features or characteristics previously discussed in the present disclosure for the naphtha steam cracking system 200. The gas steam cracking system 300 may comprise a gas steam cracking unit 310. In embodiments, a gas feed stream 304 may be passed to the gas steam cracking unit 310. The gas feed stream 304 may comprise hydrocarbons having boiling point temperatures less than or equal to 50° C., or less than or equal to 30° C. The gas feed stream 304 may include hydrocarbons having less than or equal to 5 carbon atoms, or less than or equal to 4 carbon atoms. The gas steam cracking unit 310 may include a convection zone 320 and a pyrolysis zone 322. The gas feed stream 304 may pass into the convection zone 320 along with steam 306. In the convection zone 320, the mixture comprising the gas feed stream 304 and steam 306 may be pre-heated to a desired temperature. The contents of the convection zone 320 may then be passed to the pyrolysis zone 322 where it is steam-cracked. The gas steam cracker effluent stream 330 may exit the gas steam cracking unit 310 and be passed through a separation unit 340. The gas steam cracker effluent stream 330 may include a mixture of cracked hydrocarbon-based materials, which may be separated into one or more petrochemical products included in one or more system product streams. The separation unit 340 may be any unit operation or plurality of unit operations capable of separating the gas steam cracker effluent stream 330 into a light gas stream 342, the at least one product stream 344 and the light pyrolysis oil 350. In embodiments, the at least one product stream 344 may be an olefin product stream. The light pyrolysis oil 350 may be combined with the heavy pyrolysis oil 250 to form pyrolysis oil feed 102.

According to one or more embodiments, the pyrolysis zone 322 may operate at a temperature of from 750° C. to 1000° C. or from 800° C. to 950° C. The pyrolysis zone 322 may operate with a residence time of from 0.05 seconds to 2 seconds. The mass ratio of steam 306 to the gas feed stream 304 may be from about 0.3:1 to about 2:1. While FIGS. 2 and 3 represent some embodiments of a naphtha steam cracking system 200 and gas steam cracking system 300, other configurations of steam cracking units are contemplated for producing the heavy pyrolysis oil 250, light pyrolysis oil 350, or combinations of these, such as but not limited to steam cracking systems for steam cracking crude oil, light hydrocarbon gas streams, gas condensates, atmospheric residues, vacuum distillation residues, vacuum gas oils, or other heavy oils.

Referring again to FIG. 1, the pyrolysis oil feed 102 may be passed to the first fixed-bed reactor 110. The first fixed-bed reactor 110 may be operable to contact the pyrolysis oil feed 102 with hydrogen 116 in the presence of the treating catalyst 119 in the first catalyst bed 111 and then in the presence of the mixed metal oxide catalyst 112 in the second catalyst bed 115 to produce the intermediate stream 118. Contacting the pyrolysis oil feed 102 with hydrogen 116 in the presence of the treating catalyst 119 and then in the presence of the mixed metal oxide catalyst 112 may convert at least a portion of the multi-ring aromatic compounds in the pyrolysis oil feed 102 to di-aromatic, tri-aromatic compounds, or both. The hydrogen 116 may include a recycled hydrogen stream or supplemental hydrogen from an external hydrogen source inside or outside the battery limits of the refinery. The hydrogen 116 may be passed directly to the first fixed-bed reactor 110 or may be combined with the pyrolysis oil feed 102 upstream of the first fixed-bed reactor 110. The hydrogen 116 may be used to pressurize the first fixed-bed reactor 110 to the operating pressure.

The first fixed-bed reactor 110 is a fixed-bed reactor comprising at least a first catalyst bed 111 and a second catalyst bed 115. The second catalyst bed 115 may include a packed bed of the mixed metal oxide catalyst 112. The hydrogen may be in co-current flow or counter-current flow with the pyrolysis oil feed 102. In embodiments, the hydrogen may be in co-current flow with the pyrolysis oil feed 102. For example, the hydrogen may be entrained with the flowing pyrolysis oil feed 102. In embodiments, the hydrogen may be in counter-current flow, such as by being permeated or bubbled up through the first fixed-bed reactor 110 as the pyrolysis oil feed 102 flows downward through the first fixed-bed reactor 110. The first fixed-bed reactor 110 may be a continuous reactor. In embodiments, the first fixed-bed reactor 110 may comprise one or a plurality fixed-bed reactors. When the first fixed-bed reactor 110 comprises a plurality of fixed-bed reactors, the plurality of fixed-bed reactors may be operated in series, in parallel, or a combination thereof. In embodiments, the first fixed-bed reactor 110 may include a plurality of fixed-bed reactors in parallel, each first fixed-bed reactor 110 comprising a first catalyst bed 111 and a second catalyst bed 115.

Referring to FIG. 1, the first catalyst bed 111 comprises the treating catalyst 119. The treating catalyst 119 can be a first treating catalyst 113, a second treating catalyst 114, or combinations of these catalysts. The first catalyst bed 111 may comprise at least 50 wt. %, such as at least 60 wt. %, at least 70 wt. %, at least 80 wt. %, at least 90 wt. %, at least 95 wt. %, at least 99 wt. %, or at least 99.9 wt. % of the treating catalyst 119, on the basis of the total weight of catalyst in the first catalyst bed 111.

The first treating catalyst 113 may comprise metal atoms including aluminum atoms, silicon atoms, molybdenum, nickel atoms, phosphorous atoms, or combinations of these. In embodiments, the metal atoms may be in oxide form ($Al_2O_3$, $MoO$, $NiO$, and $P_4O_6$). In embodiments, the first treating catalyst 113 may comprise from 52 wt. % to 74.5 wt. % of $Al_2O_3$. In embodiments, the first treating catalyst 113 may comprise from 10 wt. % to 15 wt. % of $MoO$. In embodiments, the first treating catalyst 113 may comprise from 3 wt. % to 5 wt. % of $NiO$. In embodiments, the first treating catalyst 113 may comprise from 0.5 wt. % to 3 wt. % of $P_4O_6$. In embodiments, the first treating catalyst 113 may comprise a binder, such as from 15 wt. % to 25 wt. % of the binder. The binder may comprise Bohemite, clay, colloidal silica, or combinations of these binders. In embodiments, the first treating catalyst 113 may comprise from 52 wt. % to 74.5 wt. % of $Al_2O_3$, from 15 wt. % to 25 wt. % of binder, from 10 wt. % to 15 wt. % of $MoO$, from 3 wt. % to 5 wt. % of $NiO$, and from 0.5 wt. % to 3 wt. % of $P_4O_6$, on the basis of the total metal oxide weight of the first treating catalyst. The weight percentages of the components of the first treating catalyst 113 are calculated on the total weight of the first treating catalyst 113.

The second treating catalyst 114 may comprise metal atoms including aluminum atoms, silicon atoms, zirconium atoms, nickel atoms, tungsten atoms, or combinations of these. In embodiments, the metal atoms may be in oxide form ($Al_2O_3$, $SiO_2$, $ZrO_2$, $NiO$, and $WO_3$). In embodiments, the second treating catalyst 114 may comprise from 18.5 wt. % to 21.5 wt. % of $Al_2O_3$. In embodiments, the second treating catalyst 114 may comprise from 36.5 wt. % to 39.5 wt. % of $SiO_2$. In embodiments, the second treating catalyst 114 may comprise from 9.2 wt. % to 10.2 wt. % of $ZrO_2$. In embodiments, the second treating catalyst 114 may comprise from 10.5 wt. % to 11.5 wt. % of $NiO$. In embodiments, the second treating catalyst 114 may comprise from 18.5 wt. % to 21.5 wt. % of $WO_3$. In embodiments, the second treating catalyst 114 may comprise from 18.5 wt. % to 21.5 wt. % of $Al_2O_3$, from 36.5 wt. % to 39.5 wt. % of $SiO_2$, from 9.2 wt. % to 10.2 wt. % of $ZrO_2$, from 10.5 wt. % to 11.5 wt. % of $NiO$, and from 18.5 wt. % to 21.5 wt. % of $WO_3$. The weight percentages of the components of the second treating catalyst are calculated on the total weight of the second treating catalyst 114.

The treating catalyst 119 may comprise the first treating catalyst 113, the second treating catalyst 114, or a combination thereof. In embodiments, the treating catalyst 119 may comprise at least 50 wt. %, at least 60 wt. %, at least 70 wt. %, at least 80 wt. %, at least 90 wt. %, or at least 95 wt. % of the first treating catalyst 113, on the basis of the total weight of the treating catalyst 119. In embodiments, the treating catalyst 119 may comprise at least 50 wt. %, at least 60 wt. %, at least 70 wt. %, at least 80 wt. %, at least 90 wt. %, or at least 95 wt. % of the second treating catalyst 114, on the basis of the total weight of the treating catalyst 119. In embodiments, the treating catalyst 119 may comprise at least 40 wt. %, at least 50 wt. %, at least 60 wt. % at least 70 wt. %, at least 80 wt. %, at least 90 wt. %, at least 95 wt. %, or at least 99 wt. % of the combination of the first treating catalyst 113 and the second treating catalyst 114, on the basis of the total weight of the treating catalyst 119.

Generally, it is believed that the first catalyst bed 111 comprising the treating catalyst 119, upstream of the second catalyst bed 115, may help to protect the second catalyst bed 115 from the formation of excess coke and resultant plugging. Without being limited by theory, it is believed that the first catalyst bed 111 comprising the treating catalyst 119, upstream of the second catalyst bed 115, may protect the second catalyst bed 115 from plugging by saturating olefins under less severe (e.g., lower temperature) conditions than are experienced in the second catalyst bed 115.

The reaction mixture may then pass from the first catalyst bed 111 comprising the treating catalyst 119 to the second catalyst bed 115 comprising the mixed metal oxide catalyst 112. The mixed metal oxide catalyst 112 may be catalytically active to convert multi-ring aromatic compounds having greater than or equal to sixteen carbon atoms in the pyrolysis oil feed 102 to di-aromatic compounds, tri-aromatic compounds, or combinations thereof. The mixed metal oxide catalyst 112 may comprise a plurality of mixed metal oxide (MMO) particles. Each of the plurality of MMO particles may include a plurality of metal oxides that are different from one another. The plurality of metal oxides of the MMO particles may include oxides of metals in groups 3-13 of the International Union of Pure and Applied Chemistry (IUPAC) periodic table. In embodiments, the plurality of metal oxides of the MMO particles may include combinations of oxides of iron, zirconium, cerium, aluminum, tungsten, molybdenum, and titanium. The MMO particles may also include oxides of metalloids, such as oxides of silicon. The MMO particles may comprise oxides of metals or metalloids selected from the group consisting of iron oxide ($Fe_2O_3$), zirconium oxide ($ZrO_2$), cerium oxide ($CeO_2$), aluminum oxide (alumina) ($Al_2O_3$), silica ($SiO_2$), tungsten oxide ($WO_3$), molybdenum oxide ($MoO_3$), titanium oxide ($TiO_2$), and combinations of these metal oxides.

The MMO particles of the mixed metal oxide catalyst 112 may include iron oxide as one of the plurality of metal oxides. In embodiments, the MMO particles may include from 60 wt. % to 95 wt. % iron oxide, such as from 70 wt. % to 90 wt. %, from 75 wt. % to 85 wt. %, or from 80 wt. % to 85 wt. % iron oxide. The MMO particles may include zirconium oxide as one of the plurality of metal oxides. In embodiments, the MMO particles may include from 1 wt. % to 20 wt. % zirconium oxide, such as from 1 wt. % to 15 wt. %, from 2.5 wt. % to 12.5 wt. %, or from 5 wt. % to 10 wt. % zirconium oxide. The MMO particles may include cerium oxide as one of the plurality of metal oxides. In embodiments, the MMO particles may include from 0.1 wt. % to 10 wt. % cerium oxide, such as from 0.5 wt. % to 7.5 wt. %, from 0.5 wt. % to 5 wt. %, or from 1 wt. % to 5 wt. % cerium oxide. The MMO particles may include aluminum oxide (alumina) as one of the plurality of metal oxides. In embodiments, the MMO particles may include from 1 wt. % to 20 wt. % aluminum oxide (alumina), such as from 2.5 wt. % to 15 wt. %, from 3 wt. % to 12.5 wt. %, or from 5 wt. % to 10 wt. % alumina. The weight percentages of the plurality of metal oxides of the MMO particles are based on the total weight of the MMO particles. The MMO particles may comprise, consist of, or consist essentially of from 60 wt. % to 95 wt. % iron oxide, from 1 wt. % to 20 wt. % zirconium oxide, from 0.1 wt. % to 10 wt. % cerium oxide, and from 1 wt. % to 20 wt. % aluminum oxide (alumina). In embodiments, the MMO particles may include 83 wt. % iron oxide, 7.5 wt. % zirconium oxide, 2.5 wt. % cerium oxide, and 7.0 wt. % aluminum oxide (alumina). In embodiments, the MMO particles do not include silica. In embodiments, the MMO particles may include the plurality of metal oxides mixed and fused or agglomerated together to form the MMO particles comprising a homogeneous solid mixture of the metal oxides instead of one or more metal oxides deposited on a surface of a support material. The MMO particles may be prepared by a co-precipitation method to produce the MMO particles comprising each of the plurality of different metal oxides distributed throughout the MMO particles. Following co-precipitation, the MMO particles may be pulverized to form a powder.

The MMO particles may comprise nanoparticles, which may have a largest dimension of from 20 nm to 200 nm, such as from 20 nm to 175 nm, from 20 nm to 150 nm, from 20 nm to 125 nm, from 20 nm to 100 nm, from 20 nm to 75 nm, from 20 nm to 50 nm, from 20 nm to 40 nm, from 20 nm to 30 nm, from 25 nm to 200 nm, from 30 nm to 200 nm, from 40 nm to 200 nm, from 50 nm to 200 nm, from 75 nm to 200 nm, from 100 nm to 200 nm, from 125 nm to 200 nm, from 150 nm to 200 nm, from 175 nm to 200 nm, from 50 nm to 175 nm, from 75 nm to 150 nm, from 100 nm to 125 nm, or any subset thereof. In embodiments, the MMO particles may be non-porous. Without being limited by theory, it is believed that hydrocarbons may only interact with the surface of the MMO particles. Thus, the increased surface area provided by the nano-particulate nature of the mixed metal oxide catalyst may help to achieve sufficient reaction rates.

The MMO particles, in the form of a powder, may be combined with other materials, such as but not limited to binder materials, extrusion additives, or other materials, extruded, and calcined to form the mixed metal oxide catalyst 112 in the form of catalyst pellets. In embodiments, the MMO particles, in powder form, may be combined and mixed with a binder material and methylcellulose to produce a solid mixture.

The binder materials may comprise silica, alumina, silica-alumina, a clay, or any combinations of these. The alumina may comprise an acid peptized alumina. The silica-alumina may comprise an amorphous silica-alumina. Clays may include, but are not limited to, kaolin, montmorilonite, halloysite, bentonite, or combinations of these. In embodiments, the binder material may comprise bentonite, silica, or combinations of these. In embodiments, the mixed metal oxide catalyst 112 may comprise bentonite as the binder. The methylcellulose may be added to the solid mixture to facilitate extrusion, but may be burned off during calcination. Thus, the mixed metal oxide catalyst 112 pellets may comprise, consist of, or consist essentially of the MMO particles and the binder.

The dry ingredients—the MMO particles, binder, and methylcellulose—may be well mixed to produce a solid mixture. In embodiments, the solid mixture may comprise from 50 wt. % to 90 wt. % of the MMO particles based on the total weight of the solid mixture, such as from 50 wt. % to 85 wt. % from 50 wt. % to 80 wt. %, from 60 wt. % to 90 wt. %, from 60 wt. % to 85 wt. %, from 60 wt. % to 80 wt. %, from 65 wt. % to 90 wt. %, from 65 wt. % to 85 wt. %, from 65 wt. % to 80 wt. %, from 70 wt. % to 90 wt. %, from 70 wt. % to 85 wt. %, from 70 wt. % to 80 wt. %, or about 75 wt. % of the MMO particles based on the total weight of the dry solid mixture. In embodiments, the solid mixture may comprise from about 10 wt. % to 50 wt. % of the binder based on the total weight of the dry solid mixture, such as from 10 wt. % to 49.9 wt. %, from 10 wt. % to 40 wt. %, from 10 wt. % to 35 wt. %, from 10 wt. % to 30 wt. %, from 10 wt. % to 25 wt. %, from 15 wt. % to 50 wt. %, from 15 wt. % to 49.9 wt. %, from 15 wt. % to 40 wt. %, from 15 wt. % to 35 wt. %, from 15 wt. % to 30 wt. %, from 15 wt. % to 25 wt. %, 20 wt. % to 50 wt. %, from 20 wt. % to 49.9 wt. %, from 20 wt. % to 40 wt. %, from 20 wt. % to 35 wt. %, from 20 wt. % to 30 wt. %, from 20 wt. % to 25 wt. %, or from 24 wt. % to 25 wt. % of the binder based on the total weight of the dry solid mixture. In embodiments, the solid mixture may comprise from 0.01 wt. % to 2 wt. % methylcellulose, such as from 0.01 wt. % to 1 wt. %, from 0.1 wt. % to 2 wt. %, from 0.1 wt. % to 1 wt. %, or about 0.1 wt. % of the methylcellulose, based on the total weight of the dry solid mixture. In embodiments, the dry mixture may comprise about 75 wt. % of the MMO particles, about 24.9 wt. % of the binder materials, and about 0.1 wt. % of the methyl cellulose based on the total weight of the dry solid mixture.

The dry solid mixture may be mixed thoroughly to produce a homogeneous solid mixture, such as by mixing with a mortar and pestle or using automated mixing equipment, such as but not limited to a V-blender, Schugi mixer, or other powder mixing devices. Following mixing, water may be added to the dry solid mixture form an extrudable paste. In embodiments, about 1.5 mL of water per gram of dry material may be added to the dry solid mixture to form the extrudable paste.

The extrudable paste, which comprises the MMO particles, binder, methylcellulose, and water, may then be extruded in an extruder. In embodiments, the extrudable paste may be inserted into the syringe of a syringe pump. Alternatively, other pressurization devices such as peristaltic pumps, screw extruders, twin-screw extruders, or the like, may be used to pressurize the paste. The pressurized paste may be forced through an extrusion die to form an extrudate comprising extruded strands. The extrusion die and resulting extrudate may have a round cross section, or may have any other cross sectional shape, such as star shaped, square shaped, hexagonal shaped, tri-lobe shaped, daisy shaped, cylcut shaped, 7-hole shaped, or donut shaped. The extrusion die and resulting extrudate may have a diameter of from 1 mm to 3 mm, such as from 1.5 mm to 3 mm, from 2.0 mm to 3 mm, from 1 mm to 2.5 mm, from 1.5 mm to 2.5 mm, from 1.75 mm to 2.25 mm, or any subset thereof.

Following extrusion, the extrudate may be dried and calcined. The extruded strands may be cut to length to form pellets before drying, after drying but before calcination, or after calcination. Generally, it is desirable to dry the extruded strands or pellets before calcination because excessive water in the catalyst particles can result in the buildup of steam pressure and the weakening or breakage of the catalyst during or after calcination.

The extruded strands or pellets may be dried at an elevated temperature. In embodiments, the extruded strands or pellets may be dried at least 40° C., such as at least 50° C., from 40° C. to 100° C., from 40° C. to 90° C., from 40° C. to 80° C., from 50° C. to 70° C., or any subset thereof. The extruded strands or pellets may be dried at the elevated temperature for at least 6 hours, such as at least 12 hours, at least 18 hours, from 6 hours to 48 hours, from 12 hours to 48 hours, or any subset thereof.

After drying, the dried strands or pellets of extrudate may then be calcined. In embodiments, the dried strands or pellets of the extrudate may be calcined at a temperature of at least 400° C., such as at least 500° C., at least 600° C., from 400° C. to 800° C., from 500° C. to 700° C., from 600° C. to 700° C., from 625° C. to 675° C., or any subset thereof. The dried strands or pellets may be calcined for at least 1 hour, such as at least 1.5 hours, from 1 hour to 5 hours, from 1 hour to 3 hours, from 1.5 hours to 2.5 hours, or any subset thereof. The calcination atmosphere may comprise an oxygen containing gas, such as air. If not performed prior to calcination, the calcined strands may be broken up and sieved to produce the mixed metal oxide catalyst 112 in the form of pellets.

The pellets of the mixed metal oxide catalyst may comprise the MMO particles and the binder. The pellets of the mixed metal oxide catalyst may also include any calcined residue from the methylcellulose. Each of the MMO particles includes $Fe_2O_3$, $ZrO_2$, $CeO_2$, and $Al_2O_3$. In embodiments, the pellets of the mixed metal oxide catalyst may comprise from 65 wt. % to 85 wt. %, from 65 wt. % to 80 wt. %, from 70 wt. % to 85 wt. %, from 70 wt. % to 80 wt. %, from 75 wt. % to 85 wt. %, from 75 wt. % to 80 wt. %, from 80 wt. % to 85 wt. %, or about 75 wt. % of the MMO particles, on the basis of the total weight of the mixed metal oxide catalyst, with the balance being the binder materials and any calcined residues of the methylcellulose. In embodiments, the mixed metal oxide catalyst may comprise from 15 wt. % to 35 wt. %, from 15 wt. % to 30 wt. %, from 15 wt. % to 25 wt. %, from 20 wt. % to 35 wt. %, from 20 wt. % to 30 wt. %, from 20 wt. % to 25 wt. %, from 25 wt. % to 35 wt. %, from 25 wt. % to 30 wt. %, or about 25 wt. % of the binder materials based on the total weight of the mixed metal oxide catalyst. The concentration of methylcellulose residue in the mixed metal oxide catalyst may be less than 0.1 wt. %, less than 0.05 wt. %, or even less than or equal to 0.01 wt. % based on the total weight of the mixed metal oxide catalyst. In embodiments, the pellets of the mixed metal oxide catalyst may comprise at least 80 wt. %, at least 90 wt. %, at least 95 wt. %, at least 99 wt. %, or even at least 99.9 wt. % of $Fe_2O_3$, $ZrO_2$, $CeO_2$, and $Al_2O_3$, and the binder materials, based on the total weight of the mixed metal oxide catalyst. In embodiments, the mixed metal oxide catalyst may comprise 75 wt. % of the MMO particles and 25 wt. % of the binder material.

The pellets of the mixed metal oxide catalyst 112 may have a pellet diameter, such as from 1 mm to 3 mm, such as from 1.5 mm to 3 mm, from 1 mm to 2.5 mm, from 1.5 mm to 2.5 mm, or any subset thereof. In embodiments, the pellets of the mixed metal oxide catalyst 112 may be cylindrical with a pellet diameter and a pellet length. The pellet length may be from about 2 mm to about 4 mm.

Referring again to FIG. 1, contacting the pyrolysis oil feed 102 with hydrogen 116 in the presence of the treating catalyst 119 in the first catalyst bed 111 and then in the presence of the mixed metal oxide 112 in the second catalyst bed 115 at the reaction conditions in the first fixed-bed reactor 110 may convert at least a portion of the multi-ring aromatic compounds in the pyrolysis oil feed 102 to the di-aromatic compounds, tri-aromatic compounds, or both in a single step, without conducting a subsequent chemical reaction step. Converting at least a portion of the multi-ring aromatic compounds to lighter aromatic compounds comprising di-aromatic compounds, tri-aromatic compounds, or both, is a complicated reaction scheme comprising multiple synchronized and selective reactions, which may include selective hydrogenation of one aromatic ring in a compound but not all, subsequent ring opening of the saturated tetra-aromatic compounds, hydro-dealkylation, transalkylation, and disproportionation reactions. Not intending to be bound by any particular theory, it is believed that upgrading the pyrolysis oil feed 102 may include selective hydrogenation of at least one aromatic ring structure or a multi-ring aromatic compound to produce a molecule with one or more aromatic rings and at least one saturated ring. The saturated ring portion may then undergo ring opening to produce a substituted aromatic compound. The substituted aromatic compound may then undergo one or more of hydroalkylation, transalkylation, or disproportionation to produce mono-aromatic compounds, di-aromatic compounds, and/or tri-aromatic compounds. It is understood that multiple variations and combinations of these reactions as well as other chemical reactions may occur during the upgrading process. This complex sequence of synchronized reactions for upgrading pyrolysis oil feed 102 may be catalyzed using the mixed metal oxide catalyst 112.

The first fixed-bed reactor 110 may contact the pyrolysis oil feed 102 with hydrogen 116 in the presence of the treating catalyst 119 in the first catalyst bed 111 and in the presence of the mixed metal oxide catalyst 112 in the second catalyst bed 115 at mild operating conditions sufficient to cause at least a portion of multi-ring aromatic compounds in the pyrolysis oil feed 102 to be upgraded to produce an intermediate stream 118, where the intermediate stream 118 comprises di-aromatic compounds, tri-aromatic compounds, or both. The first fixed-bed reactor 110 may be operated at an operating temperature in the range of from 200 degrees Celsius (° C.) to 400° C., such as from 250° C. to 400° C., from 250° C. to 300° C., from 300° C. to 350° C., from 350° C. to 400° C., or any combination of one or more of these ranges. The first fixed-bed reactor 110 may be operated at an operating pressure of from 1 megapascal (MPa) (10 bar) to 20 MPa (200 bar), such as from 3 MPa (30 bar) to 20 MPa (200 bar), from 5 MPa (50 bar) to 20 MPa (200 bar), from 7 MPa (70 bar) to 20 MPa (200 bar), from 10 MPa (100 bar) to 20 MPa (200 bar), from 12 MPa (120 bar) to 18 MPa (180 bar), from 14 MPa (140 bar) to 16 MPa (160 bar), from 1 MPa (10 bar) to 15 MPa (150 bar), from 3 MPa (30 bar) to 15 MPa (150 bar), from 5 MPa (50 bar) to 15 MPa (150 bar), from 7 MPa (70 bar) to 15 MPa (150 bar), or from 10 MPa (100 bar) to 15 MPa (150 bar). The first fixed-bed reactor 110 may be operated at volume ratio of hydrogen 116 to the pyrolysis oil feed 102 of from 500 to 1500, from 500 to 1400, from 500 to 1300, from 500 to 1200, from 800 to 1500, from 800 to 1400, from 800 to 1300, or from 800 to 1200. The first fixed-bed reactor 110 may operate at a liquid hourly space velocity (LHSV) of from $0.1\ h^{-1}$ to $1.2\ h^{-1}$, from $0.1\ h^{-1}$ to $1\ h^{-1}$, from $0.1\ h^{-1}$ to $0.8\ h^{-1}$, from $0.1\ h^{-1}$ to $0.6\ h^{-1}$, from $0.2\ h^{-1}$ to $0.4\ h^{-1}$, or any subset thereof. The first fixed-bed reactor 110 may operate at a gas hourly space velocity (GHSV) of from $200\ h^{-1}$ to $1500\ h^{-1}$, such as from $200\ h^{-1}$ to $1200\ h^{-1}$, from $400\ h^{-1}$ to $1200\ h^{-1}$, from $600\ h^{-1}$ to $1000\ h^{-1}$, from $700\ h^{-1}$ to $900\ h^{-1}$, or any subset thereof.

Referring now to FIG. 1, the intermediate stream 118 may include di-aromatic compounds. The intermediate stream 118 may include a greater percentage of di-aromatic compounds comprising 10 to 18 carbon atoms compared to the pyrolysis oil feed 102. The intermediate stream 118 may include at least 35%, at least 40%, at least 45%, at least 50%, or even at least 55% by weight di-aromatic compounds having from 10 to 18 carbon atoms (C10 to C18 aromatic compounds) based on the total weight of the intermediate stream 118, including any C10 to C18 aromatic compounds in the diluent 104 added to the pyrolysis oil feed 102 and passed through the first fixed-bed reactor 110. In addition to the di-aromatic compounds, the intermediate stream 118 may also include other constituents, such as but not limited to unreacted hydrogen, unreacted pyrolysis oil constituents, light hydrocarbon gases, light aromatic compounds having from 6-8 carbon atoms, tri-aromatic compounds, and combinations of these. Di-aromatic compounds included in the intermediate stream 118 may be passed to the second fixed-bed reactor 120 and then hydrocracked to produce BTEX. The second fixed-bed reactor 120 may increase the yields of BTEX and reduce recycle of unreacted pyrolysis oil recycled back through the process.

Still referring to FIG. 1, the intermediate stream 118 may be passed from the first fixed-bed reactor 110 downstream to the second fixed-bed reactor 120. In embodiments, the intermediate stream 118 may be passed directly from the first fixed-bed reactor 110 to the second fixed-bed reactor 120 without passing through any intervening unit operations that cause a chemical reaction or separate out one or more constituents of the intermediate stream 118. The second fixed-bed reactor 120 may be operable to contact the intermediate stream 118 with hydrogen 124 in the presence of the mesoporous supported metal catalyst 122 to produce a second reactor effluent 130. Contacting the intermediate stream 118 with hydrogen 124 in the presence of the mesoporous supported metal catalyst 122 may cause at least a portion of the di-aromatic compounds and/or tri-aromatic compounds in the intermediate stream 118 to react to form aromatic compounds having six to eight carbon atoms. Unreacted hydrogen may be passed from the first fixed-bed reactor 110 to the second fixed-bed reactor 120 as a portion of the intermediate stream 118. Additional hydrogen 124 may be added to the second fixed-bed reactor 120. The hydrogen 124 may include a recycled hydrogen stream or supplemental hydrogen from an external hydrogen source inside or outside the battery limits of the refinery. The hydrogen 124 may be passed directly to the second fixed-bed reactor 120 or may be combined with the intermediate stream 118 upstream of the second fixed-bed reactor 120. The hydrogen 124 may be used to pressurize the second fixed-bed reactor 120 to the operating pressure.

The second fixed-bed reactor 120 is a fixed-bed reactor. The fixed-bed reactor may include the mesoporous supported metal catalyst 122 in a packed bed. The hydrogen may be in co-current flow with the intermediate stream 118. In embodiments, the hydrogen may be permeated or bubbled up through the packed bed. In embodiments, the second fixed-bed reactor 120 may comprise one or a plurality fixed-bed reactors. When the second fixed-bed reactor 120 comprises a plurality of fixed-bed reactors, the plurality of fixed-bed reactors may be operated in series, in parallel, or a combination thereof.

The mesoporous supported metal catalyst 122 may be operable to cause at least a portion of the di-aromatic compounds and/or tri-aromatic compounds in the intermediate stream 118 to react to form aromatic compounds having six to eight carbon atoms (BTEX). The mesoporous supported metal catalyst 122 may include a first metal catalyst, a second metal catalyst, and a mesoporous support. The mesoporous support may include a zeolitic support component.

The zeolitic support component may comprise an ultrastable Y-type (USY) zeolite, a beta zeolite, or both of these. The beta zeolite may be a nano-sized beta zeolite. The zeolitic support component may comprise a ratio of USY zeolite:beta zeolite of from 1:1 to 2:1. In embodiments, the zeolitic support component may comprise a ratio of USY zeolite:beta zeolite of from 1.25:1 to 2:1, from 1.4:1 to 2:1, from 1.45:1 to 2:1, from 1:1 to 1.75:1, from 1:1 to 1.6:1, from 1:1 to 1.55:1, from 1.25:1 to 1.75:1, from 1.4:1 to 1.6:1, from 1.45:1 to 1.55:1, or any subset thereof. In embodiments, the zeolitic support component may comprise a ratio of USY zeolite:beta zeolite of about 3:2.

The zeolitic support component may have an average pore size sufficient to enable multi-ring aromatic compounds to access reactive sites within the pores of the zeolitic support component. The zeolitic support component may have an average pore size of greater than or equal to 2 nanometers (nm), greater than or equal to 3 nm, or greater than or equal to 4 nm as determined using the Barrett-Joyner-Halenda (BJH) method. The zeolitic support component may have an average pore size less than or equal to 40 nm, less than or equal to 30 nm, or even less than or equal to 25 nm as determined using the BJH method. In embodiments, the zeolitic support component may have an average pore size of from 2 nm to 40 nm, from 2 nm to 30 nm, from 2 nm to 25 nm, from 5 nm to 40 nm, from 5 nm to 30 nm, from 5 nm to 25 nm, from 8 nm to 40 nm, from 8 nm to 30 nm, or from 8 nm to 25 nm, from 3 nm to 6 nm, or any subset thereof where the average pore size is determined using the BJH method. In embodiments, the zeolitic support component may have an average pore size of from 3 nm to 6 nm. The stated pore sizes of the zeolitic support component may apply to the USY zeolite, the beta zeolite, or both.

The zeolitic support component may have a molar ratio of silica ($SiO_2$) to alumina ($Al_2O_3$) of greater than or equal to 10, such as greater than or equal to 20, greater than or equal to 30, greater than or equal to 40, greater than or equal to 50, or greater than or equal to 60. The zeolitic support component may have a molar ratio of $SiO_2$ to $Al_2O_3$ of less than or equal to 70, such as less than or equal to 60, less than or equal to 50, less than or equal to 40, less than or equal to 30, or even less than or equal to 20. The zeolitic support component may have a molar ratio of $SiO_2$ to $Al_2O_3$ of from 10 to 70. In embodiments, the zeolitic support component may have a molar ratio of $SiO_2$ to $Al_2O_3$ of from 10 to 60, from 10 to 50, from 10 to 40, from 20 to 70, from 20 to 60, from 20 to 50, from 20 to 40, from 30 to 70, from 30 to 60, from 30 to 50, from 40 to 70, from 40 to 60, from 50 to 70, or from 10 to 30. The stated molar ratios of silica to alumina in the zeolite support component may apply to the USY zeolite, the beta zeolite, or both.

The zeolitic support component may comprise particles and the particles may have an average diameter of from 2000 nm to 5000 nm, as measured by their longest dimension. In embodiments, the particles of the zeolitic support component may have an average diameter of from 2000 nm to 4500 nm, from 2000 nm to 4000 nm, from 2000 nm to 3500 nm, from 2000 nm to 3000 nm, from 2000 nm to 2500 nm, from 2500 nm to 5000 nm, from 3000 nm to 5000 nm, from 3500 nm to 5000 nm, from 4000 nm to 5000 nm, from 4500 nm to 5000 nm, from 2500 nm to 4500 nm, from 3000 nm to 4000 nm, or any subset thereof, as measured by their longest dimension. In embodiments, the microporous zeolite particles are present as a single crystal structure. The stated particle sizes of the zeolitic support component may apply to the USY zeolite, the beta zeolite, or both.

The zeolitic support component may have an average surface area of at least 400 $m^2/g$. In embodiments, the zeolitic support component may have an average surface area of at least 425 $m^2/g$, from 400 $m^2/g$ to 450 $m^2/g$, from 400 $m^2/g$ to 440 $m^2/g$, from 400 $m^2/g$ to 430 $m^2/g$, from 400 $m^2/g$ to 420 $m^2/g$, from 410 $m^2/g$ to 450 $m^2/g$, from 420 $m^2/g$ to 450 $m^2/g$, from 430 $m^2/g$ to 45 $m^2/g$, from 410 $m^2/g$ to 440 m²/g, from 420 m²/g to 430 m²/g, or any subset thereof. Surface area may be measured according to the Brunauer-Emmett-Teller (BET) method. The stated surface areas of the zeolitic support component may apply to the USY zeolite, the beta zeolite, or both.

The zeolitic support component may have an average pore volume of from 0.3 ml/g to 0.6 ml/g, as determined using the BJH method. In embodiments, the zeolitic support component may have an average pore volume of from 0.3 ml/g to 0.5 ml/g, from 0.3 ml/g to 0.4 ml/g, from 0.4 ml/g to 0.6 ml/g, from 0.5 ml/g to 0.6 ml/g, from 0.4 ml/g to 0.5 ml/g, or any subset thereof. The stated pore volumes of the zeolitic support component may apply to the USY zeolite, the beta zeolite, or both.

In addition to the zeolitic support component, the mesoporous support may further comprise a binder and a large pore alumina. The binder may comprise an alumina, such as an acid peptized alumina; a clay; or an amorphous silica-alumina. In embodiments, the binder may comprise an acid peptized alumina. Suitable acid peptized alumina for use as the binder is commercially available under the trade name CATAPAL B from Sasol Inc.

The large pore alumina may have an average surface area of at least 100 m²/g, as measured by BET. In embodiments, the large pore alumina may have an average surface area of at least 125 m²/g, at least 150, from 100 m²/g to 300 m²/g, from 125 m²/g to 300 m²/g, from 150 m²/g, or any subset thereof. The large pore alumina may have an average BJH pore radius of at least 5 nm. In embodiments, the large pore alumina may have an average BJH pore radius of at least 8 nm, at least 10 nm, at least 11 nm, from 5 nm to 20 nm, from 8 nm to 20 nm, from 10 nm to 20 nm, from 11 nm to 20 nm, or any subset thereof. The large pore alumina may have an average BJH pore volume of from 0.8 ml/g to 1.1 ml/g, such as from 0.9 ml/g to 1.1 ml/g, from 1.0 ml/g to 1.1 ml/g, from 0.8 ml/g to 1.0 ml/g, from 0.8 ml/g to 0.9 ml/g, from 0.9 ml/g to 1.0 ml/g.

The mesoporous support may be extruded into pellets. The pellets may then be impregnated with the first metal catalyst and the second metal catalyst to produce the mesoporous supported metal catalyst 122. The pellets may be formed by first preparing a binder paste. Then, the binder paste may be mixed with the dry catalyst components (zeolite and large pore alumina) to form a support paste. The support paste may be extruded to form a support extrudate. The support extrudate may be dried, calcined, and impregnated with the first metal catalyst (Ni) and the second metal catalyst (W).

The binder paste may be formed mixing acid (such as nitric acid) with the alumina binder particles. The binder paste may be uniform and without large visible particles. The binder paste may then be mixed with the large pore alumina, the USY zeolite, and the nano beta zeolite to form the support paste. The support paste may then be extruded to form the support extrudate of about 1 mm to 2 mm in diameter. The support extrudate may then be dried, such as for at least 12 hours at about 110° C. The dried support extrudate may then be calcined in air at about 550° C. for at least 4 hours, at a ramp rate of about 2° C./minute. Either before calcination or after calcination, the support extrudate may be cut or broken into pellets of about 2 mm to 4 mm in length. The support extrudate may have a round cross section, or may have any other cross sectional shape, such as star shaped, square shaped, hexagonal shaped, tri-lobe shaped, daisy shaped, cylcut shaped, 7-hole shaped, or donut shaped.

The mesoporous supported metal catalyst 122 may be prepared from the mesoporous support by wet impregnation of at least a first metal catalyst precursor and a second metal catalyst precursor onto the outer surfaces, pore surfaces, or both, of the mesoporous support. Wet impregnation of the first metal catalyst and the second metal catalyst onto the mesoporous support may comprise preparing an aqueous metal solution comprising the first metal catalyst and the second metal catalyst. The first metal catalyst and the second metal catalyst may be introduced to the water in their hydrate forms (e.g. Ammonium metatungstate $(NH_4)_{10}(H_2W_{12}O_{42}) \cdot xH_2O$ and Nickel nitrate hexahydrate $Ni(NO_3)_2$). The dried and calcined zeolite pellets may be immersed in the metal solution for a time sufficient for them to be impregnated with the metals, such as for at least 3 hours. The impregnated zeolite particles may be dried again, such as at 110° C. for 12 hours. The dried, impregnated zeolite particles may be calcined again, such as at about 500° C. for about 4 hours (with a ramp rate of about 2° C./min). The dried, impregnated zeolite particles may be calcined in air. The calcined, impregnated zeolite particles may thereby form the mesoporous supported metal catalyst 122 suitable for use in a fixed-bed reactor.

The mesoporous supported metal catalyst 122 may comprise from 40 wt. % to 60 wt. % of the zeolitic support component. In embodiments, the mesoporous supported metal catalyst 122 may comprise from 40 wt. % to 55 wt. %, from 40 wt. % to 50 wt. %, from 45 wt. % to 60 wt. %, from 50 wt. % to 60 wt. %, from 45 wt. % to 55 wt. %, or any subset thereof of the total zeolites, including the nano beta zeolites and Y-type zeolites, on the basis of the total weight of the mesoporous supported metal catalyst 122.

The mesoporous supported metal catalyst 122 may comprise from 10 wt. % to 20 wt. %, from 12.5 wt. % to 20 wt. %, from 15 wt. % to 20 wt. %, from 17.5 wt. % to 20 wt. %, from 10 wt. % to 17.5 wt. %, from 10 wt. % to 15 wt. %, from 10 wt. % to 12.5 wt. %, from 12.5 wt. % to 17.5 wt. %, or any subset thereof of the binder, on the basis of the total weight of the mesoporous supported metal catalyst 122.

The mesoporous supported metal catalyst 122 may comprise from 2 wt. % to 10 wt. % of the large pore alumina. In embodiments, the mesoporous supported metal catalyst 122 may comprise from 2 wt. % to 8 wt. %, from 2 wt. % to 6 wt. %, from 2 wt. % to 4 wt. %, from 4 wt. % to 10 wt. %, from 6 wt. % to 10 wt. %, from 8 wt. % to 10 wt. %, from 4 wt. % to 8 wt. %, or any subset thereof of the large pore alumina. As previously described, the mesoporous supported metal catalyst 122 may include the first metal catalyst and the second metal catalyst supported on the mesoporous. The first metal catalyst may be a nickel catalyst. The nickel catalyst may be present as nickel oxide (NiO). In embodiments, the mesoporous supported metal catalyst 122 may comprise from 4 wt. % to 8 wt. %, from 6 wt. % to 8 wt. %, from 4 wt. % to 6 wt. %, from 5 wt. % to 7 wt. %, or any subset thereof of the first metal catalyst, on the basis of the total weight of the mesoporous supported metal catalyst 122.

The second metal catalyst may be a tungsten catalyst. The tungsten catalyst may be present as tungsten oxide $(WO_3)$ The mesoporous supported metal catalyst 122 may comprise from 20 wt. % to 30 wt. %, from 22 wt. % to 30 wt. %, from 24 wt. % to 30 wt. %, from 26 wt. % to 30 wt. %, from 28 wt. % to 30 wt. %, from 20 wt. % to 28 wt. %, from 20 wt. % to 26 wt. %, from 20 wt. % to 24 wt. %, from 20 wt. % to 22 wt. %, from 22 wt. % to 28 wt. %, from 24 wt. % to 26 wt. %, or any subset thereof of the second metal catalyst, on the basis of the total weight of the mesoporous supported metal catalyst 122.

The mesoporous supported metal catalyst 122 may have a surface area of from 200 m$^2$/g to 400 m$^2$/g, as measured by BET. In embodiments, the mesoporous supported metal catalyst 122 may have a surface area of from 200 m$^2$/g to 350 m$^2$/g, from 200 m$^2$/g to 300 m$^2$/g, from 200 m$^2$/g to 250 m$^2$/g, from 250 m$^2$/g to 400 m$^2$/g, from 300 m$^2$/g to 400 m$^2$/g, from 350 m$^2$/g to 400 m$^2$/g, from 250 m$^2$/g to 350 m$^2$/g, or any subset thereof, as measured by BET. The mesoporous supported metal catalyst 122 may have a pore volume of from 0.4 ml/g to 0.7 ml/g. In embodiments, the mesoporous supported metal catalyst 122 may have a pore volume of from 0.4 ml/g to 0.6 ml/g, from 0.4 ml/g to 0.5 ml/g, from 0.5 ml/g to 0.7 ml/g, from 0.6 ml/g to 0.7 ml/g, from 0.5 ml/g to 06 ml/g, or any subset thereof. The mesoporous supported metal catalyst 122 may have an average pore size of from 6 nm to 10 nm. In embodiments, The mesoporous supported metal catalyst 122 may have an average pore size of from 6 nm to 9 nm, from 6 nm to 8 nm, from 6 nm to 7 nm, from 7 nm to 10 nm, from 8 nm to 10 nm, from 9 nm to 10 nm, from 7 nm to 9 nm, or any subset thereof.

Still referring to FIG. 1, contacting the intermediate stream 118 with hydrogen 124 in the presence of the mesoporous supported metal catalyst 122 at the reaction conditions in the second fixed bed reactor 120 may cause at least a portion of the di-aromatic compounds, the tri-aromatic compounds, or both in the intermediate stream 118 to react to form light aromatic compounds having six to eight carbon atoms in a single step, without conducting a subsequent chemical reaction step. Converting at least a portion of the di-aromatic compounds and/or tri-aromatic compounds in the intermediate stream to aromatic compounds having six to eight carbon atoms is also a complicated reaction scheme comprising multiple synchronized and selective reactions, which may include selective hydrogenation of one aromatic ring in a compound but not all, subsequent ring opening of the saturated naphthenic ring, hydro-dealkylation, transalkylation, and disproportionation reactions. Not intending to be bound by any particular theory, it is believed that upgrading intermediate stream 118 may include selective hydrogenation of at least one aromatic ring structure of a multi-ring aromatic compound, such as the di-aromatic compounds in the intermediate stream 118, to produce a molecule with one aromatic ring and at least one saturated rings. The saturated rings may then undergo ring opening to produce substituted aromatic compounds. It is understood that multiple variations and combinations of these reactions as well as other chemical reactions may occur during the upgrading process in the second fixed-bed reactor 120 as well. This complex sequence of synchronized reactions for upgrading intermediate stream 118 may be catalyzed using the mesoporous supported metal catalyst 122.

The second fixed-bed reactor 120 may contact the intermediate stream 118 with hydrogen 124 in the presence of the mesoporous supported metal catalyst 122 at mild operating conditions sufficient to cause at least a portion of the di-aromatic compounds and/or tri-aromatic compounds in the intermediate stream 118 to react to form aromatic compounds having six to eight carbon atoms. The second fixed-bed reactor 120 may be operated at an operating temperature in the range of from 200 degrees Celsius (° C.) to 400° C., such as from 250° C. to 400° C., from 250° C. to 300° C., from 300° C. to 400° C., or any combination of these ranges. The second fixed-bed reactor 120 may be operated at an operating pressure of from 1 MPa (10 bar) to 20 MPa (200 bar), such as from 3 MPa (30 bar) to 20 MPa (200 bar), from 5 MPa (50 bar) to 20 MPa (200 bar), from 7 MPa (70 bar) to 20 MPa (200 bar), from 10 MPa (100 bar) to 20 MPa (200 bar), from 1 MPa (10 bar) to 15 MPa (150 bar), from 3 MPa (30 bar) to 15 MPa (150 bar), from 5 MPa (50 bar) to 15 MPa (150 bar), from 7 MPa (70 bar) to 15 MPa (150 bar), or from 10 MPa (100 bar) to 15 MPa (150 bar). The second fixed-bed reactor 120 may be operated at an LHSV of from 0.3 h$^{-1}$ to 1.5 h$^{-1}$, such as from 0.5 h$^{-1}$ to 1.5 h$^{-1}$, from 0.9 h$^{-1}$ to 1.4 h$^{-1}$, from 0.9 h$^{-1}$ to 1.3 h$^{-1}$, from 0.9 h$^{-1}$ to 1.2 h$^{-1}$, from 1.0 h$^{-1}$ to 1.5 h$^{-1}$, from 1.1 h$^{-1}$ to 1.5 h$^{-1}$, from 1.2 h$^{-1}$ to 1.5 h$^{-1}$, from 1.0 h$^{-1}$ to 1.4 h$^{-1}$, from 1.1 h$^{-1}$ to 1.3 h$^{-1}$, or any subset thereof. The second fixed-bed reactor 120 may be operated at a GHSV of from 200 h$^{-1}$ to 1500 h$^{-1}$, such as from 200 h$^{-1}$ to 1200 h$^{-1}$, from 400 h$^{-1}$ to 1200 h$^{-1}$, from 600 h$^{-1}$ to 1000 h$^{-1}$, from 700 h$^{-1}$ to 900 h$^{-1}$, about 800 h$^{-1}$, or any subset thereof.

The second fixed-bed reactor 120 may produce a second reactor effluent 130. The second reactor effluent 130 may comprise aromatic compounds having six to eight carbon atoms. The aromatic compounds having six to eight carbon atoms may include benzene, toluene, ethylbenzene, xylenes, or combinations thereof. The second reactor effluent 130 may also include any unreacted constituents of the pyrolysis oil feed 102, the intermediate stream 118, or both, such as unreacted heavy aromatic compounds. The second reactor effluent 130 may include a product which is at least 50 wt. %, such as at least 60 wt. %, at least 70 wt. %, at least 73 wt. %, from 50 wt. % to 80 wt. %, from 60 wt. % to 80 wt. %, from 70 wt. % to 80 wt. % liquid at room temperature, on the basis of the total weight of the second reactor effluent 130. At least 20 wt. %, such as at least 30 wt. %, at least 35 wt. %, at least 40 wt. %, at least 45 wt. %, from 20 wt. % to 70 wt. %, from 30 wt. % to 70 wt. %, from 70 wt. % to 70 wt. %, from 45 wt. % to 70 wt. % of the second reactor effluent 130 may comprise aromatic compounds having six to eight carbon atoms, on the basis of the total weight of the second reactor effluent 130.

Still referring to FIG. 1, the system 100 may include a separation unit 140 disposed downstream of the second fixed-bed reactor 120. The methods for upgrading the pyrolysis oil feed 102 may include separating the second reactor effluent 130 into at least a BTEX product stream 144 and a residual bottoms stream 146 in the separation unit 140. In embodiments, the methods may further include separating a light gas stream 142 from the second reactor effluent 130. The separation unit 140 may be any unit operation capable of separating a BTEX product stream 144 from a residual bottoms stream 146. In embodiments, the separation unit 140 may be a separation unit capable of separating a light gas stream 142 from the second reactor effluent 130.

The light gas stream 142 may comprise gasses. In embodiments, the light gas stream 142 may comprise hydrogen and $C_1$-$C_4$ hydrocarbons, such as but not limited to methane, ethane, ethylene, propane, propylene, butanes, butenes, or other light hydrocarbons. In embodiments, the light gas stream 142 may comprise at least 80 wt. %, such as at least 90 wt. %, at least 95 wt. %, or even at least 99 wt. % of the combined weight of hydrogen and $C_1$-$C_4$ hydrocarbons based on the total mass flow rate of the light gas stream 142.

The BTEX product stream 144 may comprise light aromatic compounds, such as benzene, toluene, ethylbenzene and xylene. In embodiments, the BTEX product stream 144 may comprise at least 80 wt. %, such as at least 90 wt. %, at least 95 wt. %, or even at least 99 wt. % of light aromatic compounds based on the total mass flow rate of the BTEX product stream 144.

The residual bottoms stream 146 may comprise multi-ring aromatic compounds, di-aromatic compounds, and tri-aromatic compounds. In embodiments, all or a portion of the residual bottoms stream 146 may be fed as a bottoms recycle stream 150 back to the first fixed-bed reactor 110.

Figure 5:
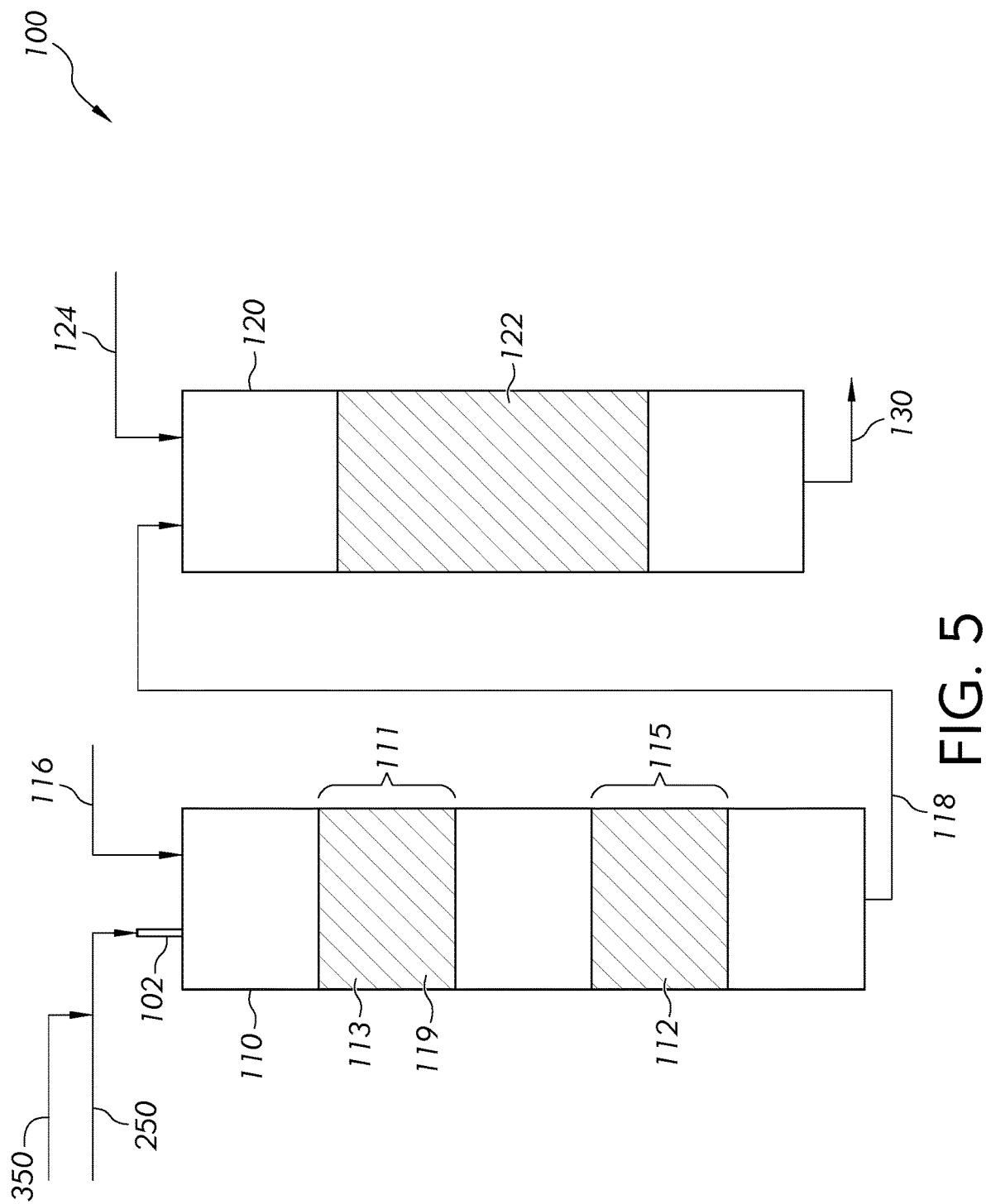
FIG. 5 schematically depicts a generalized flow diagram of another system for upgrading pyrolysis oil, according to one or more embodiments shown and described in this disclosure.

Referring now to FIG. 5, in embodiments, the first fixed-bed reactor 110 may include a first catalyst bed 111 comprising the first treating catalyst 113 and a second catalyst bed 115 comprising the mixed metal oxide catalyst 112. The mixed metal oxide catalyst 112 may be in a separate bed from the first treating catalyst 113 within the first fixed-bed reactor 110. The first catalyst bed 111 comprising the first treating catalyst 113 may be disposed upstream of the second catalyst bed 115 comprising the mixed metal oxide catalyst 112. Upon passing through the first fixed-bed reactor 110, the pyrolysis oil feed 102 may encounter the first catalyst bed 111 comprising the first treating catalyst 113 before encountering the mixed metal oxide catalyst 112 in the second catalyst bed 115. Generally, it is believed that the presence of first catalyst bed 111 comprising the first treating catalyst 113, upstream of the second catalyst bed 115 comprising the MMO catalyst 112, may help to prevent the formation of excess coke and resultant plugging of the reactor.

The pyrolysis oil feed 102 may enter the first fixed-bed reactor 110. Inside the first fixed-bed reactor 110, the pyrolysis oil feed 102 may contact the first treating catalyst 113 in the first catalyst bed 111 in the presence of hydrogen 116, converting at least a portion of the pyrolysis oil feed 102. The resulting reaction products and unconverted pyrolysis oil feed may subsequently be passed from the first catalyst bed 111 to the second catalyst bed 115 and contacted with hydrogen in the presence of the mixed metal oxide catalyst 112 in the second catalyst bed 115, in the presence of hydrogen 116, inside the first fixed-bed reactor 110. The hydrogen in the second catalyst bed 115 may comprise unreacted hydrogen passed through the first catalyst bed 111 to the second catalyst bed 115. In embodiments, the conditions under which the pyrolysis oil feed 102 contacts each of the mixed metal oxide catalyst 112 and the first treating catalyst 113 are substantially the same. In embodiments, the pyrolysis oil feed 102 may contact the first treating catalyst 113 in the first catalyst bed 111 at a peak temperature lower than the peak temperature of the contact in the second catalyst bed 115. In embodiments, the difference between the peak temperature of the second catalyst bed 115 and the first catalyst bed 111 may be at least 30° C., such as at least 40° C., at least 50° C., or at least 60° C. In embodiments, the difference between the peak temperature of the second catalyst bed 115 and the first catalyst bed 111 may be from 30° to 80° C., such as from 30° C. to 60° C., from 30° C. to 40° C., from 40° C. to 50°, from 50° C. to 60° C., from 60° C. to 80° C., or any combination of one or more of these ranges. Generally, contacting the pyrolysis oil feed 102 with the first treating catalyst 113 at a lesser temperature than the temperature at which the pyrolysis oil feed 102 contacts the mixed metal oxide catalyst 112 is believed to reduce coke formation and plugging of the first fixed-bed reactor 110.

The first fixed-bed reactor 110 may contact the pyrolysis oil feed 102 with hydrogen 116 in the presence of the first treating catalyst 113 and then the mixed metal oxide catalyst 112 downstream of the first treating catalyst 113 at mild operating conditions sufficient to cause at least a portion of multi-ring aromatic compounds in the pyrolysis oil feed 102 to be upgraded to produce an intermediate stream 118, where the intermediate stream 118 comprises di-aromatic and/or tri-aromatic compounds. The first fixed-bed reactor 110 may be operated at a peak temperature in the range of from 200 degrees Celsius (° C.) to 400° C., such as from 250° C. to 400° C., from 250° C. to 300° C., from 300° C. to 400° C., or any combination of these ranges. The first fixed-bed reactor 110 may be operated at an operating pressure of from 1 megapascal (MPa) (10 bar) to 20 MPa (200 bar), such as from 3 MPa (30 bar) to 20 MPa (200 bar), from 5 MPa (50 bar) to 20 MPa (200 bar), from 7 MPa (70 bar) to 20 MPa (200 bar), from 10 MPa (100 bar) to 20 MPa (200 bar), from 12 MPa (120 bar) to 18 MPa (180 bar), from 14 MPa (140 bar) to 16 MPa (160 bar), from 1 MPa (10 bar) to 15 MPa (150 bar), from 3 MPa (30 bar) to 15 MPa (150 bar), from 5 MPa (50 bar) to 15 MPa (150 bar), from 7 MPa (70 bar) to 15 MPa (150 bar), or from 10 MPa (100 bar) to 15 MPa (150 bar). The first fixed-bed reactor 110 may be operated at volume ratio of hydrogen to the pyrolysis oil feed 102 of from 500 to 1500, from 500 to 1400, from 500 to 1300, from 500 to 1200, from 800 to 1500, from 800 to 1400, from 800 to 1300, or from 800 to 1200, at the inlet of the first fixed-bed reactor 110. The first fixed-bed reactor 110 may operate at a liquid hourly space velocity (LHSV) of from 0.1 $h^{-1}$ to 1.2 $h^{-1}$, from 0.1 $h^{-1}$ to 1 $h^{-1}$, from 0.1 $h^{-1}$ to 0.8 $h^{-1}$, from 0.1 $h^{-1}$ to 0.6 $h^{-1}$, from 0.2 $h^{-1}$ to 0.4 $h^{-1}$, or any subset thereof. The first fixed-bed reactor 110 may operate at a gas hourly space velocity (GHSV) of from 200 $h^{-1}$ to 1500 $h^{-1}$, such as from 200 $h^{-1}$ to 1200 $h^{-1}$, from 400 $h^{-1}$ to 1200 $h^{-1}$, from 600 $h^{-1}$ to 1000 $h^{-1}$, or any subset thereof.

Figure 6:
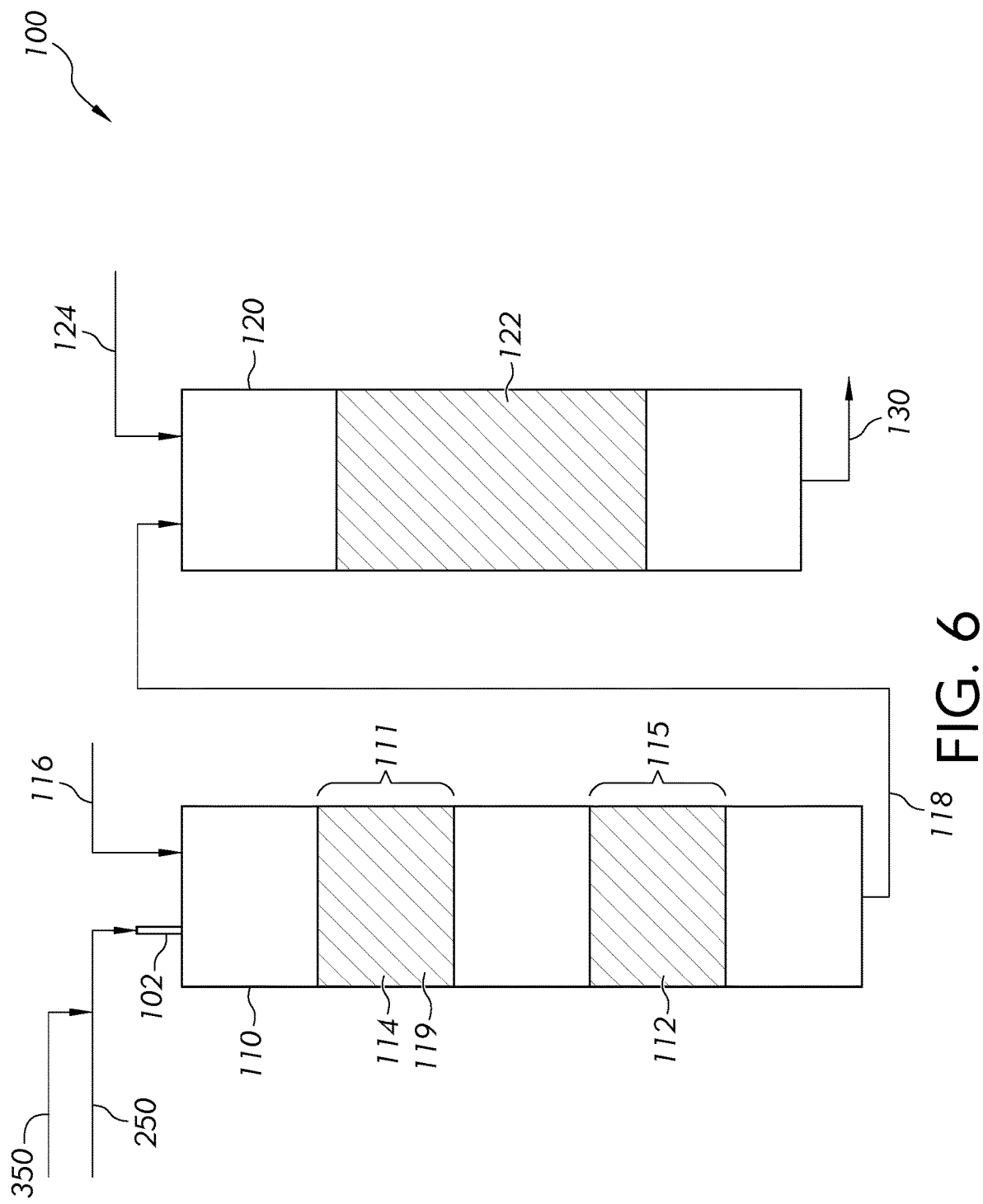
FIG. 6 schematically depicts a generalized flow diagram of still another system for upgrading pyrolysis oil, according to one or more embodiments shown and described in this disclosure.

Referring now to FIG. 6, in embodiments, the first fixed-bed reactor 110 may include a first catalyst bed 111 comprising the second treating catalyst 114 and a second catalyst bed 115 comprising the mixed metal oxide catalyst 112. The mixed metal oxide catalyst 112 may be in a separate bed from the second treating catalyst 114 within the first fixed-bed reactor 110. The first catalyst bed 111 comprising the second treating catalyst 114 may be disposed upstream of the second catalyst bed 115 comprising the mixed metal oxide catalyst 112. Upon passing through the first fixed-bed reactor 110, the pyrolysis oil feed 102 may encounter the first catalyst bed 111 comprising the second treating catalyst before encountering the mixed metal oxide catalyst 112 in the second catalyst bed 115. Generally, it is believed that the presence of first catalyst bed 111 comprising the second treating catalyst 114, upstream of the second catalyst bed 115 comprising the MMO catalyst 112, may help to prevent the formation of excess coke and resultant plugging of the reactor.

The pyrolysis oil feed 102 may enter the first fixed-bed reactor 110. Inside the first fixed-bed reactor 110, the pyrolysis oil feed 102 may contact the second treating catalyst 114 in the first catalyst bed 111 in the presence of hydrogen 116, converting at least a portion of the pyrolysis oil feed 102. The resulting reaction products and unconverted pyrolysis oil feed may subsequently be passed from the first catalyst bed 111 to the second catalyst bed 115 and contacted with hydrogen in the presence of the mixed metal oxide catalyst 112 in the second catalyst bed 115 inside the first fixed-bed reactor 110. The hydrogen in the second catalyst bed 115 may comprise unreacted hydrogen passed through the first catalyst bed 111 to the second catalyst bed 115. In embodiments, the conditions under which the pyrolysis oil feed 102 contacts each of the mixed metal oxide catalyst 112 and the second treating catalyst 114 are substantially the same. In embodiments, the pyrolysis oil feed 102 may contact the second treating catalyst 114 in the first catalyst bed 111 at a peak temperature lower than the peak temperature of the contact in the second catalyst bed 115. In embodiments, the difference between the peak temperature of the second catalyst bed 115 and the first catalyst bed 111 may be at least 30° C., such as at least 40° C., at least 50° C., or at least 60° C. In embodiments, the difference between the peak temperature of the second catalyst bed 115 and the first catalyst bed 111 may be from 30° to 80° C., such as from 30° C. to 60° C., from 30° C. to 40° C., from 40° C. to 50°, from 50° C. to 60° C., from 60° C. to 80° C., or any combination of one or more of these ranges. Generally, contacting the pyrolysis oil feed 102 with the second treating catalyst 114 at a lesser temperature compared to the temperature at which the pyrolysis oil feed 102 contacts the mixed metal oxide catalyst 112 is believed to reduce coke formation and plugging of the first fixed-bed reactor 110.

The first fixed-bed reactor 110 may contact the pyrolysis oil feed 102 with hydrogen 116 in the presence of the second treating catalyst 114 and then the mixed metal oxide catalyst 112 downstream of the second treating catalyst 114 at mild operating conditions sufficient to cause at least a portion of multi-ring aromatic compounds in the pyrolysis oil feed 102 to be upgraded to produce an intermediate stream 118, where the intermediate stream 118 comprises di-aromatic and/or tri-aromatic compounds. The first fixed-bed reactor 110 may be operated at a peak temperature in the range of from 200 degrees Celsius (° C.) to 400° C., such as from 250° C. to 400° C., from 250° C. to 300° C., from 300° C. to 400° C., or any combination of these ranges. The first fixed-bed reactor 110 may be operated at an operating pressure of from 1 megapascal (MPa) (10 bar) to 20 MPa (200 bar), such as from 3 MPa (30 bar) to 20 MPa (200 bar), from 5 MPa (50 bar) to 20 MPa (200 bar), from 7 MPa (70 bar) to 20 MPa (200 bar), from 10 MPa (100 bar) to 20 MPa (200 bar), from 12 MPa (120 bar) to 18 MPa (180 bar), from 14 MPa (140 bar) to 16 MPa (160 bar), from 1 MPa (10 bar) to 15 MPa (150 bar), from 3 MPa (30 bar) to 15 MPa (150 bar), from 5 MPa (50 bar) to 15 MPa (150 bar), from 7 MPa (70 bar) to 15 MPa (150 bar), or from 10 MPa (100 bar) to 15 MPa (150 bar). The first fixed-bed reactor 110 may be operated at volume ratio of hydrogen to the pyrolysis oil feed 102 of from 500 to 1500, from 500 to 1400, from 500 to 1300, from 500 to 1200, from 800 to 1500, from 800 to 1400, from 800 to 1300, or from 800 to 1200, at the inlet to the first fixed-bed reactor 110. The first fixed-bed reactor 110 may operate at a liquid hourly space velocity (LHSV) of from 0.1 $h^{-1}$ to 1.2 $h^{-1}$, from 0.1 $h^{-1}$ to 1 $h^{-1}$, from 0.1 $h^{-1}$ to 0.8 $h^{-1}$, from 0.1 $h^{-1}$ to 0.6 $h^{-1}$, from 0.2 $h^{-1}$ to 0.4 $h^{-1}$, or any subset thereof. The first fixed-bed reactor 110 may operate at a gas hourly space velocity (GHSV) of from 200 $h^{-1}$ to 1500 $h^{-1}$, such as from 200 $h^{-1}$ to 1200 $h^{-1}$, from 400 $h^{-1}$ to 1200 $h^{-1}$, from 600 $h^{-1}$ to 1000 $h^{-1}$, or any subset thereof.

Figure 7:
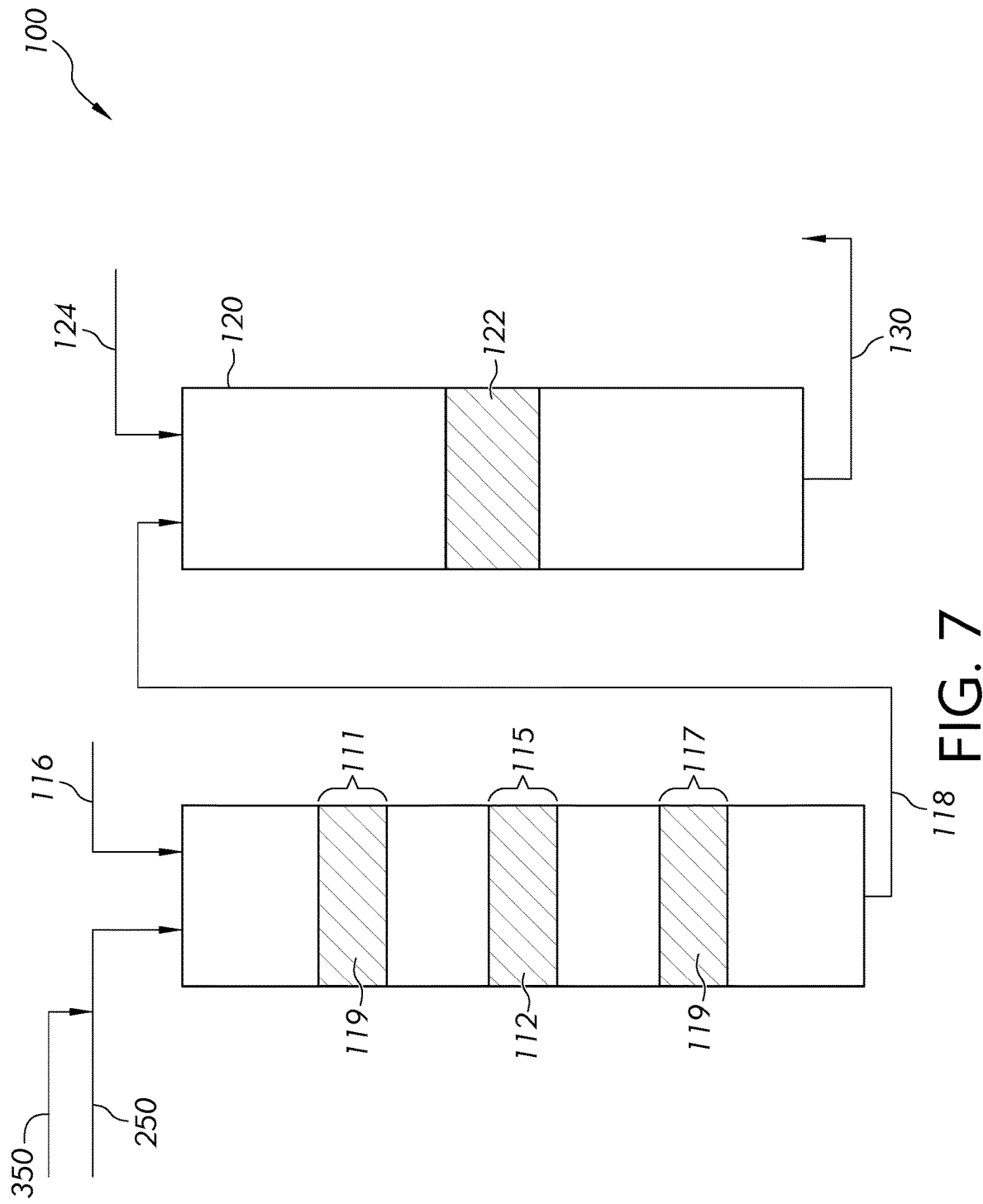
FIG. 7 schematically depicts a generalized flow diagram of another embodiment of a system for upgrading pyrolysis oil, according to one or more embodiments shown and described in this disclosure.

Referring now to FIG. 7, in embodiments, the first fixed-bed reactor 110 may include the first catalyst bed 111 comprising the treating catalyst 119, the second catalyst bed 115 comprising the mixed metal oxide catalyst 112, and a third catalyst bed 117. The mixed metal oxide catalyst 112 may be in a separate bed from the treating catalyst 119 in the first catalyst bed 111 and the third catalyst bed 117 within the first fixed-bed reactor 110. The first catalyst bed 111 comprising the treating catalyst 119 may be disposed upstream of the second catalyst bed 115 comprising the mixed metal oxide catalyst 112. The third catalyst bed 117 may comprise the treating catalyst 119. Upon passing through the first fixed-bed reactor 110, the pyrolysis oil feed 102 may encounter the first catalyst bed 111 comprising the treating catalyst 119, before encountering the mixed metal oxide catalyst 112 in the second catalyst bed 115, before encountering treating catalyst 119 in the third catalyst bed 117.

In embodiments, the first catalyst bed 111 and the third catalyst bed 117 may both comprise the first treating catalyst. In embodiments, the first catalyst bed 111 may comprise at least 80 wt. %, at least 90 wt. %, at least 95 wt. %, or at least 99 wt. % of the first treating catalyst, on the basis of the total weight of the first catalyst bed 111. In embodiments, the third catalyst bed 117 may comprise at least 80 wt. %, at least 90 wt. %, at least 95 wt. %, or at least 99 wt. % of the first treating catalyst, on the basis of the total weight of the third catalyst bed 117.

In embodiments, the first catalyst bed 111 and the third catalyst bed 117 may both comprise the second treating catalyst. In embodiments, the first catalyst bed 111 may comprise at least 80 wt. %, at least 90 wt. %, at least 95 wt. %, or at least 99 wt. % of the second treating catalyst, on the basis of the total weight of the first catalyst bed 111. In embodiments, the third catalyst bed 117 may comprise at least 80 wt. %, at least 90 wt. %, at least 95 wt. %, or at least 99 wt. % of the second treating catalyst, on the basis of the total weight of the third catalyst bed 117.

In embodiments, the first catalyst bed 111 and the third catalyst bed 117 may comprise different treating catalysts 119. In embodiments, the first catalyst bed 111 may comprise at least 80 wt. %, at least 90 wt. %, at least 95 wt. %, or at least 99 wt. % of the first treating catalyst, on the basis of the total weight of the first catalyst bed 111 and the third catalyst bed 117 may comprise at least 80 wt. %, at least 90 wt. %, at least 95 wt. %, or at least 99 wt. % of the second treating catalyst, on the basis of the total weight of the third catalyst bed 117. In embodiments, the first catalyst bed 111 may comprise at least 80 wt. %, at least 90 wt. %, at least 95 wt. %, or at least 99 wt. % of the second treating catalyst, on the basis of the total weight of the first catalyst bed 111 and the third catalyst bed 117 may comprise at least 80 wt. %, at least 90 wt. %, at least 95 wt. %, or at least 99 wt. % of the first treating catalyst, on the basis of the total weight of the third catalyst bed 117.

The pyrolysis oil feed 102 may enter the first fixed-bed reactor 110. Inside the first fixed-bed reactor 110, the pyrolysis oil feed 102 may contact hydrogen in the presence of the treating catalyst 119 in the first catalyst bed 111, converting at least a portion of the pyrolysis oil feed 102. The resulting reaction products and unconverted pyrolysis oil feed may pass to the second catalyst bed 115 and subsequently contact hydrogen in the presence of the mixed metal oxide catalyst 112 in the second catalyst bed 115, converting at least a portion of the reaction products of the first catalyst bed 111. The resulting reaction products and unconverted pyrolysis oil feed exiting the second catalyst bed 115 may be passed to the third catalyst bed 117 and subsequently contacted with hydrogen in the presence of the treating catalyst 119 in the third catalyst bed 117. In embodiments, the conditions under which the pyrolysis oil feed 102 contacts each of the mixed metal oxide catalyst 112 in the second catalyst bed 115 and the catalysts of the third catalyst bed 117 are substantially the same.

The first fixed-bed reactor 110 may contact the pyrolysis oil feed 102 with hydrogen 116 in the presence of the treating catalyst 119 in the first catalyst bed 111, the mixed metal oxide catalyst in the second catalyst bed 115 downstream of the first catalyst bed 111, and the catalyst in the third catalyst bed 117 downstream of the second catalyst bed 115 at mild operating conditions sufficient to cause at least a portion of multi-ring aromatic compounds in the pyrolysis oil feed 102 to be upgraded to produce an intermediate stream 118, where the intermediate stream 118 comprises di-aromatic, tri-aromatic compounds, or both. The first fixed-bed reactor 110 may be operated at a peak operating temperature in the range of from 200 degrees Celsius (° C.) to 400° C., such as from 250° C. to 400° C., from 250° C. to 300° C., from 300° C. to 400° C., or any combination of these ranges. The first fixed-bed reactor 110 may be operated at an operating pressure of from 1 megapascal (MPa) (10 bar) to 20 MPa (200 bar), such as from 3 MPa (30 bar) to 20 MPa (200 bar), from 5 MPa (50 bar) to 20 MPa (200 bar), from 7 MPa (70 bar) to 20 MPa (200 bar), from 10 MPa (100 bar) to 20 MPa (200 bar), from 12 MPa (120 bar) to 18 MPa (180 bar), from 14 MPa (140 bar) to 16 MPa (160 bar), from 1 MPa (10 bar) to 15 MPa (150 bar), from 3 MPa (30 bar) to 15 MPa (150 bar), from 5 MPa (50 bar) to 15 MPa (150 bar), from 7 MPa (70 bar) to 15 MPa (150 bar), or from 10 MPa (100 bar) to 15 MPa (150 bar). The first fixed-bed reactor 110 may be operated at volume ratio of hydrogen to the pyrolysis oil feed 102 of from 500 to 1500, from 500 to 1400, from 500 to 1300, from 500 to 1200, from 800 to 1500, from 800 to 1400, from 800 to 1300, or from 800 to 1200, at the inlet to the first fixed-bed reactor 110. The first fixed-bed reactor 110 may operate at a liquid hourly space velocity (LHSV) of from 0.1 $h^{-1}$ to 1.2 $h^{-1}$, such as from 0.1 $h^{-1}$ to 1 $h^{-1}$, from 0.1 $h^{-1}$ to 0.8 $h^{-1}$, from 0.1 $h^{-1}$ to 0.6 $h^{-1}$, from 0.2 $h^{-1}$ to 0.4 $h^{-1}$, or any subset thereof. The first fixed-bed reactor 110 may operate at a gas hourly space velocity (GHSV) of from 200 $h^{-1}$ to 1500 $h^{-1}$, such as from 200 $h^{-1}$ to 1200 $h^{-1}$, from 400 $h^{-1}$ to 1200 $h^{-1}$, from 600 $h^{-1}$ to 1000 $h^{-1}$, or any subset thereof.

Figure 8:
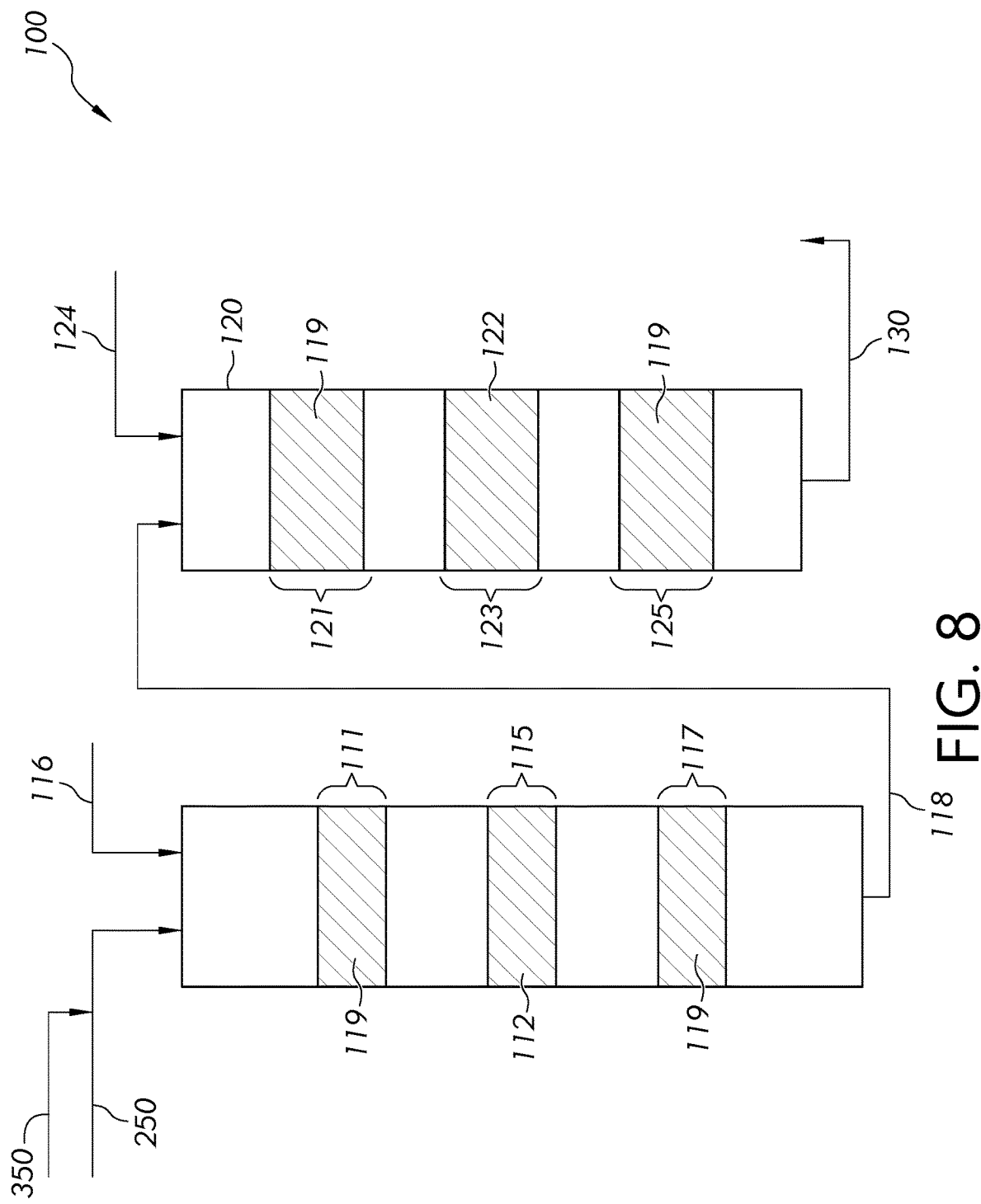
FIG. 8 schematically depicts a generalized flow diagram of a system for upgrading pyrolysis oil, according to one or more embodiments shown and described in this disclosure.

Referring now to FIG. 8, in embodiments, the second fixed-bed reactor 120 may include a first catalyst bed 121 and a second catalyst bed 123 downstream of the first catalyst bed 121, where the second catalyst bed 115 comprises the mesoporous supported metal catalyst 122. In embodiments, the second fixed-bed reactor 120 may include a second catalyst bed 123 comprising the mesoporous supported metal catalyst 122 and a third catalyst bed 125 downstream of the second catalyst bed 123. In embodiments, the second fixed-bed reactor 120 may include the first catalyst bed 121, the second catalyst bed 123 comprising the mesoporous supported metal catalyst 122 downstream of the first catalyst bed 121, and the third catalyst bed 125 downstream of the second catalyst bed 123. The first catalyst bed 121 may comprise the treating catalyst 119, which may have any of the compositions, properties, or other features previously described herein for the treating catalyst 119 (e.g., the first treating catalyst, the second treating catalyst, or a combination of both). The third catalyst bed 125 may comprise the treating catalyst 119, which may have any of the compositions, properties, or other features previously described herein for the treating catalyst 119 (e.g., the first treating catalyst, the second treating catalyst, or a combination of both). The mesoporous supported metal catalyst 122 may be in a separate bed from the first catalyst bed 121 and the third catalyst bed 125, within the second fixed-bed reactor 120. The first catalyst bed 121 comprising the first treating catalyst or the second treating catalyst may be disposed upstream of the second catalyst bed 115 comprising the mesoporous supported metal catalyst 122. Upon passing through the second fixed-bed reactor 120, the intermediate stream 118 may encounter the first catalyst bed 121, before encountering the mesoporous supported metal catalyst 122 in the second catalyst bed 123, before encountering the treating catalyst 119 in the third catalyst bed 125.

In embodiments, the first catalyst bed 121 and the third catalyst bed 125 may both comprise the first treating catalyst. In embodiments, the first catalyst bed 121 may comprise at least 80 wt. %, at least 90 wt. %, at least 95 wt. %, or at least 99 wt. % of the first treating catalyst, on the basis of the total weight of the first catalyst bed 121; and the third catalyst bed 125 may comprise at least 80 wt. %, at least 90 wt. %, at least 95 wt. %, or at least 99 wt. % of the first treating catalyst, on the basis of the total weight of the third catalyst bed 125.

In embodiments, the first catalyst bed 121 and the third catalyst bed 125 may both comprise the second treating catalyst. In embodiments, the first catalyst bed 121 may comprise at least 80 wt. %, at least 90 wt. %, at least 95 wt. %, or at least 99 wt. % of the second treating catalyst, on the basis of the total weight of the first catalyst bed 121; and the third catalyst bed 125 may comprise at least 80 wt. %, at least 90 wt. %, at least 95 wt. %, or at least 99 wt. % of the second treating catalyst, on the basis of the total weight of the third catalyst bed 125.

In embodiments, the first catalyst bed 121 and the third catalyst bed 125 may comprise different catalysts. In embodiments, the first catalyst bed 121 may comprise at least 80 wt. %, at least 90 wt. %, at least 95 wt. %, or at least 99 wt. % of the second treating catalyst, on the basis of the total weight of the first catalyst bed 121; and the third catalyst bed 125 may each comprise at least 80 wt. %, at least 90 wt. %, at least 95 wt. %, or at least 99 wt. % of the first treating catalyst, on the basis of the total weight of the third catalyst bed 125. In embodiments, the first catalyst bed 121 may comprise at least 80 wt. %, at least 90 wt. %, at least 95 wt. %, or at least 99 wt. % of the first treating catalyst, on the basis of the total weight of the first catalyst bed 121; and the third catalyst bed 125 may comprise at least 80 wt. %, at least 90 wt. %, at least 95 wt. %, or at least 99 wt. % of the second treating catalyst, on the basis of the total weight of the third catalyst bed 125.

The intermediate stream 118 may enter the second fixed-bed reactor 120. Inside the second fixed-bed reactor 120, the intermediate stream 118 may contact the first catalyst bed 121 in the presence of hydrogen 124, converting at least a portion of the intermediate stream 118. The resulting reaction products and unconverted intermediate stream may subsequently contact the mesoporous supported metal catalyst 122 in the second catalyst bed 123, in the presence of hydrogen 124, inside the second fixed-bed reactor 120, converting at least a portion of the reaction products of the first catalyst bed 121. The resulting reaction products and unconverted pyrolysis oil feed exiting the second catalyst bed 123 may subsequently contact the third catalyst bed 125 comprising the first treating catalyst or the second treating catalyst. In embodiments, the conditions under which the intermediate stream 118 contacts each of the mesoporous supported metal catalyst 122 in the second catalyst bed 123 and the catalysts of the first catalyst bed 212 and the third catalyst bed 125 are substantially the same.

The second fixed-bed reactor 120 may contact the intermediate stream 118 with hydrogen 124 in the presence of the first catalyst bed 121, the second catalyst bed 123 downstream of the first catalyst bed 121, and the third catalyst bed 125 downstream of the second catalyst bed 123 at mild operating conditions sufficient to cause at least a portion of multi-ring aromatic compounds in the intermediate stream 118 to be upgraded to produce an second reactor effluent 130, where the second reactor effluent 130 comprises aromatic compounds having from 6 to 8 carbon atoms. The second fixed-bed reactor 120 may be operated at an operating temperature in the range of from 200 degrees Celsius (° C.) to 400° C., such as from 250° C. to 400° C., from 250° C. to 300° C., from 300° C. to 400° C., or any combination of these ranges. The second fixed-bed reactor 120 may be operated at an operating pressure of from 1 MPa (10 bar) to 20 MPa (200 bar), such as from 3 MPa (30 bar) to 20 MPa (200 bar), from 5 MPa (50 bar) to 20 MPa (200 bar), from 7 MPa (70 bar) to 20 MPa (200 bar), from 10 MPa (100 bar) to 20 MPa (200 bar), from 1 MPa (10 bar) to 15 MPa (150 bar), from 3 MPa (30 bar) to 15 MPa (150 bar), from 5 MPa (50 bar) to 15 MPa (150 bar), from 7 MPa (70 bar) to 15 MPa (150 bar), or from 10 MPa (100 bar) to 15 MPa (150 bar). The second fixed-bed reactor 120 may be operated at an LHSV of from 0.3 $h^{-1}$ to 1.5 $h^{-1}$, such as from 0.5 $h^{-1}$ to 1.5 $h^{-1}$, from 0.9 $h^{-1}$ to 1.4 $h^{-1}$, from 0.9 $h^{-1}$ to 1.3 $h^{-1}$, from 0.9 $h^{-1}$ to 1.2 $h^{-1}$, from 1.0 $h^{-1}$ to 1.5 $h^{-1}$, from 1.1 $h^{-1}$ to 1.5 $h^{-1}$, from 1.2 $h^{-1}$ to 1.5 $h^{-1}$, from 1.0 $h^{-1}$ to 1.4 $h^{-1}$, from 1.1 $h^{-1}$ to 1.3 $h^{-1}$, or any subset thereof. The second fixed-bed reactor 120 may be operated at a GHSV of from 200 $h^{-1}$ to 1500 $h^{-1}$, such as from 200 $h^{-1}$ to 1200 $h^{-1}$, from 400 $h^{-1}$ to 1200 $h^{-1}$, from 600 $h^{-1}$ to 1000 $h^{-1}$, from 700 $h^{-1}$ to 900 $h^{-1}$, about 800 $h^{-1}$, or any subset thereof.

Upgrading pyrolysis oil feed 102 by a two stage catalytic process of the present disclosure may produce a greater yield of benzene, toluene, ethylbenzene, xylenes, or combinations of these, compared to upgrading the pyrolysis oil by conventional single stage catalytic process. In embodiments, the systems 100 of the present disclosure may produce a combined yield of benzene, toluene, ethylbenzene, xylenes, or combinations of these, of greater than or equal to 30 wt. %, greater than or equal to 35 wt. %, greater than or equal to 40 wt. %, or even greater than or equal to 45 wt. %, based on the total weight of the pyrolysis oil of the pyrolysis oil feed 102 introduced to the two stage catalytic process of the present disclosure.

Still referring to FIG. 1, a method for upgrading pyrolysis oil feed 102 may include contacting the pyrolysis oil feed 102 with hydrogen 116 in the presence of a first catalyst bed 111 comprising a treating catalyst 119 and a second catalyst bed 115 comprising a mixed metal oxide catalyst 112 at reaction conditions to produce an intermediate stream 118 comprising di-aromatic compounds and/or tri-aromatic compounds. As previously described in the present disclosure, contacting the pyrolysis oil feed 102 with hydrogen 116 in the presence of the first catalyst bed 111 comprising a treating catalyst 119 and a second catalyst bed 115 comprising a mixed metal oxide catalyst 112 at the reaction conditions may convert at least a portion of the multi-ring aromatic compounds in the pyrolysis oil feed 102 to di-aromatic compounds and/or tri-aromatic compounds. The reaction conditions may include a peak temperature of from 200° C. to 400° C., a pressure of from 1 MPa (10 bar) to 20 MPa (200 bar), a volume ratio of mixed metal oxide catalyst 112 to pyrolysis oil feed 102 in the first fixed-bed reactor 110 may range from 500 to 1500, or combinations of these reaction conditions.

The first fixed-bed reactor 110 may have any of the features, catalysts, or operating conditions previously discussed in this disclosure for the first fixed-bed reactor 110. The method may also include contacting the pyrolysis oil feed 102 and hydrogen 116 with a treating catalyst 119 in the first fixed-bed reactor 110 upstream of the mixed metal oxide catalyst 112. The method may also include contacting the reaction products from the mixed metal oxide catalyst 112 with another treating catalyst 119 downstream of the mixed metal oxide catalyst 112 in the first fixed-bed reactor 110. The method may include passing the intermediate stream 118 comprising the di-aromatic compounds and/or tri-aromatic compounds to a second fixed-bed reactor 120 downstream of the first fixed-bed reactor 110. The method may include contacting the intermediate stream 118 with hydrogen 124 in the presence of a mesoporous supported metal catalyst 122 at reaction conditions to produce a second reactor effluent 130 comprising aromatic compounds having six to eight carbon atoms. As previously described in the present disclosure, contacting the intermediate stream 118 with hydrogen 124 in the presence of the mesoporous supported metal catalyst 122 at the reaction conditions may cause at least a portion of the di-aromatic compounds and/or tri-aromatic compounds in the intermediate stream 118 to react to form to aromatic compounds having six to eight carbon atoms. The reaction conditions may include a peak temperature of from 200° C. to 400° C., a pressure of from 1 MPa (10 bar) to 20 MPa (200 bar), or combinations of these reaction conditions. The second fixed-bed reactor 120 may have any of the features, catalysts, or operating conditions previously discussed in this disclosure for the second fixed-bed reactor 120.

A first aspect of the present disclosure may be directed to a system for upgrading pyrolysis oil, the system comprising a first fixed-bed reactor comprising a first catalyst bed and a second catalyst bed disposed downstream of the first catalyst bed. The first catalyst bed may comprise a treating catalyst comprising: (1) a first treating catalyst comprising a plurality of first particles and each of the plurality of first particles comprises alumina, binder, Mo, Ni, and P; (2) a second treating catalyst comprising a plurality of second particles and each of the plurality of second particles comprises $Al_2O_3$, $SiO_2$, $ZrO_2$, NiO, and $WO_3$; or (3) both. The second catalyst bed may comprises a mixed metal oxide catalyst. The first fixed-bed reactor may be operable to contact a pyrolysis oil feed with hydrogen in the presence of the treating catalyst and the mixed metal oxide catalyst to produce an intermediate stream comprising light aromatic compounds that include mono-aromatic compounds, di-aromatic compounds, tri-aromatic compounds, or both. The system may further comprise a second fixed-bed reactor downstream of the first fixed-bed reactor and comprising a mesoporous supported metal catalyst. The second fixed-bed reactor may be operable to contact the intermediate stream with hydrogen in the presence of the mesoporous supported metal catalyst to produce a second reactor effluent comprising aromatic compounds having six to eight carbon atoms. The mesoporous supported metal catalyst may comprise nickel and tungsten impregnated onto a mesoporous support comprising alumina and at least one zeolite.

A second aspect of the present disclosure may include the first aspect, in which the mixed metal oxide catalyst may comprise a plurality of MMO particles and each of the plurality of MMO particles comprises $Fe_2O_3$, $ZrO_2$, $CeO_2$, and $Al_2O_3$.

A third aspect of the present disclosure may include the second aspect, in which the MMO particles of the mixed metal oxide catalyst each may comprise from 60 wt. % to 95 wt. % iron oxide, from 1 wt. % to 20 wt. % zirconium oxide, from 0.1 wt. % to 10 wt. % cerium oxide, and from 1 wt. % to 20 wt. % aluminum oxide, where the weight percentages are based on the total metal oxide weight of the MMO particles in the mixed metal oxide catalyst.

A fourth aspect of the present disclosure may include any one of the first through third aspects, in which the mixed metal oxide catalyst may be in the form of pellets.

A fifth aspect of the present disclosure may include any one of the first through fourth aspects, in which the zeolite of the mesoporous supported metal catalyst may comprise both nano zeolite beta and USY zeolite.

A sixth aspect of the present disclosure may include any one of the first through fifth aspects, wherein: the mesoporous supported metal catalyst may comprise from 2 wt. % to 10 wt. % of the large pore alumina, from 10 wt. % to 20 wt. % of a binder material, from 40 wt. % to 60 wt. % of the zeolite, from 4 wt. % to 8 wt. % of the nickel oxide, and from 20 wt. % to 30 wt. % of the tungsten oxide, on the basis of the total weight of the mesoporous supported metal catalyst; the zeolite may comprise a USY zeolite and a nano-sized zeolite beta; and a weight ratio of USY:nano-sized zeolite beta may be from 1.25 to 1.75.

A seventh aspect of the present disclosure may include any one of the first through sixth aspects, wherein the treating catalyst in the first catalyst bed may comprise the first treating catalyst, wherein the first treating catalyst comprises from 52 wt. % to 74.5 wt. % of $Al_2O_3$, from 15 wt. % to 25 wt. % of binder, from 10 wt. % to 15 wt. % of MoO, from 3 wt. % to 5 wt. % of NiO, and from 0.5 wt. % to 3 wt. % of $P_4O_6$, on the basis of the total metal oxide weight of the first treating catalyst.

An eighth aspect of the present disclosure may include any one of the first through seventh aspects, wherein the treating catalyst in the first catalyst bed may comprise the second treating catalyst, wherein the second treating catalyst may comprise: from 18.5 wt. % to 21.5 wt. % of $Al_2O_3$, from 36.5 wt. % to 39.5 wt. % of $SiO_2$, from 9.2 wt. % to 10.2 wt. % of $ZrO_2$, from 10.5 wt. % to 11.5 wt. % of NiO, and from 18.5 wt. % to 21.5 wt. % of $WO_3$, on the basis of the total metal oxide weight of the second treating catalyst.

A ninth aspect of the present disclosure may include any one of the first through eighth aspects, wherein the first fixed-bed reactor may comprise a third catalyst bed downstream from the second catalyst bed, and the third catalyst bed may comprise the first treating catalyst, the second treating catalyst, or both.

A tenth aspect of the present disclosure may include the ninth aspect, wherein: the second fixed-bed reactor may comprise a first catalyst bed, a second catalyst bed downstream from the first catalyst bed, and a third catalyst bed downstream from the second catalyst bed; the first catalyst bed and the third catalyst bed of the second fixed-bed reactor may comprise the treating catalyst; and the second catalyst bed of the second fixed-bed reactor may comprise the mesoporous supported metal catalyst.

An eleventh aspect of the present disclosure may include the tenth aspect, wherein the first catalyst bed and the third catalyst bed of the first fixed-bed reactor and the first catalyst bed and the third catalyst bed of the second fixed-bed reactor each may comprise the first treating catalyst.

A twelfth aspect of the present disclosure may include any one of the first through eleventh aspects, and may be directed to a method for upgrading pyrolysis oil, where the method may comprise introducing the pyrolysis oil to the system of any one of the first through eleventh aspects; contacting the pyrolysis oil feed with hydrogen in the presence of the treating catalyst and the mixed metal oxide catalyst of the first fixed-bed reactor to produce an intermediate stream comprising di-aromatic compounds, tri-aromatic compounds, or combinations thereof; and contacting the intermediate stream with hydrogen in the presence of the mesoporous supported metal catalyst of the second fixed-bed reactor to produce a second reactor effluent comprising aromatic compounds having six to eight carbon atoms.

A thirteenth aspect of the present disclosure may include the twelfth aspect, further comprising mixing a heavy pyrolysis oil from a naphtha steam cracker with a light aromatic stream upstream of the first fixed-bed reactor to produce the pyrolysis oil feed and passing the pyrolysis oil feed to the first fixed-bed reactor.

A fourteenth aspect of the present disclosure may include the thirteenth aspect, wherein the pyrolysis oil feed may comprise from 75 wt. % to 85 wt. % of the heavy pyrolysis oil and from 15 wt. % to 25 wt. % of the light aromatic stream.

A fifteenth aspect of the present disclosure may include any one of the twelfth through fourteenth aspects, in which the pyrolysis oil feed may comprise greater than or equal to 30 weight percent (wt. %) multi-ring aromatic compounds having greater than or equal to sixteen carbon atoms based on the total weight of the pyrolysis oil in the pyrolysis oil feed.

A sixteenth aspect of the present disclosure may include any one of the twelfth through fifteenth aspects, comprising contacting the pyrolysis oil feed with hydrogen in the presence of the first treating catalyst or the second treating catalyst in the first fixed-bed reactor at one or more of the following reaction conditions: (a) a peak temperature of from 200 degrees Celsius (° C.) to 400° C.; (b) a pressure of from 1 megapascal (MPa) (10 bar) to 20 MPa (200 bar); (c) a volume ratio of hydrogen to the pyrolysis oil feed of from 500 to 1500, or combinations of these reaction conditions; contacting the pyrolysis oil feed with hydrogen in the presence of the mixed metal oxide catalyst in the first fixed-bed reactor at one or more of the following reaction conditions: (a) a peak temperature of from 200 degrees Celsius (° C.) to 400° C.; (b) a pressure of from 1 megapascal (MPa) (10 bar) to 20 MPa (200 bar); (c) a volume ratio of hydrogen to the pyrolysis oil feed of from 500 to 1500, or combinations of these reaction conditions; and contacting the intermediate stream with hydrogen in the presence of the mesoporous supported metal catalyst in the second fixed-bed reactor at one or more of the following reaction conditions: (a) a temperature of from 200° C. to 400° C. (b) a pressure of from 1 MPa (10 bar) to 20 MPa (200 bar), or combinations of these reaction conditions.

A seventeenth aspect of the present disclosure may include any one of the twelfth through sixteenth aspects, wherein a peak temperature in the first catalyst bed of the first reactor may be from 30° C. to 80° C. less than a peak temperature in the second catalyst bed of the first reactor.

An eighteenth aspect of the present disclosure may include any one of the twelfth through seventeenth aspects, in which contacting the pyrolysis oil feed with hydrogen in the presence of the first treating catalyst and the mixed metal oxide catalyst and contacting the intermediate stream with hydrogen in the presence of the mesoporous zeolite supported metal catalyst may result in a yield of greater than or equal to 45 wt. % of the aromatic compounds having six to eight carbons based on the total weight of pyrolysis oil in the pyrolysis oil feed.

A nineteenth aspect of the present disclosure may include any one of the twelfth through eighteenth aspects, further comprising: steam cracking a naphtha stream to produce one or more product streams and a heavy pyrolysis oil; and passing the heavy pyrolysis oil to the first fixed-bed reactor as at least a portion of the pyrolysis oil feed.

A twentieth aspect of the present disclosure may include any one of the twelfth through nineteenth aspects, further comprising: steam cracking a hydrocarbon gas to produce at least one light olefin stream and a light pyrolysis oil; and passing the light pyrolysis oil to the first fixed-bed reactor as at least a portion of the pyrolysis oil feed.

EXAMPLES

The various embodiments of methods and systems for the processing of heavy oils will be further clarified by the following examples. The examples are illustrative in nature, and should not be understood to limit the subject matter of the present disclosure.

In some of the examples included herein, a second treating catalyst was used. The second treating catalyst comprised a plurality of second particles and each of the plurality of second particles comprised $Al_2O_3$, $SiO_2$, $ZrO_2$, NiO, and $WO_3$. The second treating catalyst comprised: 18.5 wt. % to 21.5 wt. % of $Al_2O_3$, 36.5 wt. % to 39.5 wt. % of $SiO_2$, 9.2 wt. % to 10.2 wt. % of $ZrO_2$, 10.5 wt. % to 11.5 wt. % of NiO, and from 18.5 wt. % to 21.5 wt. % of $WO_3$, on the basis of the total metal oxide weight of the second treating catalyst.

Example 1: Mixed Metal Oxide Catalyst Preparation

To prepare a mixed metal oxide catalyst comprising iron oxide, zirconium oxide, cerium oxide, and aluminum oxide, 40 grams (g) of iron(III) nitrate nonahydrate ($Fe(NO_3)_3 \cdot 9H_2O$) was dissolved in 800 milliliters (mL) of distilled water to make Solution A. Then, the other metal oxide precursors were added into Solution A. Specifically, 4.906 g of aluminum nitrate nonahydrate ($Al(NO_3)_3 \cdot 9H_2O$), 1.549 g of zirconium(IV) oxynitrate hydrate ($ZrO(NO_3)_2$: $3H_2O$), and 0.601 g of cerium(III) nitrate hexahydrate ($Ce(NO_3)_3 \cdot 6H_2O$) were added into Solution A to form Solution B. Solution B was then stirred for thirty minutes.

An ammonia solution, Solution C, was prepared by adding 40 mL ammonium hydroxide ($NH_4OH$) (28-30 percentages (%) $NH_3$ basis) in 60 mL distilled water. Solution C was added slowly into Solution B to produce Solution D. Solution C was added until the pH value of Solution D reached roughly 7. Solution D was then stirred for another hour.

After preparing Solution D and another hour of stirring, the precipitate was separated from Solution D and dried in an oven overnight (i.e., for about twelve hours). The dried precipitate was then calcined in air at 500 degrees Celsius (° C.) for two hours. After calcining, the dried and calcined precipitate was crushed to obtain MMO particles in the form of a fine powder. The MMO particles were nanoparticles with particle sizes in the range of from 20 nm to 200 nm.

The powdered MMO particles were then mixed with bentonite and methylcellulose in a ratio of 75 wt. % powdered MMO catalyst, 24.9 wt. % of bentonite, and 0.1 wt. % of methylcellulose. The weights of the MMO particles and bentonite are based on the weight of these constituents after calcination using loss-on-ignition. The loss-on-ignition weight of the constituents were determined by precisely weighing 3 grams of each component into a crucible and recording the mass of each component added. The crucibles were placed into a furnace, and each component was calcined by ramping the components to a temperature of 650° C. at a temperature ramp rate of 2° C./minute, and holding the components at 650° C. for 2 hours. Once calcination was complete, the crucibles were removed from the furnace and allowed to cool in a desiccator to prevent re-adsorption of water or other constituents from the atmosphere. The calcined components were then re-weighed and the mass recorded. The loss-on-ignition weight of each of the components were calculated from the recorded mass after calcination and the recorded mass before the calcination.

The dry components were well mixed. Then, approximately 1.5 mL water/1 g catalyst was mixed in to form an extrudable paste. The extrudable paste was inserted into the syringe of a syringe pump and extruded at 3 mL/min into cylindrical bodies with a 2.1 mm diameter.

The extruded samples were dried in a 60° C. oven for 24 hours. The dried samples were then calcined in air at 650° C. for 2 hours with a ramp rate of 2° C./min. The calcined samples were then cooled to room temperature and then broken into pellets. The pellets were then sieved to obtain a fraction of the mixed metal oxide catalyst pellets having a largest overall dimension of from 1 mm to 2 mm. The mixed metal oxide catalyst pellets are characterized in Table 2.

TABLE 2

| $d_a$ (nm) BJH Adsorption avg pore width | $S_{BET}$ (m²/g) | $S_{ext}$ (m²/g) | $V_{mic}$ (cc/g) | $V_{tot}$ (cc/g) |
|---|---|---|---|---|
| 14.6 | 49.1 | 42.5 | 0 | 0.157 |

Example 2: Treating Catalyst Preparation

In Example 2, the first treating catalyst was prepared. First, an alumina support and a binder comprising a large-pore Bohemite were mixed with water to form a paste. The large-pore Bohemite binder was CATAPAL B bohemite from Sasol, which had a pore volume of 0.5 mL/g. The paste was then extruded to form cylindrical extrudates having a length in a range of from 3 mm to 5 mm and a diameter in a range of from 2 mm to 3 mm. The extrudates were then dried at 100° C. to 120° C. for 4 to 12 hours, then calcined in air at a temperature of 550° C. for 4 hours (ramp 2° C./min).

The calcined extrudates were then impregnated with metals by immersing them in a solution of water, ammonium heptamolybdate, nickel carbonate, and $H_3PO_4$. The impregnated extrudates were then dried at 100° C. to 120° C. for 4 to 12 hours, then calcined in air at a temperature of 550° C. for 4 hours (ramp 2° C./min) to form the second treating catalyst that comprised from 52 wt. % to 71.5 wt. % of alumina, from 15 wt. % to 25 wt. % of binder, from 10 wt. % to 14 wt. % of molybdenum oxide, from 3 wt. % to 5 wt. % of nickel oxide, and from 0.5 wt. % to 3 wt. % of phosphorous oxide.

Example 3: Mesoporous Supported Metal Catalyst Preparation

In Example 3, the mesoporous supported metal catalyst was prepared by first preparing a binder composition. 29.25 g of an alumina binder (CATAPAL B, commercially available from Sasol Germany GmbH) was combined with 63.3 g of water and 3.45 mL of 67%-69% $HNO_3$ to form a uniform binder paste.

Then, a zeolite paste was prepared. 7.4 g of large pore alumina (having a Brunauer-Emmett-Teller (BET) surface area of 150 m²/g, a pore volume of 0.8 mL/g to 1.1 mL/g, and a pore radius of 11 nm; commercially available as CATAPAL B from Sasol Inc.), 49.2 g of USY zeolite (commercially available as CBV-720 from Zeolyst International), and 28.6 g of nano zeolite beta were combined to produce a zeolite mixture. Details of the nano zeolite beta are given in Table 3. The zeolite mixture was then mixed with the uniform binder paste to form support paste.

TABLE 3

| BET Surface area, m²/g | 590 |
|---|---|
| Micropore | 284 |

TABLE 3-continued

| | |
|---|---|
| Mesopore | 306 |
| BET Pore volume, ml/g | 0.83 |
| Micropore | 0.15 |
| Mesopore | 0.68 |
| % Meso | 81.9 |
| BET Average pore size, nm | 2.8 |
| XRD Crystallinity, % | 100% |
| $SiO_2/Al_2O_3$ molar ratio | 14.9 |
| Average particle size (SEM), nm | 60 |

The support paste was inserted into the syringe of a syringe pump and extruded at 3 mL/min into cylindrical bodies with a 2.1 mm diameter. The extruded samples were dried in a 110° C. oven overnight. The dried samples were calcined in air at 550° C. for 4 hours with a ramp rate of 2° C./min. The cooled samples were broken into pellets of about 2 mm to about 4 mm in length.

Then, the pellets were impregnated with the metals nickel (Ni) and tungsten (W). A Ni/W metal solution was prepared by combining $(NH_4)_{10}(H_2W_{12}O_{42})\cdot xH_2O$ (ammonium metatungstate); $Ni(NO_3)_2\cdot 6H_2O$ (nickel nitrate hexahydrate); and water to produce an Ni/W metal solution. The pellets were mixed with the Ni/W metal solution at room temperature for 3 hours. The impregnated samples were dried in a 110° C. oven overnight. The dried samples were then calcined in air at 500° C. for 4 hours with a ramp rate of 2° C./min.

Upgrading Pyrolysis Oil by Two-Stage Hydrocracking

In the following Examples EX-4, EX-5, EX-6, EX-7, and EX-8, the performance of the process including differing configurations of the mixed metal oxide catalyst of Example 1, the second treating catalyst, the first treating catalyst of Example 2, and the mesoporous supported metal catalyst of Example 3 for upgrading pyrolysis oil were evaluated. For Examples 4-8, 80 wt. % of heavy pyrolysis oil from a liquid stream cracker was mixed with 20 wt. % of light pyrolysis oil from a gas steam cracker to produce the pyrolysis oil feed. Simulated distillation of the pyrolysis oil feed is shown in Table 4. The proportions of the naphtha fraction, diesel fraction, and C16+ fraction of the pyrolysis oil feed are shown in Table 4. Table 5 provides the percentages of each different classification of aromatic compounds in the pyrolysis oil feed based on the total weight of the pyrolysis oil feed.

The pyrolysis oil feed and hydrogen gas were introduced together to the first fixed bed reactor. Before introduction, the pyrolysis oil feed was preheated to the reactor operating temperature. The first reactor included a first bed and a second bed downstream of the first bed.

In Example EX-4, the first reactor included a single fixed bed. The single fixed bed included 4.7 g of the mixed metal oxide (MMO) catalyst produced according to Example 1. The second fixed-bed reactor included a single bed comprising 0.9 g of the Mesoporous Supported Metal Catalyst produced in Example-3.

In Example EX-5, the first reactor included a first fixed bed and a second fixed bed downstream of the first fixed bed. The first fixed bed included 2.3 g of the mixed metal oxide (MMO) catalyst produced according to Example 1. The second fixed bed included 1.8 g of the second treating catalyst. The second fixed-bed reactor included a single bed of 0.9 g of Mesoporous Supported Metal Catalyst produced in Example-3.

In Example EX-6, the first reactor included a first fixed catalyst bed, a second fixed bed downstream of the first fixed bed, and a third fixed bed downstream of the second fixed bed. The first fixed bed and the third fixed bed each included 4.0 g of the second treating catalyst. The second fixed bed included 3.1 g of the mixed metal oxide (MMO) catalyst produced according to Example 1. In Example EX-6, the second fixed-bed reactor included a first fixed bed, a second fixed bed downstream of the first fixed bed, and a third fixed bed downstream of the second fixed bed. The first fixed bed and the third fixed bed of the second reactor each included 4.0 g of the second treating catalyst. The second fixed bed of the second reactor included 3.0 g of the Mesoporous Supported Metal Catalyst produced in Example-3.

In Example EX-7, the first reactor included a first fixed bed and a second fixed bed downstream of the first fixed bed. The first fixed bed included 3.4 g of the second treating catalyst. The second fixed bed 3.1 g of the mixed metal oxide (MMO) catalyst produced according to Example 1. In Example EX-7, the second fixed-bed reactor included a single bed of 3.0 g of the Mesoporous Supported Metal Catalyst produced in Example-3.

In Example EX-8, the first reactor included a first fixed bed and a second fixed bed downstream of the first fixed bed. The first fixed bed included 2.5 g of the first treating catalyst produced according to Example 2. The second fixed bed included 3.1 g of the mixed metal oxide (MMO) catalyst produced according to Example 1. In Example EX-8, the second fixed-bed reactor included a single bed of 3.0 g of the Mesoporous Supported Metal Catalyst produced in Example-3.

The pyrolysis oil feed was introduced to the first fixed-bed reactor with a liquid hourly space velocity (LHSV) of 0.3 $h^{-1}$, a gas hourly space velocity (GHSV) of 800 $h^{-1}$, a pressure of 150 bar, and a reactor temperature of 280° C. to 300° C. The intermediate stream produced in the first reactor was then introduced to a second fixed-bed reactor. The second fixed-bed reactor was operated at an LHSV of 1.2 $h^{-1}$, a GHSV of 800 $h^{-1}$, a pressure of 150 bar, and a reactor temperature of 260° C. to 300° C. The outlet of the second fixed-bed reactor was subjected to analysis including simulated distillation, gas product analysis, and liquid product analysis. Simulated distillation results are shown in Table 4 and aromatic analysis results are shown in Table 5.

Gas product analysis: The content of gas products was analyzed by on-line gas chromatography with both FID and TCD detectors. Liquid product analysis: The API gravity at was analyzed using a DMA 4100 M density meter from Anton Paar, according to ASTM D4052 and D5002. The Sulfur and nitrogen content were analyzed using Mitsubishi, Antek, and Analytik Jena analyzers according to ASTM D4629. Gas hydrocarbons are defined as $C_1$ to $C_4$ hydrocarbons. Naphtha is defined as $C_5$ hydrocarbons to hydrocarbons boiling at 173° C. Diesel is defined as hydrocarbons boiling at from 173° C. to 404° C. $C_{16+}$ hydrocarbons are defined as those boiling above 404° C. Simulated distillation was performed on an Agilent 7890 gas chromatograph according to CSN EN 15199-2. Viscosity was analyzed according to ASTM D7042.

TABLE 4

| | Feed | EX-4 | EX-5 | EX-6 | EX-7 | EX-8 |
|---|---|---|---|---|---|---|
| Gas ($C_1$-$C_4$) (wt. %) | 0 | 24.4 | 14.5 | 2.7 | 0.1 | 0 |
| Naphtha ($C_5$ to 173° C.) (wt. %) | 20 | 33.0 | 23.9 | 34.7 | 46.7 | 36.1 |

TABLE 4-continued

|  | Feed | EX-4 | EX-5 | EX-6 | EX-7 | EX-8 |
|---|---|---|---|---|---|---|
| Diesel (173° C. to 404° C.) (wt. %) | 40 | 26.0 | 49.3 | 58.0 | 27.0 | 36.0 |
| $C_{16+}$ (boiling at greater than 404° C.) (wt. %) | 40 | 16.6 | 12.2 | 4.6 | 26.2 | 27.8 |

In Table 4, the weight percentages are based on the total weight of the pyrolysis oil feed.

TABLE 5

|  | Feed | EX-4 | EX-5 | EX-6 | EX-7 | EX-8 |
|---|---|---|---|---|---|---|
| Mono-aromates (wt. %) | 21 | 14.7 | 41.2 | 6.0 | 56.4 | 60.5 |
| Di-aromates (wt. %) | 30 | 1.6 | 5.6 | 0.5 | 7.9 | 7.8 |
| Tri-aromates (wt. %) | 3 | 0.3 | 1.0 | N/A | 0.6 | 0.7 |

In Table 5, the weight percentages are based on the total weight of the pyrolysis oil feed.

As is shown in Table 5, the present process results in the conversion of significant quantities of di- and tri-aromates to mono-aromates, thereby facilitating the production of useful chemicals.

Extended Operation Testing

Figure 9:
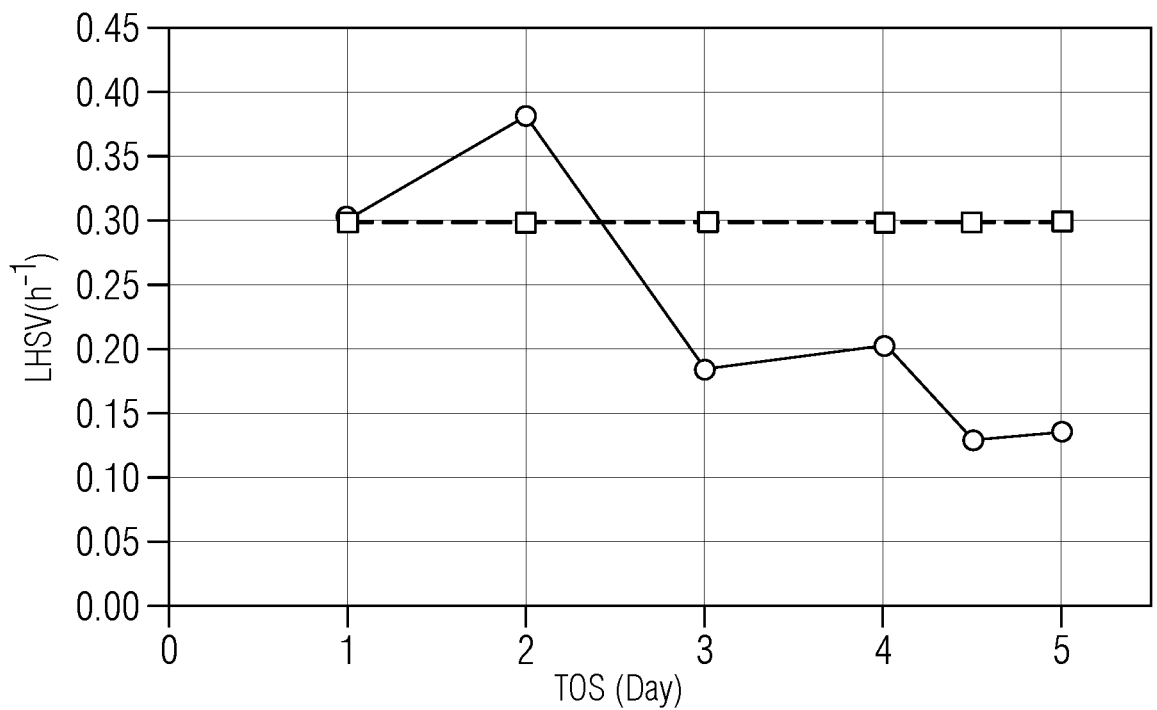
FIG. 9 graphically depicts the change in liquid hourly space velocity (LHSV) in a rector over time, according to one or more embodiments shown and described in the disclosure.
Figure 10:
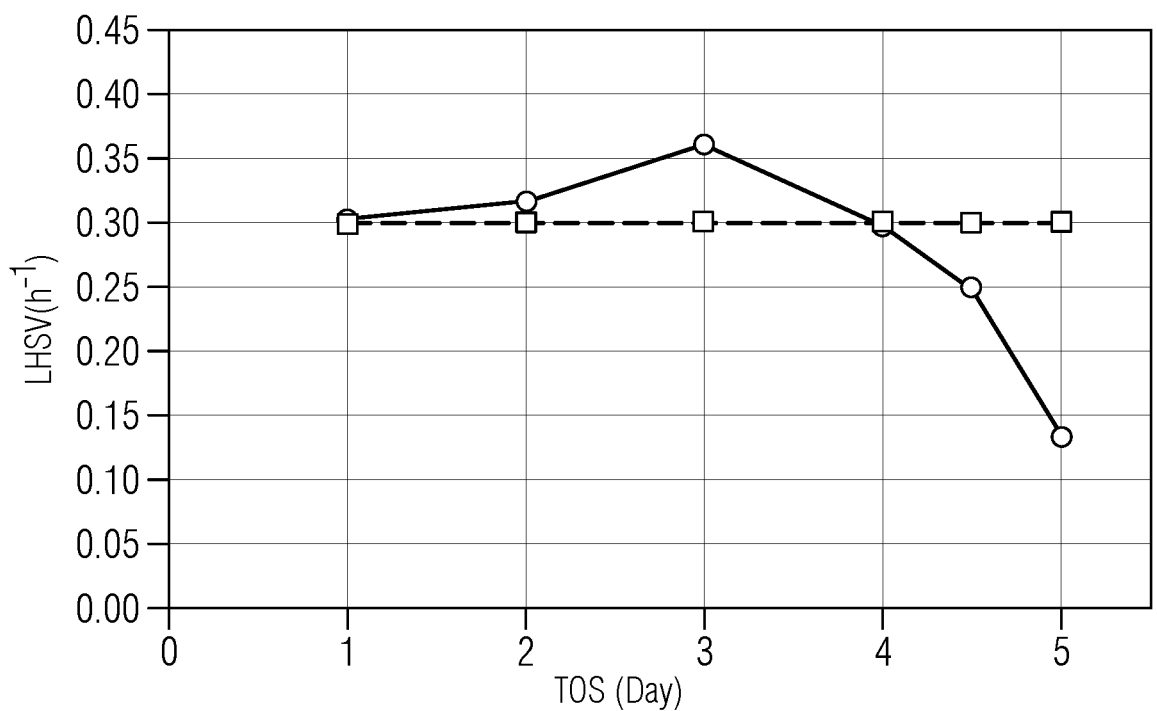
FIG. 10 graphically depicts the change in liquid hourly space velocity (LHSV) in a rector over time, according to one or more embodiments shown and described in the disclosure.

During the operation of Example EX-4, Example EX-5, Example EX-6, and Example EX-7, the change in liquid hourly space velocity (LHSV) at constant pump pressure was evaluated to determine plugging caused by coke production. As is shown in FIG. 9, Example EX-4 was plugged within two days of operation. As is shown in FIG. 10, Example EX-5 was plugged within four days of operation.

Although not shown in the figures, Example EX-6 showed no signs of plugging after 13 days of operation. Table 6 shows the coke present in reach reaction bed of Example EX-6 after 13 days of operation. As is shown in Table 6, the catalyst in the first catalyst bed in the first reactor protected the overall reactor from plugging. Without being limited by theory, this protection is believed to be because the $1^{st}$ bed, which was operated at a temperature of about 50° C. less than the temperature in the $2^{nd}$ bed zone of the first reactor, protected the MMO catalyst of the $2^{nd}$ bed from producing excess coke.

TABLE 6

| $1^{st}$ reactor | | | $2^{nd}$ reactor | | |
|---|---|---|---|---|---|
| $1^{st}$ bed | $2^{nd}$ bed | $3^{rd}$ bed | $1^{st}$ bed | $2^{nd}$ bed | $3^{rd}$ bed |
| 8.6 wt. %-12 wt. % | 2.7 wt. %-3.6 wt. % | 2.6 wt. %-3.0 wt. % | 2.6 wt. %-3.0 wt. % | 2.6 wt. %-3.0 wt. % | 2.6 wt. %-3.0 wt. % |

Example EX-8 showed no plugging or decrease in LHSV after 70 days of operation. Without being limited by theory, this performance improvement is believed to be because the $1^{st}$ bed, which was operated at a temperature of about 50° C. less than the temperature in the $2^{nd}$ bed zone of the first reactor, protected the MMO catalyst of the $2^{nd}$ bed from producing excess coke.

It is noted that any two quantitative values assigned to a property may constitute a range of that property, and all combinations of ranges formed from all stated quantitative values of a given property are contemplated in this disclosure.

It is noted that one or more of the following claims utilize the term "where" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising."

Having described the subject matter of the present disclosure in detail and by reference to specific aspects, it is noted that the various details of such aspects should not be taken to imply that these details are essential components of the aspects. Rather, the claims appended hereto should be taken as the sole representation of the breadth of the present disclosure and the corresponding scope of the various aspects described in this disclosure. Further, it will be apparent that modifications and variations are possible without departing from the scope of the appended claims.

What is claimed is:

1. A system for upgrading pyrolysis oil, the system comprising:
a first fixed-bed reactor comprising a first catalyst bed and a second catalyst bed disposed downstream of the first catalyst bed, where:
the first catalyst bed comprises a treating catalyst comprising:
a first treating catalyst comprising a plurality of first particles and each of the plurality of first particles comprises alumina, binder, Mo, Ni, and P; or a second treating catalyst comprising a plurality of second particles and each of the plurality of second particles comprises $Al_2O_3$, $SiO_2$, $ZrO_2$, NiO, and $WO_3$;
or both;
the second catalyst bed comprises a mixed metal oxide catalyst;
the first fixed-bed reactor is operable to contact a pyrolysis oil feed with hydrogen in the presence of the treating catalyst and the mixed metal oxide catalyst to produce an intermediate stream comprising light aromatic compounds that include mono-aromatic compounds, di-aromatic compounds, tri-aromatic compounds, or combinations thereof;
a second fixed-bed reactor downstream of the first fixed-bed reactor and comprising a mesoporous supported metal catalyst, where:
the second fixed-bed reactor is operable to contact the intermediate stream with hydrogen in the presence of the mesoporous supported metal catalyst to produce a second reactor effluent comprising aromatic compounds having six to eight carbon atoms; and
the mesoporous supported metal catalyst comprises nickel and tungsten impregnated onto a mesoporous support comprising alumina and at least one zeolite.

2. The system of claim 1, in which the mixed metal oxide catalyst comprises a plurality of MMO particles and each of the plurality of MMO particles comprises $Fe_2O_3$, $ZrO_2$, $CeO_2$, and $Al_2O_3$.

3. The system of claim 2, in which the MMO particles of the mixed metal oxide catalyst each comprise:
from 60 wt. % to 95 wt. % iron oxide;
from 1 wt. % to 20 wt. % zirconium oxide;

from 0.1 wt. % to 10 wt. % cerium oxide; and
from 1 wt. % to 20 wt. % aluminum oxide,
where the weight percentages are based on the total metal oxide weight of the MMO particles in the mixed metal oxide catalyst.

4. The system of claim 1, in which the mixed metal oxide catalyst is in the form of pellets.

5. The system of claim 1, in which the zeolite of the mesoporous supported metal catalyst comprises both nano zeolite beta and USY zeolite.

6. The system of claim 1, wherein:
the mesoporous supported metal catalyst comprises from 2 wt. % to 10 wt. % of the large pore alumina, from 10 wt. % to 20 wt. % of a binder material, from 40 wt. % to 60 wt. % of the zeolite, from 4 wt. % to 8 wt. % of the nickel oxide, and from 20 wt. % to 30 wt. % of the tungsten oxide, on the basis of the total weight of the mesoporous supported metal catalyst;
the zeolite comprises a USY zeolite and a nano-sized zeolite beta; and
a weight ratio of USY:nano-sized zeolite beta is from 1.25 to 1.75.

7. The system of claim 1, wherein the treating catalyst in the first catalyst bed comprises the first treating catalyst, wherein the first treating catalyst comprises:
from 52 wt. % to 74.5 wt. % of $Al_2O_3$,
from 15 wt. % to 25 wt. % of binder,
from 10 wt. % to 15 wt. % of MoO,
from 3 wt. % to 5 wt. % of NiO, and
from 0.5 wt. % to 3 wt. % of $P_4O_6$, on the basis of the total metal oxide weight of the first treating catalyst.

8. The system of claim 1, wherein the treating catalyst in the first catalyst bed comprises the second treating catalyst, wherein the second treating catalyst comprises:
from 18.5 wt. % to 21.5 wt. % of $Al_2O_3$,
from 36.5 wt. % to 39.5 wt. % of $SiO_2$,
from 9.2 wt. % to 10.2 wt. % of $ZrO_2$,
from 10.5 wt. % to 11.5 wt. % of NiO, and
from 18.5 wt. % to 21.5 wt. % of $WO_3$, on the basis of the total metal oxide weight of the second treating catalyst.

9. The system of claim 1, wherein:
the first fixed-bed reactor comprises a third catalyst bed downstream from the second catalyst bed, and
the third catalyst bed comprises the first treating catalyst, the second treating catalyst, or both.

10. The system of claim 9, wherein:
the second fixed-bed reactor comprises a first catalyst bed, a second catalyst bed downstream from the first catalyst bed, and a third catalyst bed downstream from the second catalyst bed;
the first catalyst bed and the third catalyst bed of the second fixed-bed reactor comprise the treating catalyst; and
the second catalyst bed of the second fixed-bed reactor comprises the mesoporous supported metal catalyst.

11. The system of claim 10, wherein the first catalyst bed and the third catalyst bed of the first fixed-bed reactor and the first catalyst bed and the third catalyst bed of the second fixed-bed reactor each comprise the first treating catalyst.

12. A method for upgrading pyrolysis oil, the method comprising:
introducing the pyrolysis oil to the system of claim 1,
contacting a pyrolysis oil feed with hydrogen in the presence of the treating catalyst and the mixed metal oxide catalyst of the first fixed-bed reactor to produce an intermediate stream comprising di-aromatic compounds, tri-aromatic compounds, or combinations thereof; and
contacting the intermediate stream with hydrogen in the presence of the mesoporous supported metal catalyst of the second fixed-bed reactor to produce a second reactor effluent comprising aromatic compounds having six to eight carbon atoms.

13. The method of claim 12, further comprising mixing a heavy pyrolysis oil from a naphtha steam cracker with a light aromatic stream upstream of the first fixed-bed reactor to produce the pyrolysis oil feed and passing the pyrolysis oil feed to the first fixed-bed reactor.

14. The method of claim 13, wherein the pyrolysis oil feed comprises from 75 wt. % to 85 wt. % of the heavy pyrolysis oil and from 15 wt. % to 25 wt. % of the light aromatic stream.

15. The method of claim 12, in which the pyrolysis oil feed comprises greater than or equal to 30 weight percent (wt. %) multi-ring aromatic compounds having greater than or equal to sixteen carbon atoms based on the total weight of the pyrolysis oil in the pyrolysis oil feed.

16. The method of claim 12, comprising:
contacting the pyrolysis oil feed with hydrogen in the presence of the first treating catalyst or the second treating catalyst in the first fixed-bed reactor at one or more of the following reaction conditions: (a) a peak temperature of from 200 degrees Celsius (° C.) to 400° C.; (b) a pressure of from 1 megapascal (MPa) (10 bar) to 20 MPa (200 bar); (c) a volume ratio of hydrogen to the pyrolysis oil feed of from 500 to 1500, or combinations of these reaction conditions;
contacting the pyrolysis oil feed with hydrogen in the presence of the mixed metal oxide catalyst in the first fixed-bed reactor at one or more of the following reaction conditions: (a) a peak temperature of from 200 degrees Celsius (° C.) to 400° C.; (b) a pressure of from 1 megapascal (MPa) (10 bar) to 20 MPa (200 bar); (c) a volume ratio of hydrogen to the pyrolysis oil feed of from 500 to 1500, or combinations of these reaction conditions; and
contacting the intermediate stream with hydrogen in the presence of the mesoporous supported metal catalyst in the second fixed-bed reactor at one or more of the following reaction conditions: (a) a temperature of from 200° C. to 400° C. (b) a pressure of from 1 MPa (10 bar) to 20 MPa (200 bar), or combinations of these reaction conditions.

17. The method of claim 12, wherein a peak temperature in the first catalyst bed of the first reactor is from 30° C. to 80° C. less than a peak temperature in the second catalyst bed of the first reactor.

18. The method of claim 12, in which contacting the pyrolysis oil feed with hydrogen in the presence of the first treating catalyst and the mixed metal oxide catalyst and contacting the intermediate stream with hydrogen in the presence of the mesoporous zeolite supported metal catalyst result in a yield of greater than or equal to 45 wt. % of the aromatic compounds having six to eight carbons based on the total weight of pyrolysis oil in the pyrolysis oil feed.

19. The method of claim 12, further comprising:
steam cracking a naphtha stream to produce one or more product streams and a heavy pyrolysis oil; and
passing the heavy pyrolysis oil to the first fixed-bed reactor as at least a portion of the pyrolysis oil feed.

20. The method of claim 12, further comprising:
steam cracking a hydrocarbon gas to produce at least one light olefin stream and a light pyrolysis oil; and
passing the light pyrolysis oil to the first fixed-bed reactor as at least a portion of the pyrolysis oil feed.

* * * * *